(12) United States Patent
Motohashi et al.

(10) Patent No.: US 7,551,307 B2
(45) Date of Patent: Jun. 23, 2009

(54) IMAGE FORMATION APPARATUS AND IMAGE FORMATION SYSTEM

(75) Inventors: Hiroomi Motohashi, Tokyo (JP); Tomofumi Harada, Kanagawa (JP); Kiyotaka Moteki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 339 days.

(21) Appl. No.: 11/620,742

(22) Filed: Jan. 8, 2007

(65) Prior Publication Data

US 2007/0109584 A1 May 17, 2007

Related U.S. Application Data

(62) Division of application No. 09/461,738, filed on Dec. 16, 1999, now Pat. No. 7,180,628.

(30) Foreign Application Priority Data

| Dec. 17, 1998 | (JP) | 10-359404 |
| Jan. 29, 1999 | (JP) | 11-023007 |
| Dec. 10, 1999 | (JP) | 11-352471 |

(51) Int. Cl.
G06K 15/00 (2006.01)
G03G 15/22 (2006.01)
G03B 27/00 (2006.01)
H04N 1/00 (2006.01)

(52) U.S. Cl. .................. 358/1.15; 399/144; 355/18; 358/407

(58) Field of Classification Search ............. 358/1.15, 358/505, 500, 407, 474, 400, 443; 355/18; 399/144; 347/3
See application file for complete search history.

(56) References Cited

U.S. PATENT DOCUMENTS

| 4,791,492 A | 12/1988 | Nagashima et al. ......... 358/409 |
| 4,797,706 A | 1/1989 | Sugishima et al. |
| 5,294,944 A | 3/1994 | Takeyama et al. |
| 5,410,416 A * | 4/1995 | Amberg et al. ............. 358/405 |
| 5,432,537 A | 7/1995 | Imakawa et al. |
| 5,596,390 A * | 1/1997 | Sawada ....................... 399/8 |
| 5,610,651 A | 3/1997 | Yamakawa et al. |
| 5,689,755 A | 11/1997 | Ataka |
| 5,809,363 A | 9/1998 | Kitamura et al. |
| 5,812,747 A | 9/1998 | Kayamo et al. |
| 5,987,227 A | 11/1999 | Endo et al. |
| 6,081,342 A | 6/2000 | Nakai et al. ............... 358/1.15 |
| 6,104,470 A | 8/2000 | Streefkerk et al. .......... 355/40 |
| 6,313,921 B1 * | 11/2001 | Kadowaki .................. 358/1.15 |
| 6,333,791 B1 * | 12/2001 | Okimoto et al. ............ 358/1.18 |

(Continued)

FOREIGN PATENT DOCUMENTS

EP   0 817 462   1/1998

(Continued)

*Primary Examiner*—Jerome Grant, II
(74) *Attorney, Agent, or Firm*—Oblon, Spivak, McClelland, Maier & Neustadt, P.C.

(57) ABSTRACT

In an image formation system, at least two copying machines are connected to each other. One of these machines functions as a master machine and the other functions as a slave machine. When the link copy mode is set in the master machine and when the user tries to select an operation mode which can not be executed in the master and slave machines concurrently, then copying is prohibited.

12 Claims, 63 Drawing Sheets

U.S. PATENT DOCUMENTS

| | | | |
|---|---|---|---|
| 6,400,463 B2 | 6/2002 | Kitamura et al. | 358/1.15 |
| 6,442,327 B1 * | 8/2002 | Yamada et al. | 386/46 |
| 6,449,064 B1 | 9/2002 | Hattori et al. | |
| 6,476,923 B1 * | 11/2002 | Cornell | 358/1.12 |
| 6,535,906 B1 * | 3/2003 | Barber et al. | 709/200 |
| 6,545,768 B1 * | 4/2003 | Matsubara et al. | 358/1.15 |
| 6,556,875 B1 | 4/2003 | Nagasaka et al. | 700/19 |
| 6,597,469 B1 * | 7/2003 | Kuroyanagi | 358/1.15 |
| 6,609,162 B1 | 8/2003 | Shimizu et al. | 710/15 |
| 7,180,628 B1 * | 2/2007 | Motohashi et al. | 358/1.9 |

FOREIGN PATENT DOCUMENTS

| | | |
|---|---|---|
| JP | 2-21190 | 5/1990 |
| JP | 5-304575 | 11/1993 |
| JP | 8-65425 | 3/1996 |
| JP | 8-79420 | 3/1996 |
| JP | 8-94778 | 4/1996 |
| JP | 8-97959 | 4/1996 |
| JP | 8-98038 | 4/1996 |
| JP | 8-116429 | 5/1996 |
| JP | 8-244317 | 9/1996 |
| JP | 8-251321 | 9/1996 |
| JP | 8-251346 | 9/1996 |
| JP | 8-293986 | 11/1996 |
| JP | 8-317106 | 11/1996 |
| JP | 9-24661 | 1/1997 |
| JP | 10-95152 | 4/1998 |
| JP | 10-111626 | 4/1998 |
| JP | 10-112769 | 4/1998 |
| JP | 10-124266 | 5/1998 |
| JP | 10-126533 | 5/1998 |
| JP | 10-126537 | 5/1998 |
| JP | 10-126538 | 5/1998 |
| JP | 10-126547 | 5/1998 |
| JP | 10-136143 | 5/1998 |
| JP | 10-143026 | 5/1998 |
| JP | 10-153928 | 6/1998 |

* cited by examiner

| MAINTENANCE MODE | END |

| RESIST ADJUSTMENT VALUE | +1.5 mm |
| TEMPERATURE WHEN FIXING | 185℃ |
| DEVELOPMENT BIAS | 550 V |
| MAGNIFICATION IN MAIN SCANNING DIRECTION | 0.0 % |

NEXT

IMAGE FORMATION APPARATUS AND IMAGE FORMATION SYSTEM

CROSS-REFERENCE TO RELATED APPLICATIONS

This application is based upon and claims the benefit of priority from the prior Japanese Patent Application No. 10-359404 334599, filed Dec. 17, 1998, Japanese Patent Application No. 11-023007 filed Jan. 29, 2000 and Japanese Patent Application No. 11-352471, filed Dec. 10, 1999, the entire contents of which are incorporated herein by reference.

FIELD OF THE INVENTION

The present invention relates an image formation apparatus as well as to an image formation system. More specifically, this invention relates to an image formation apparatus and an image formation system in which a plurality of image formation apparatuses are connected to each other to share a copy job.

BACKGROUND OF THE INVENTION

There has been known the so-called link copy operation for concurrently executing a print job with two or more units of image formation apparatus by linking a plurality of image formation apparatuses such as digital copying machines through a communication network like LAN and selecting a link mode provided in each apparatus. In other words, in this link copy operation, for instance when a specified number of copies are to be prepared for a document having N pages and further the processing for stapling (staple mode) is to be executed, then the availability of a staple function in a local machine (master machine) and other machines (slave machine) is checked. When it is confirmed that the link mode and staple mode are available in the local machine and other machines, then the printing job is executed by all the machines concurrently.

Further, there have been proposed various types of system for various purposes in which a plurality of image signal output units such an image scanner capable of outputting an image signal, a word processor, and a personal computer and a plurality of image formation units such as printers capable of forming an image based on image signals outputted from the image signal output units.

As examples of the image formation system described above, there is, for instance, the image formation system disclosed in Japanese Patent Publication No. HEI 2-21190 in which a plurality of image signal output devices and a plurality of image formation apparatuses are connected to each other in order to perform recording, storage and communication of image information between all the apparatuses. In this system access from an apparatus to any other apparatus is possible. Further, there is the system disclosed in Japanese Patent Laid-Open Publication No. HEI 5-304575 in which a plurality of digital copying machines are connected to each other to realize a faster copying.

In the conventional technology as described above, however, when system configuration of the master machine is different from that of the slave machine, if a mode not available in the slave machine is set in the master machine and link copy is started, a result which is different from that specified by the user is obtained. Thus there is a problem that operational disturbance or generation of incorrect copy may occur in the link copy operation.

In the link copy operation based on the conventional technology, each time an operation in the link copy mode is to be executed, it is required to directly check various conditions (such as availability of supply, a communication state, a state of a display screen, and an operating state) in the slave machines and then to set the link copy mode or start the operation. Because of such requirements, the operation is very complicated and productivity in printing is disadvantageously lowered.

In the link copy operation based on the conventional technology a function for automatically starting the link copy operation in both the master machine and the slave machines is not available. Therefore, when the number of copies is large, a long time is disadvantageously required for executing the printing job and the operation is also very complicated.

SUMMARY OF THE INVENTION

It is a first object of the present invention to prevent generation of a mistake in copying in a link copy mode when a user tries to set or sets an operation mode which can not be executed in both the master machine and the slave machines and also to improve operability in the link copy mode.

It is a second object of the present invention to improve operability and productivity of operations in the link copy mode by making it possible for a user of the master machine to check various conditions of the slave machines (such as availability of supply, a communication state, a state of a display screen, and an operating state of a slave machine, from the side of the master machine.

It is a third object of the present invention to simplify operations and improve productivity of operations in the link copy mode by automatically executing operations for copying in the link copy mode when a number of copies to be printed is larger and a long time may be required for the processing.

With an image formation apparatus according to the present invention, in a state where a link copy mode has been selected, when a function which can not be executed in a local device or in other image formation apparatus is selected, a link copy operation is inhibited.

With an image formation apparatus according to the present invention, a function available in a local machine is reported to other image formation apparatus, and an image of a document read by and transferred from the other image formation apparatus is printed in the local machine.

With an image formation system according to the present invention, a slave machine reports a function available in the slave machine to a master machine, and in a state where the link copy mode has been selected, when a function which can not be executed in the local machine or the slave machine is selected, the master machine inhibits the link copy operation.

With an image formation apparatus according to the present invention, in a state where the link copy mode has been selected, when a function which can not be executed in the local machine or other image formation apparatus is selected, a select key for selecting the function is not displayed.

With an image formation system according to the present invention, a slave machine reports a function available in the slave machine to a master machine, and in a state where the link copy mode has been selected, when a function which can not be executed in the master machine or in the slave machine, the master machine does not display the select key for selecting the function.

With an image formation apparatus according to the present invention, in a state where the link copy mode has been selected, when a function which can not be executed in the local machine or other image formation apparatus is selected, a display indicating that the select key for selecting the function is invalid is displayed.

With an image formation system according to the present invention, a slave machine reports a function available in the slave machine to a master machine, and in a state where the link copy mode has been selected, when a function which can not be executed in the master machine or in the slave machine, the master key displays a message indicating that the select key for selecting the function is invalid.

With an image formation apparatus according to the present invention, in a state where the link copy mode has been selected, when a function which can not be executed in the local machine or in other image formation apparatus is selected, the mode for executing the function is canceled.

With an image formation system according to the present invention, a slave machine reports a function available in the slave machine to a master machine, and in a state where the link copy mode has been selected, when a function which can not be executed in the master machine or in the slave machine is selected, the master machine cancels the mode for executing the function.

With an image formation apparatus according to the present invention, the function includes a staple function.

With an image formation system according to the present invention, the function includes a staple function.

With an image formation apparatus according to the present invention, in a state when the link copy mode has been selected, when power for other image formation apparatus is OFF, the link copy operation is inhibited.

With an image formation system according to the present invention, a local machine reports a power ON/OFF state in the local machine to other image formation apparatus, and prints an image of a document read by and transferred from other image formation apparatus.

With an image formation apparatus according to the present invention, a slave machine reports a power ON/OFF state in the slave machine to a master machine, and inhibits the link copy operation when the link copy mode is selected and a power for the slave machine is OFF.

With an image formation apparatus according to the present invention, in a state where the link copy mode has been selected, when the other image formation apparatus are not ready for communications, the link copy operation is inhibited.

With an image formation apparatus according to the present invention, a local machine reports a communication-ready state in the local machine to other image formation apparatus, and prints an image of a document read by and transferred from the other image formation apparatus.

With an image formation system according to the present invention, a slave machine reports a communication-ready state in the slave machine to a master machine, and in a state where the link copy mode has been selected, when the slave machine is not ready for communications, the master machine inhibits the link copy operation.

With an image formation apparatus according to the present invention, in a state where the link copy mode has been selected, when a communication error occurs in other image formation apparatus, the link copy operation is inhibited.

With an image formation apparatus according to the present invention, a local machine reports a communication error state in the local machine to other image formation apparatus, and prints an image of a document read by and transferred from the other image formation apparatus.

With an image formation system according to the present invention, a slave machine reports a communication error state in the slave machine to a master machine, and the master machine inhibits the link copy operation in a state where the link copy mode is selected when a communication error occurs in the slave machine.

With an image formation apparatus according to the present invention, when power for other image formation apparatus is OFF, selection of the link copy mode is inhibited.

With an image formation system according to the present invention, a slave machine reports a power ON/OFF state in the slave machine to a master machine, and the master machine inhibits selection of the link copy mode when power for the slave machine is OFF.

With an image formation apparatus according to the present invention, when other image formation apparatus are not ready for communication, selection of the link copy mode is inhibited.

With an image formation system according to the present invention, a slave machine reports a communication-ready state in the slave machine to a master machine, and the master machine inhibits selection of the link copy mode when the slave machine is not ready for communications.

With an image formation apparatus according to the present invention, when a communication error occurs in other image formation apparatus, selection of the link copy mode is inhibited.

With an image formation system according to the present invention, a slave machine reports a communication error state in the slave machine to a master machine, and the master machine inhibits selection of the link copy mode when the slave machine is in the communication error state.

With an image formation system according to the present invention, a slave machine cyclically transmits a communication connection check signal indicating whether connection has been established or not to a master machine, and the master machine receives the communication connection check signal and determines whether the slave machine is ready for communications or not.

With an image formation apparatus according to the present invention, when other image formation apparatus are in the supply-end state, the link copy operation is inhibited.

With an image formation apparatus according to the present invention, a local machine reports a supply state in the local machine to other image formation apparatus, and prints an image of a document read by and transferred from the image formation apparatus.

With an image formation system according to the present invention, a slave machine reports a supply state in the slave machine to a master machine, and the master machine inhibits the link copy operation when the slave machine is in the supply-end state.

With an image formation apparatus according to the present invention, a reporting unit reports, when a supply state in a local machine changes, the supply state in the local machine to other image formation apparatus.

With an image formation apparatus according to the present invention, the link copy operation is inhibited when a print engine error occurs in other image formation apparatus.

With an image formation apparatus according to the present invention, a local machine reports an operating state of a print engine in the local machine to other image formation apparatus, and prints an image of a document read by and transferred from the other image formation apparatus.

With an image formation system according to the present invention, a slave machine reports an operating state of a print engine in the slave machine to a master machine, and the master machine inhibits the link copy operation when an print engine error occurs in the slave machine.

With an image formation apparatus according to the present invention, when an operating state of a print engine in a local machine changes, the local machine reports the operating state of a print engine in the local machine to other image formation apparatus.

With an image formation apparatus according to the present invention, when other image formation apparatus display a screen other than the normal copy screen, the link copy operation is inhibited.

With an image formation apparatus according to the present invention, a local machine reports a screen display state in the local machine to other image formation apparatus, and prints an image of a document read by and transferred from the other image formation apparatus.

With an image formation system according to the present invention, a slave machine reports a screen display state in the slave machine to a master machine, and the master machine inhibits the link copy operation when the slave machine displays a screen other than the normal copy screen.

With an image formation apparatus according to the present invention, a reporting unit reports, when a screen display state in a local machine, the screen display state in the local machine to other image formation apparatus.

With an image formation apparatus according to the present invention, when other image formation apparatus are executing a printing operation, the link copy operation is inhibited.

With an image formation apparatus according to the present invention, a local machine reports an operating state of a print engine in the local machine to other image formation apparatus, and prints an image of a document read by and transferred from other image formation apparatus.

With an image formation system according to the present invention, a slave machine reports an operating state of a print engine in the slave machine to a master machine, and the master machine inhibits the link copy operation when the slave machine is executing a printing operation.

With an image formation apparatus according to the present invention, a reporting unit reports, when an operating state of a print engine in a local machine changes, the operating state of a print engine in the local machine to other image formation apparatus.

With an image formation apparatus according to the present invention, when other image formation apparatus are in a supply end state, selection of the link copy mode is inhibited.

With an image formation apparatus according to the present invention, a slave machine reports a supply end state in the slave machine to a master machine, and the master machine inhibits selection of the link copy mode when the slave machine is in the supply end state.

With an image formation apparatus according to the present invention, when other image formation apparatus are in the print engine error state, selection of the link copy mode is inhibited.

With an image formation system according to the present invention, a slave machine reports a print engine state in the slave machine to a master machine, and the master machine inhibits selection of the link copy mode when the slave machine is in the print engine error state.

With an image formation apparatus according to the present invention, when other image formation apparatus are displaying a screen other than the normal copy screen, selection of the link copy mode is inhibited.

With an image formation system according to the present invention, a slave machine reports a screen display state in the slave machine to a master machine, and the master machine inhibits selection of the link copy mode when the salve device displays a screen other than the normal copy screen.

With an image formation apparatus according to the present invention, selection of the link copy mode is inhibited when other image formation apparatus are executing a printing operation.

With an image formation system according to the present invention, a slave machine reports an operating state of a print engine in the slave machine to a master machine, and the master machine inhibits selection of the link copy mode when the slave machine is executing a printing operation.

With an image formation apparatus according to the present invention, when a number of specified copies of a document to be printed is more than a prespecified number of sheets.

With an image formation system according to the present invention, when a number of sheets of document to be printed is more than a prespecified number of sheets, the link copy mode is automatically executed.

With an image formation apparatus according to the present invention, when a number of sheets of document is more than a prespecified number of sheets, the link copy mode is automatically executed.

With an image formation system according to the present invention, when a number of sheets of document is more than a prespecified number of sheets, the link copy mode is automatically executed.

With an image formation apparatus according to the present invention, a total number of sheets to be printed is calculated based on a number of sheets of document and a specified number of sheets of document to be printed, and the link copy mode is automatically executed when the calculated total number of sheets to be printed is more than a prespecified number of sheets.

With an image formation system according to the present invention, a master machine calculates a total number of sheets to be printed based on a number of sheets of document nd a specified number of sheets of document to be printed, and automatically executes the link copy mode when the calculated total number of sheets to be printed is more than a prespecified number of sheets.

With an image formation apparatus according to the present invention, a local image formation apparatus calculates a total required number of image-forming operations based on a number of sheets of document, a number of sheets of document to be printed, and a specified image formation mode, and automatically executes the link copy mode when the calculate number of image-forming operations is more than a prespecified value.

With an image formation system according to the present invention, a master machine calculates a total required number of image-forming operations based on a number of sheets of document, a specified number of sheets of document to be printed, and a specified image-forming mode, and automatically executes the link copy mode when the calculated total number of image-forming operations requires a larger number of sheets of paper more than a prespecified value.

With an image formation apparatus according to the present invention, when the link copy mode is automatically executed, a message indicating automatic execution of the link copy mode is displayed on a display unit.

With an image formation system according to the present invention, a master machine displays a message indicating automatic execution of the link copy mode on a display unit when the link copy mode is automatically executed.

With an image formation apparatus according to the present invention, when the link copy mode is automatically executed and a printing job is finished, the link copy mode is canceled.

With an image formation system according to the present invention, a master machine cancels the link copy mode when the master machine automatically executes the link copy mode and finishes a print job.

With an image formation apparatus according to the present invention, when the link copy mode is selected, a link copy mode shift request reporting unit sends a link copy mode shift request to other image formation apparatus connected thereto, and a link copy mode setting unit sets the link copy mode in response to the link copy mode shift request and based on a result of determination that a link copy mode shift request sent from other image formation apparatus can be accepted.

With an image formation apparatus according to the present invention, a link mode shift determination unit determines in response to a link copy mode shift request sent from other image formation apparatus whether shift to the link copy mode is possible or not, and sends the result of determination to the other image formation apparatus.

With an image formation apparatus according to the present invention, in a slave machine, a link copy mode shift determination unit determines in response to a link copy mode shift request sent from a master machine whether shift to the link copy mode is possible or not, and sends the result of determination to the master machine. On the other hand, when the link copy mode is selected, the link copy mode shift request reporting unit in the master machine sends a link copy mode shift request to the slave machine, and a link copy mode determination unit sets the link copy mode based on the result of determination sent from the slave machine that shift to the link copy mode is possible.

With an image formation apparatus according to the present invention, one image formation apparatus is connected to other image formation apparatus peer to peer.

With an image formation system according to the present invention, a master machine is connected to a slave machine peer to peer.

Other objects and features of this invention will become apparent from the following description with reference to the accompanying drawings.

BRIEF DESCRIPTION OF THE DRAWINGS

FIG. 48 is a view showing an example of a screen display showing a state where a maintenance mode according to the fourth embodiment of the present invention is set;

DESCRIPTION OF THE PREFERRED EMBODIMENTS

Preferred embodiments of a digital copying machine and a digital copying machine system to which the image formation device and the image formation system each according to the present invention are respectively applied are described below with reference to the attached drawings.

A first embodiment of the present invention is explained below with reference to FIG. 1 to FIG. 23.

Figure 1:
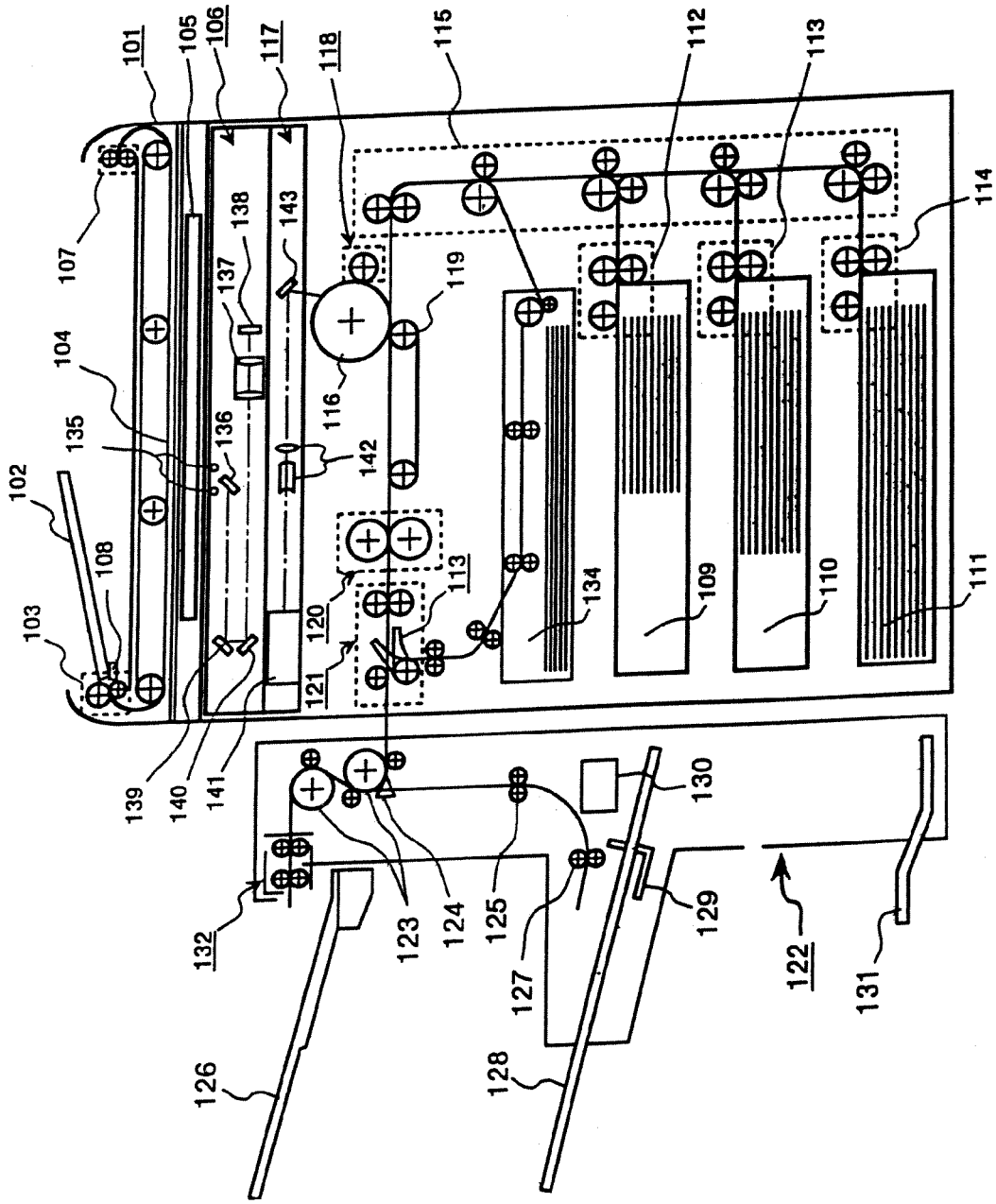
FIG. 1 shows the configuration of a digital copying machine according to an embodiment of the present invention.

Configuration of a Digital Copying Machine:

FIG. 1 shows the configuration of the digital copying machine according to a first embodiment of the present invention. In this figure, a not illustrated document having many pages placed with the image printed surface upward respectively on a document base 102 of an automatic document feeder (ADF) 101 are fed, paper by paper starting from the paper placed at the bottom, by a paper-feed roller 103 and a paper-feed belt 104 to a specified document reading position on a contact glass 105.

The document paper fed onto the contact glass 105 is read by a reading unit 106, and is discharged by the paper-feed belt 104 and a paper-discharge roller 107. When it is detected by a document set detection sensor 108 that another paper is present on the document base 102, the same series of operations performed with the previous paper. The paper-feed roller 103, paper-feed belt 104, and paper-discharge roller 107 are driven by a carrier motor not shown in this figure.

A plurality of sheets of recording paper placed on a first tray 109, a second tray 110, and a third tray 111 are fed from a first paper-feed section 112, a second paper-feed section 112, and a third paper-feed section 114 respectively, transferred by a paper carrier unit 115 to a resist roller, and are carried up to a position just before a contact position with photosensitive drum 116. In parallel with the operations described above, a document image read by the reading unit 106 is written as image data with a laser beam outputted from a writing unit 117 onto the photosensitive drum 116, and is visualized as a toner image by a development unit 118.

The recording paper is restarted at a timing so that the resist roller comes to a specified position against the toner image, carried by a carrier belt 119 at a speed equal to a rotational speed of the photosensitive drum 116, and is subjected to the transfer processing, thus the toner image on the photosensitive drum 116 being transferred. The toner image transferred onto the recording paper is thermally fixed by a fixing unit 120. The recording paper with the image fixed thereon (this process is described as image formation hereinafter) is discharged by a paper-discharge unit 121 onto a finisher 122 which is a postprocessing device.

The finisher 122, which is a postprocessing device, can guide recording paper carried thereto by a paper-discharge unit 121 in a main frame of the machine in a direction to a discharge paper tray 126 or to a staple processing section (at a bottom left corner in the figure). In this process, the finisher 122 guides the recording paper with a switch plate 124. By switching the switch plate 124 upward, the recording paper can be discharged via paper-discharge roller 123 and a carrier roller unit 132 to the normal discharge paper tray 126. By switching the switch plate 125 downward, the recording paper can be carried via carrier rollers 125 and 126 to a staple base 128.

An edge of the recording paper placed on the staple base 128 is aligned by a paper-aligning jogger 129 each time a sheet of recording paper is discharged, and then a certain number of copies are prepared, the sheets are stapled by a stapler 130. A group of sheets of recording paper stapled by the stapler 130 is accommodated into a stapled discharge paper tray 131.

The normal discharge paper tray 126 can be moved back and forth. The discharge paper tray 126, which can be moved back and forth, moves back and forth each time a document is copied, or each time a copy is sorted by an image memory 501 described later for sorting the discharged copies.

When images are to be formed on both surfaces of the recording paper, recording paper fed from the first tray 109, second tray 110, and third tray 111 with an image formed thereon is not guided to the discharge paper tray 126, but is temporally stocked on a double-surface paper-feed unit 134 by setting a branch claw 133 for switching a path for each sheet of recording paper in the upper side.

The recording paper temporally stocked in the double-surface paper feed unit 134 is again fed from the double-surface paper feed unit 134 with a toner image formed on the photosensitive drum 116 transferred thereon, and is guided to the discharge paper tray 126 by setting the branch claw 133 for switching a path for each sheet of recording paper in the lower side. As described above, the double-surface paper feed unit 134 is used when images are to be formed on both surfaces of recording paper.

The photosensitive drum 116, carrier belt 119, fixing unit 120, a paper-discharge unit 121, and development unit 118 are driven by a not illustrated main motor, while the first paper-feed section 112, second paper-feed section 113, and third-paper feed section 114 are driven by a transfer drive by the main motor to each component via a not illustrated first paper-feed clutch, a second paper-feed clutch, and a third paper-feed clutch. A vertical carrier unit 115 is driven by a transfer drive by the main motor via a not illustrated intermediate clutch.

Operations for reading an image in the image reading unit 106, operations for writing an image in the writing unit 117, and operations for forming a latent image on a surface of the photosensitive drum 116 are described below. The latent image as defined herein is a potential distribution generated by converting an image to optical data and irradiating the optical data onto a surface of the photosensitive drum 116.

The reading unit 106 comprises a contact glass 105 on which a document is placed, and an optical scan system. The optical scan system comprises an exposure lamp 135, a first mirror 136, a lens 137, a CCD image sensor 138, a second mirror 139, and a third mirror 140. The exposure lamp 135 and first mirror 136 are fixed to a not illustrated first carriage, while the second mirror 139 and third mirror 140 are fixed on a not illustrated second carriage. When reading an image, the first and second carriages are mechanically scanned at a relative speed of 2 vs 1 so that the light path length does not change. This optical scan system is driven by a not illustrated scanner drive motor.

The image is read by the CCD image sensor 138, and is converted to an electric signal. Magnification of the image can be changed by moving the lens 137 and CCD image sensor 138 in the left and right directions (in FIG. 1). Namely, positions of the lens 137 and CCD image sensor 138 in the left and right directions (for focusing) are set in correspondence to the specified magnification.

The write unit 117 comprises a laser output unit 141, a focusing lens 142, and a mirror 143, and a not illustrated laser diode which is a source of laser beam having a specified wavelength and a not illustrated polygon mirror which is driven at a high and constant speed by a not illustrated polygon motor are provided in the laser output unit 141.

A laser bean irradiated from the laser output unit 141 is reflected by the polygon mirror which rotates at a constant high speed, passes through the focusing lens 142, again reflected by the mirror 143, and focused on a surface of the photosensitive drum 116, thus an image being formed.

The laser beams used for scanning is irradiated in a direction (main scanning direction) perpendicular to a direction in which the photosensitive drum 116 rotates, and is used for recording an image signal outputted from a selector of a image processing unit 402 described later line by line. By repeating the main scanning at a prespecified cycle corresponding to the rotating speed of the photosensitive drum 116 as well as to a recording density, an image (electrostatic latent image) is formed on the surface of the photosensitive drum 116.

As described above, a laser beam outputted from the writing unit 117 is irradiated to the photosensitive drum 116. A beam sensor (not shown) which generates a main scanning synchronization signal is located at a position near one edge of the photosensitive drum 116 where the laser beam is irradiated. Timing control for starting image recording in the main scanning direction and generation of a control signal for input/output of an image signal described later are executed based on this main scanning synchronization signal.

Figure 2:
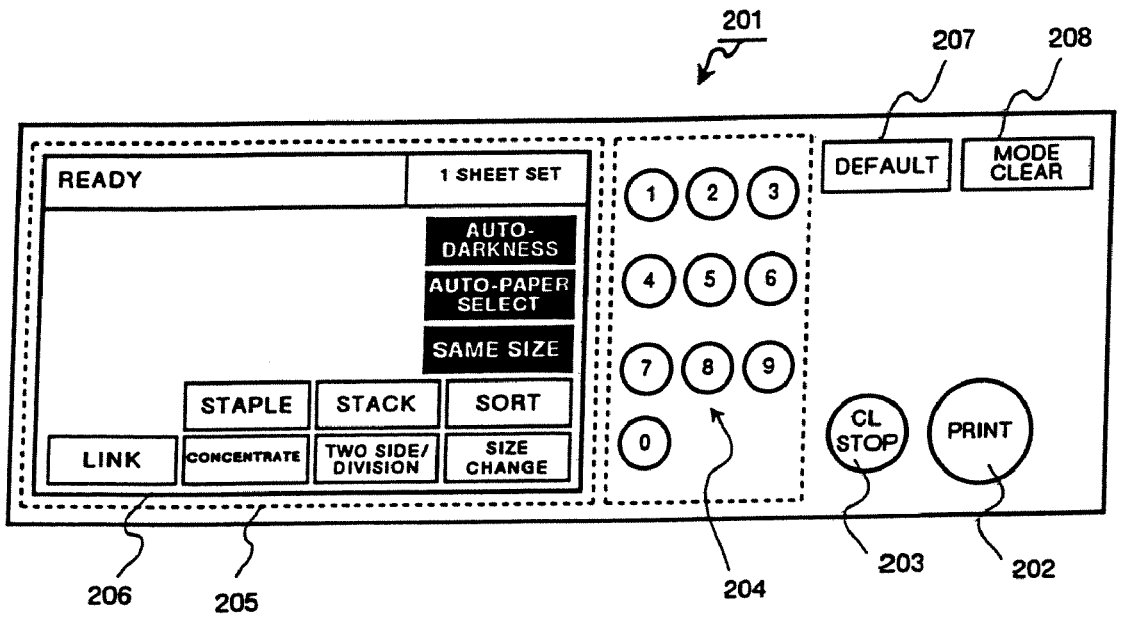
FIG. 2 shows the configuration of an operation panel.

Configuration of the Operation Panel:

Configuration of the operation panel 201 used for providing displays to a user and also used by a user to input data for setting and controlling various functions is described below with reference to FIG. 2 to FIG. 5. FIG. 2 shows the operation panel. As shown in FIG. 2, the operation panel 201 comprises a print key 202, a clear/stop key 203, a ten-key 204, a liquid crystal touch panel 205, default settings key 207, and a mode clear key 208. The liquid crystal touch panel 205 is used to display various types of messages indicating, for instance, function keys 206, a number of copies to be prepared, and a state of a digital copying machine, or to input various types of information.

In this embodiment, as a dot display unit is used as the liquid crystal touch panel 205, optimal displays most suited to the operation currently being performed can graphically be provided. Although a dot display unit is used as the liquid crystal panel 205 in this embodiment, configuration of the present invention is not limited to this one.

Figure 3:
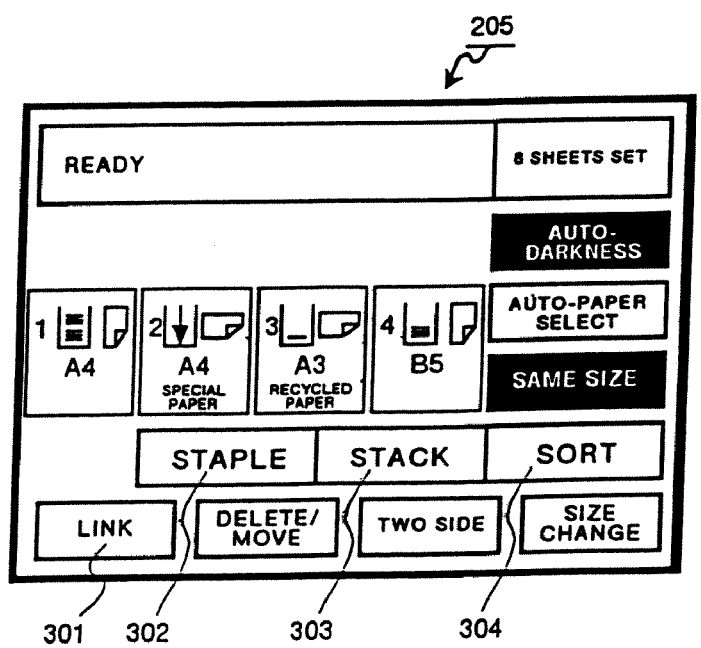
FIG. 3 is a view showing a display screen of a liquid crystal touch panel of the operation panel.

FIG. 3 shows an example of a display screen of the liquid crystal touch panel 205 on the operation panel 201. When the operator touches a key displayed on the liquid crystal touch panel 205, the key is displayed in reverse vides. When it is necessary to specify details of the function (for instance a specific value when changing the size), a screen for setting the functions is displayed when an operator touches the key.

In FIG. 3, there is a message area used for displaying such messages as "ready", and "wait" at the top left corner of the screen. To the right from the message area, there are a copy number display section which displays a number of set sheets. Under the copy number display section, there are a sort mode key 304 used for specifying the processing to put copies page by page into the page order, a stack mode key 303 used for specifying the processing to sort copies page by page, and a staple mode key 302 used for specifying the processing to staple the sorted copies into a bundle. Under these keys, there are an same size key used to set a magnification to the same size, a size change key used to set the magnification, a two side/division key used for setting the two side copy mode, and a delete/move key used for setting a binding space mode or the like. In this embodiment, especially a link copy key 301 used for specifying a link copy mode required when a large number of copies are required and the printing job is to be shared also by other digital copying machine(s) connected thereto. In this figure, selected modes are displayed in reverse video.

As shown in FIG. 3, keys each used for manually setting a paper-feed state are displayed as information indicating a number of available paper-feed trays. A size of each paper-feed tray (including information concerning whether the paper is placed with the longitudinal edge aligned along the vertical direction or horizontal direction), a residual quantity of paper in each tray, a type of paper, and other information are displayed in this section. The residual quantity of paper indicates the paper end state with the downward arrow, and the near end state with a horizontal bar. A selected mode is displayed in the inverted mode.

Figure 4:
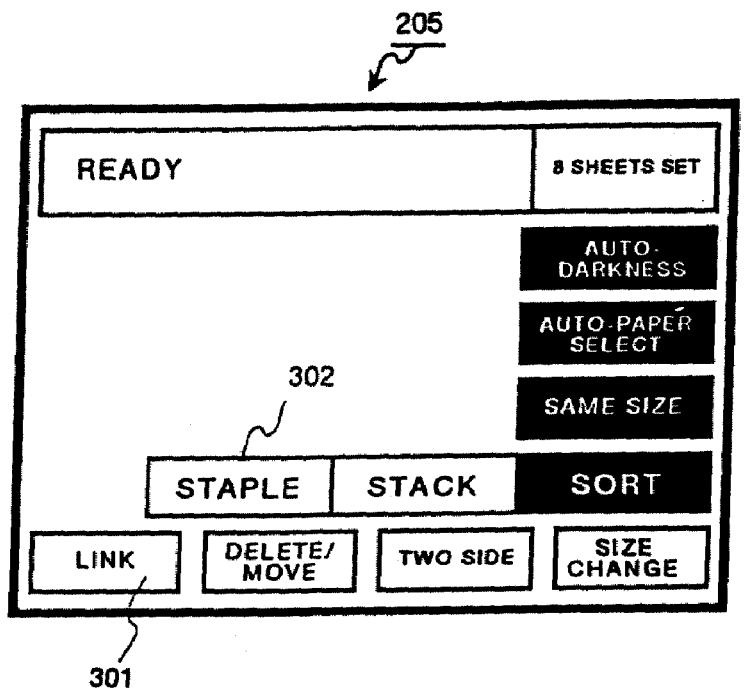
FIG. 4 is a view showing a display screen when an automatic paper selection mode is set on the operation panel.
Figure 5:
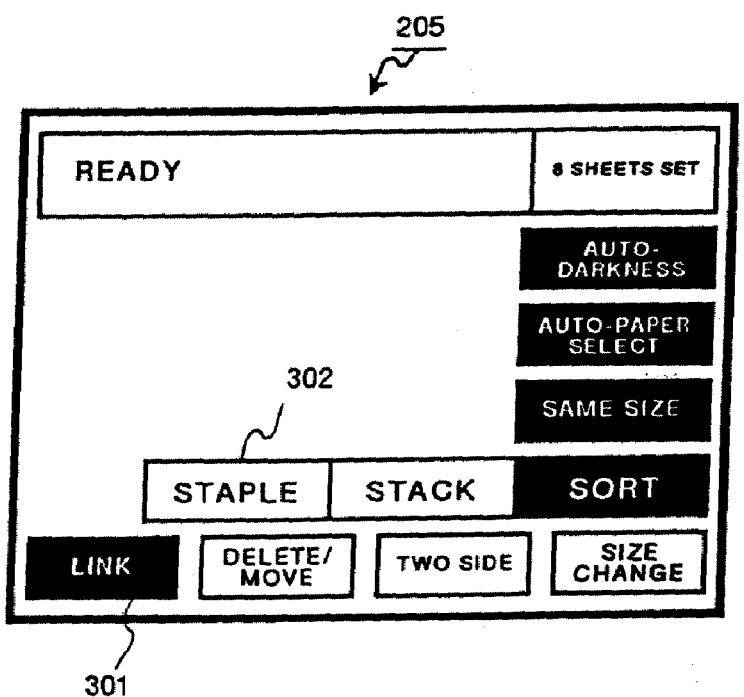
FIG. 5 is a view showing a display screen when a link copy key on the operation panel is pressed.
Figure 6:
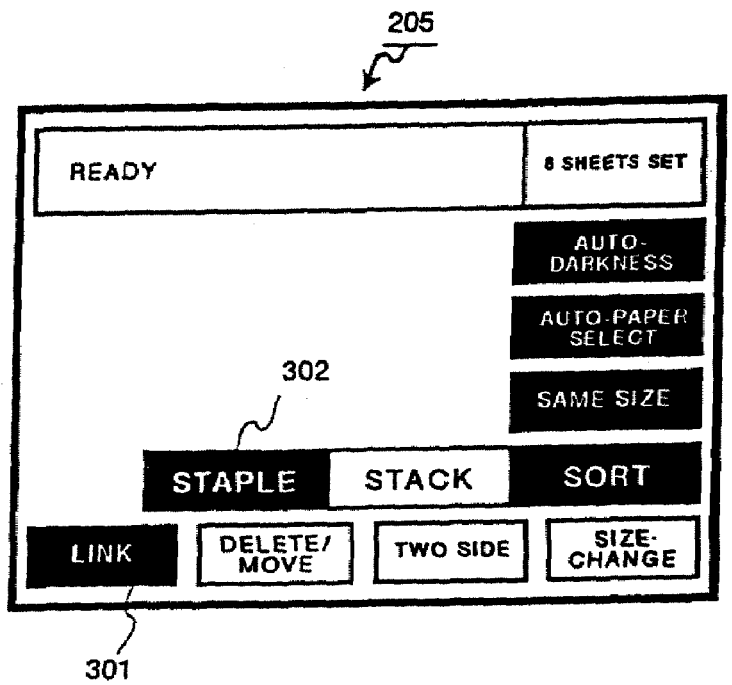
FIG. 6 is a view showing a display screen when a staple mode is set on the display screen shown in FIG. 5.

FIG. 4 shows an example of a screen when the automatic paper selection mode is set. In this state, when the link copy key 301 is pressed, the screen is switched to the link copy mode setting screen as shown in FIG. 5. this mode is canceled when the link copy mode 301 is pressed, and the screen shown in FIG. 4 is restored.

Control System for the Digital Copying Machine:

A control system for the digital copying machine is described in detail with reference to FIG. 11 and FIG. 12.

FIRST EXAMPLE OF THE CONFIGURATION

Figure 11:
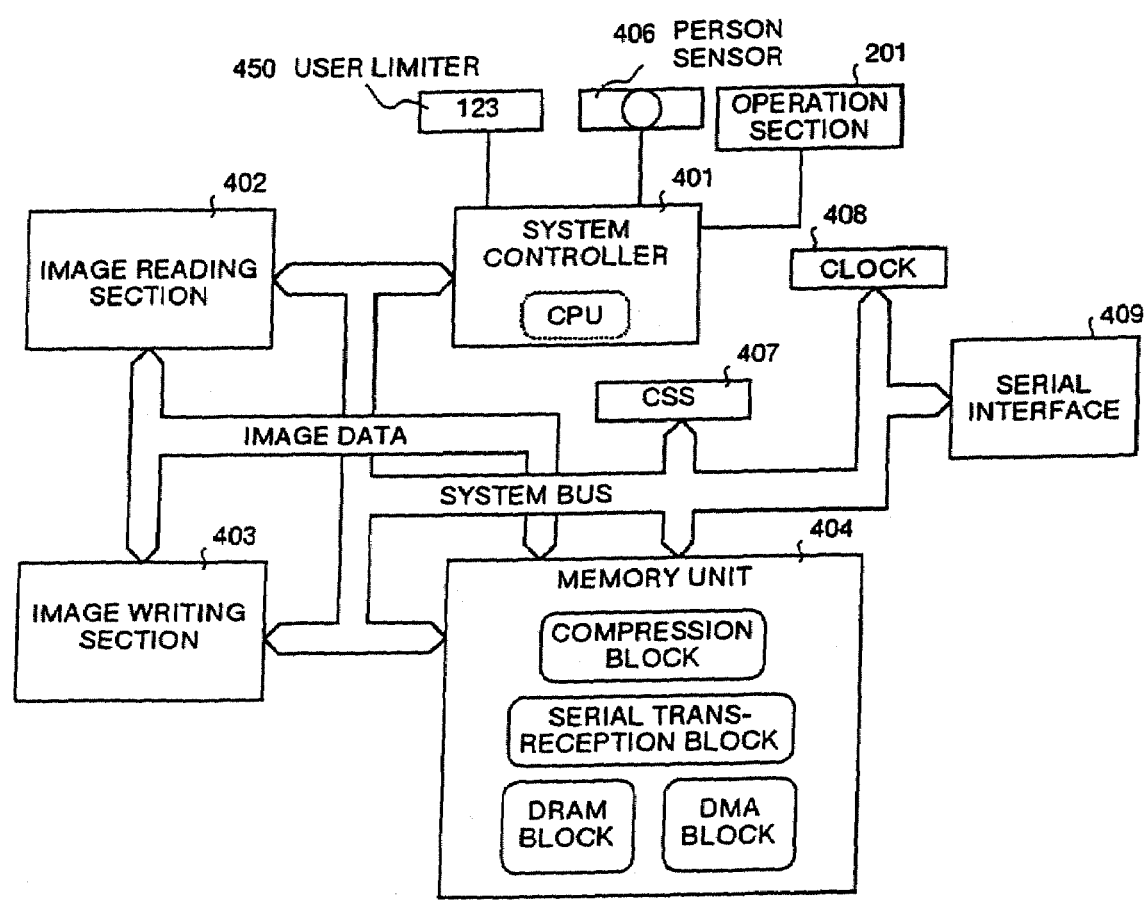
FIG. 11 is a block diagram showing a control system (Example one of configuration) of the digital copying machine shown in FIG. 1.

FIG. 11 shows a control system for the digital copying machine, and as shown in this figure, a each system component is located around a system controller 401 controlling the entire digital copying machine. Connected via a system bus to the system controller 401 are an image reading section 402, an image writing section 403, a memory unit 404, a CSS 407, a clock 408, and a serial interface 409. Further, a user limiter 405, a person sensor 406, and the operation panel 201 are directly connected to the system controller 401. The image reading section 402, image writing section 403, and memory unit 404 are connected through an image data bus to each other.

The memory unit 404 comprises a compression block, a DRAM block, a DMA block, and a serial trans-reception block. The DRAM block in the memory unit 404 stores therein an image signal read from the image reading section 402, and can transfer image data stored in the image writing section 403 in response to a request from the system controller 401. The compression block has a compression function based on the MH, MR, or MMR systems which are data compression systems generally used, and compresses an image once read to improve efficiency in use of a memory (DRAM). Rotation of an image is realized by changing an address read from the image writing section 403 and the direction. When it is required to realize the ordinary copy function, this memory unit 404 is not necessary.

The clock 404 is required only to realize a weekly timer function such as booting a machine, or shutting down the machine with a prespecified time (preset time) comes. The person body sensor 406 is required only for realizing a function to cancel, in a preliminarily heating mode, the mode when a user comes near the machine. The CSS 407 has a function of remote diagnosis, namely a function to automatically report an error in the machine to a service center, or to monitor an operating state of the machine from a remote site. The functions may be installed only when the functions are required.

SECOND EXAMPLE OF THE CONFIGURATION

Figure 12:
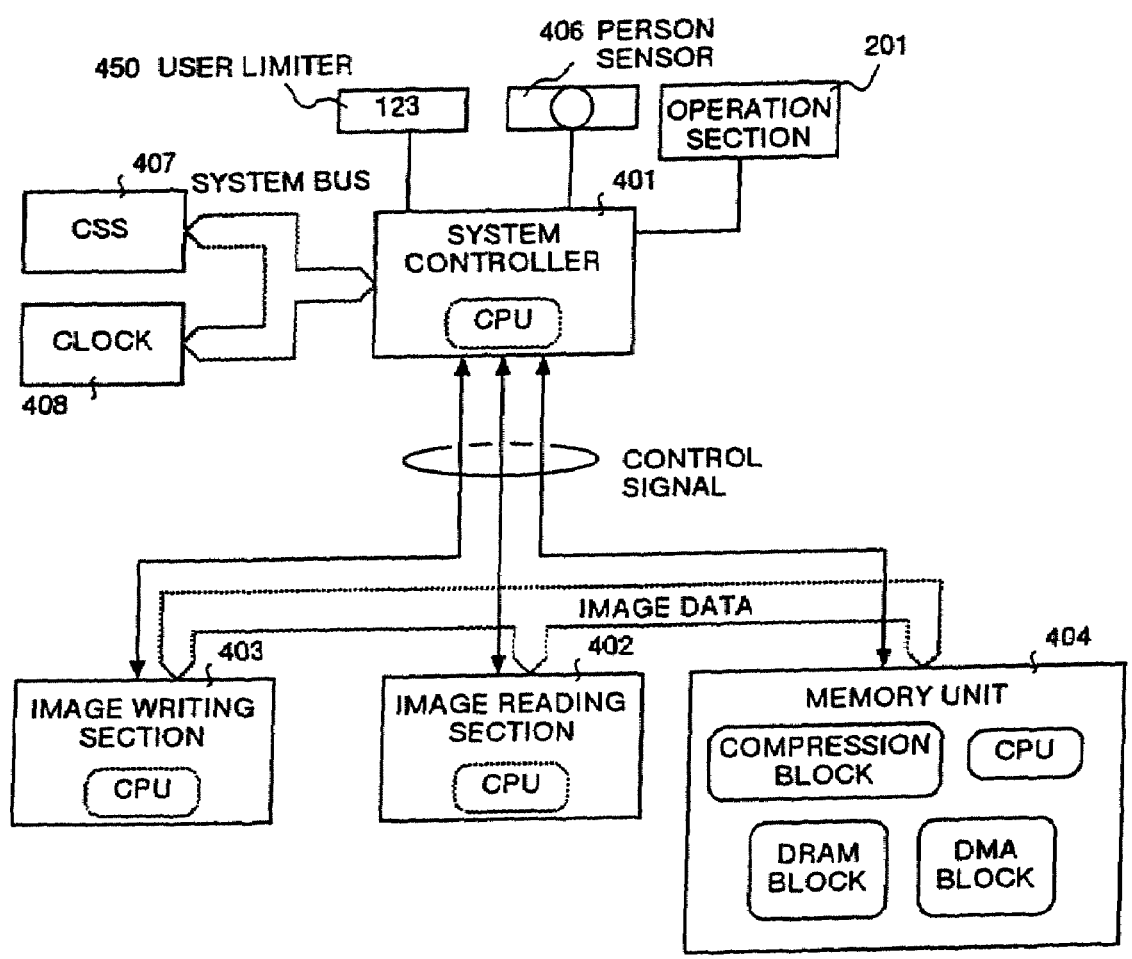
FIG. 12 is a block diagram showing a control system (Example two of configuration) of the digital copying machine shown in FIG. 1.

FIG. 12 shows another example of configuration of a control system for the digital copying machine. In the first example described above (as shown in FIG. 11), the configuration is based on a centralized control system in which a CPU of the system controller 401 provides controls over the image reading section 402, image writing section 403, memory unit 404, and CSS 407, but the present invention is not limited to this configuration. For instance, as shown in FIG. 12, the configuration may be based on a distributed control system in which each of the image reading section 402, image writing section 403, and memory unit 404 has a CPU respectively and a command from a system controller to each controller is delivered over a control signal line. Configuration of the control system for the digital copying machine is not limited to the first or second example, and any other configuration is allowable.

Figure 16:
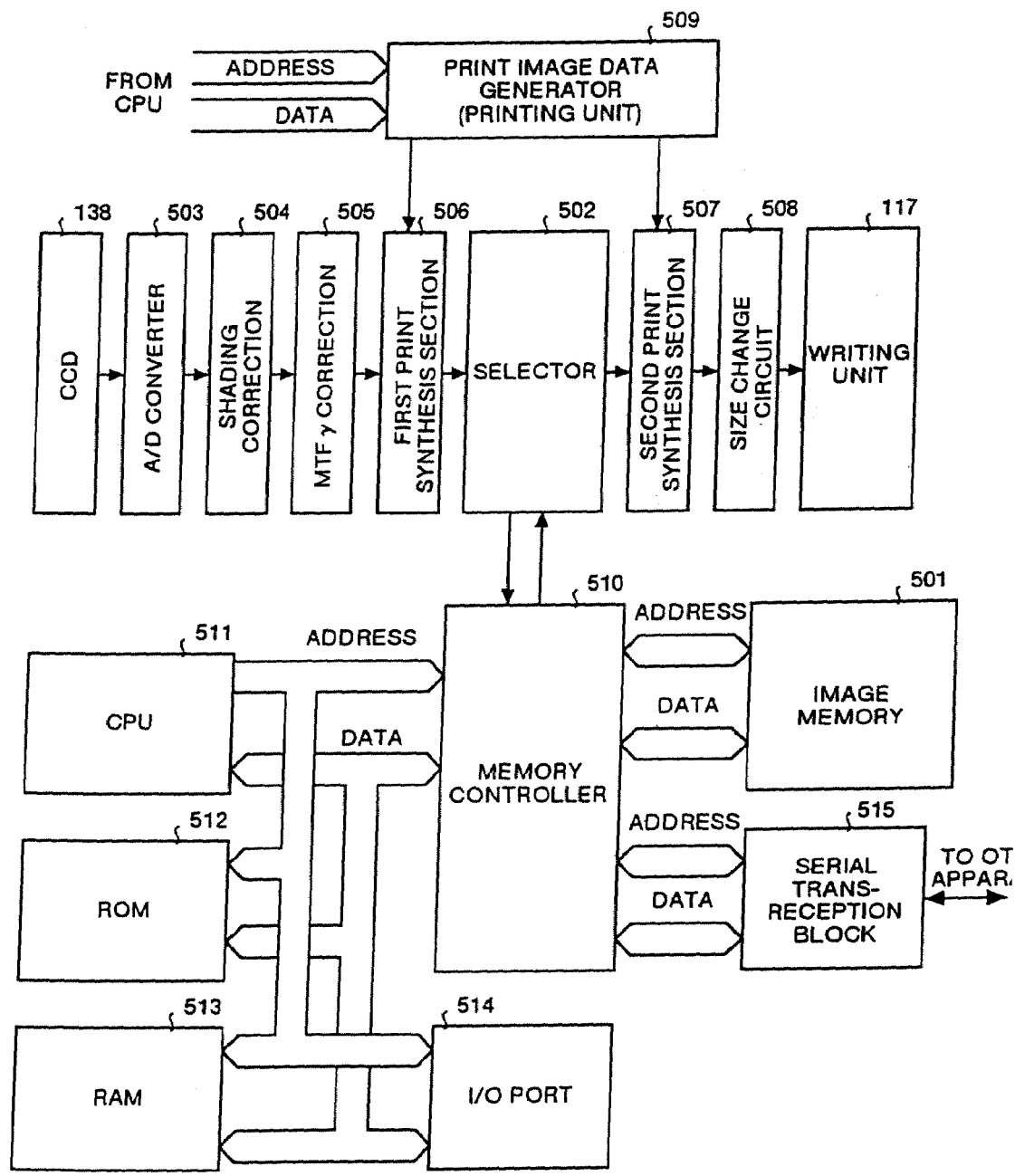
FIG. 16 is a block diagram showing detail configuration of an image processing section shown in FIG. 4.

Configuration of the Image Processing Unit (IPU) in the Digital Copying Machine:

FIG. 16 shows configuration of an image processing section (comprising the image reading section 402 and image writing section 403) according to the first embodiment of the present invention. Configuration of the image processing section is described below with reference to FIG. 16. A laser beam irradiated from an exposure lamp lights up a surface of a document, and an image of the document is focused by a focusing lens (not shown) onto a CCD image sensor 138 of the reading unit 106. The CCD image sensor 138 in the reading unit 106 generates image data (an analog electric signal) by subjecting the received document image to photo-electric transfer, and the image data is converted by an A/D converter 503 to a digital signal. The digital signal is subjected to shading correction in a shading correction circuit 504, and then to MTF correction and γ correction in an MTFγ correction circuit 505.

The selector 502 supplies image data inputted from the MTFγ correction circuit 505 via a first print synthesis section 506 to a size-change circuit 508 via a second print synthesis section 507, or to a memory controller 510, and the image data having passed the size change circuit 508 is enlarged or compressed according to a magnification and is sent to the writing unit 117.

Image data can be transacted bi-directionally between the memory controller 510 and the selector 502. Although not clearly shown in FIG. 16, it is assumed herein that the image processing unit (IPU) has a function of selectively inputting or outputting a plurality of types of data so that, in addition to the image data inputted from the reading unit 106, also image data supplied from outside via an I/O port 514 or a serial trans-reception block 515 such as data inputted from a data processing unit such as a personal computer can be processed.

The image processing unit (IPU) further comprises a CPU 511 which sets various types of information (instructions) in the memory controller 510 or the like and provides controls over the reading unit 106 and writing unit 117, and a ROM 512 and a RAM 513 in which programs for the CPU 511 or data is stored. The CPU 511 can write data into or read data from the image memory 501 via the memory controller 510.

Figure 18:
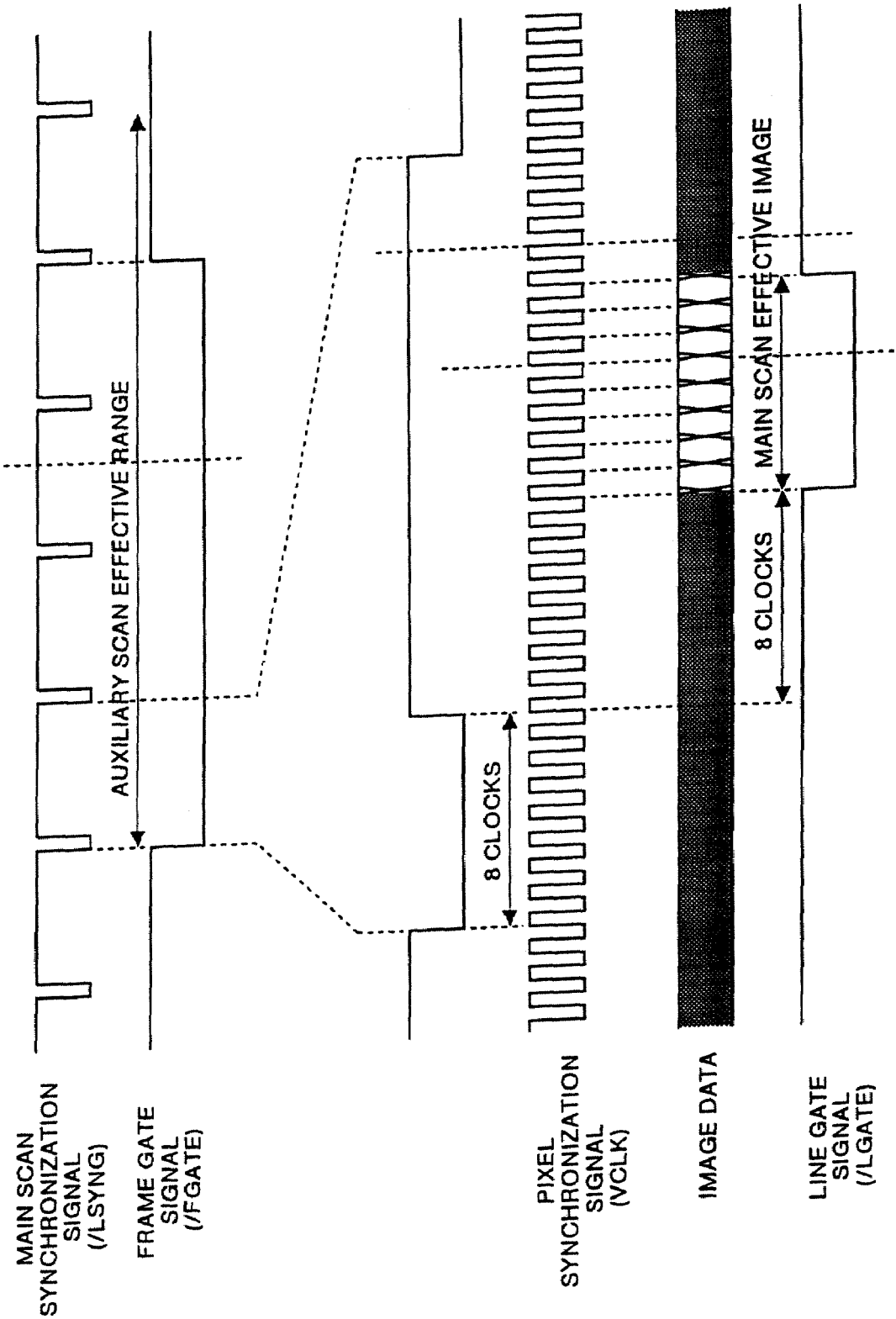
FIG. 18 is a timing chart showing an image signal for one page.

Image for one page in the selector 502 is described in detail with reference to FIG. 18. FIG. 18 is a timing chart for image data for one page. A frame gate signal (described as /FGATE hereinafter) expresses a valid period in the auxiliary scanning direction for the image data for one page. A main scanning synchronization signal (described as /LSYNC hereinafter) is generated for one line, and the image data is validated at a specified clock after first rise of /LSYNC.

A signal indicating that image data in the main scanning direction is valid is a line gate signal (described as /LGATE hereinafter). The /LGATE, /LSYNC, and /LGATE signals are synchronized to a pixel synchronization signal (described as VCLK hereinafter), and data for one pixel is sent within one cycle of VCLK.

The IPU has a function of discretely generating the /FGATE, /LSYNC, /LGATE, and VCLK signals for image input and mage output respectively, and can realize various combinations of image input and output by executing phase adjustment or other necessary adjustment when it directly outputs the read document image (image data).

Figure 17:
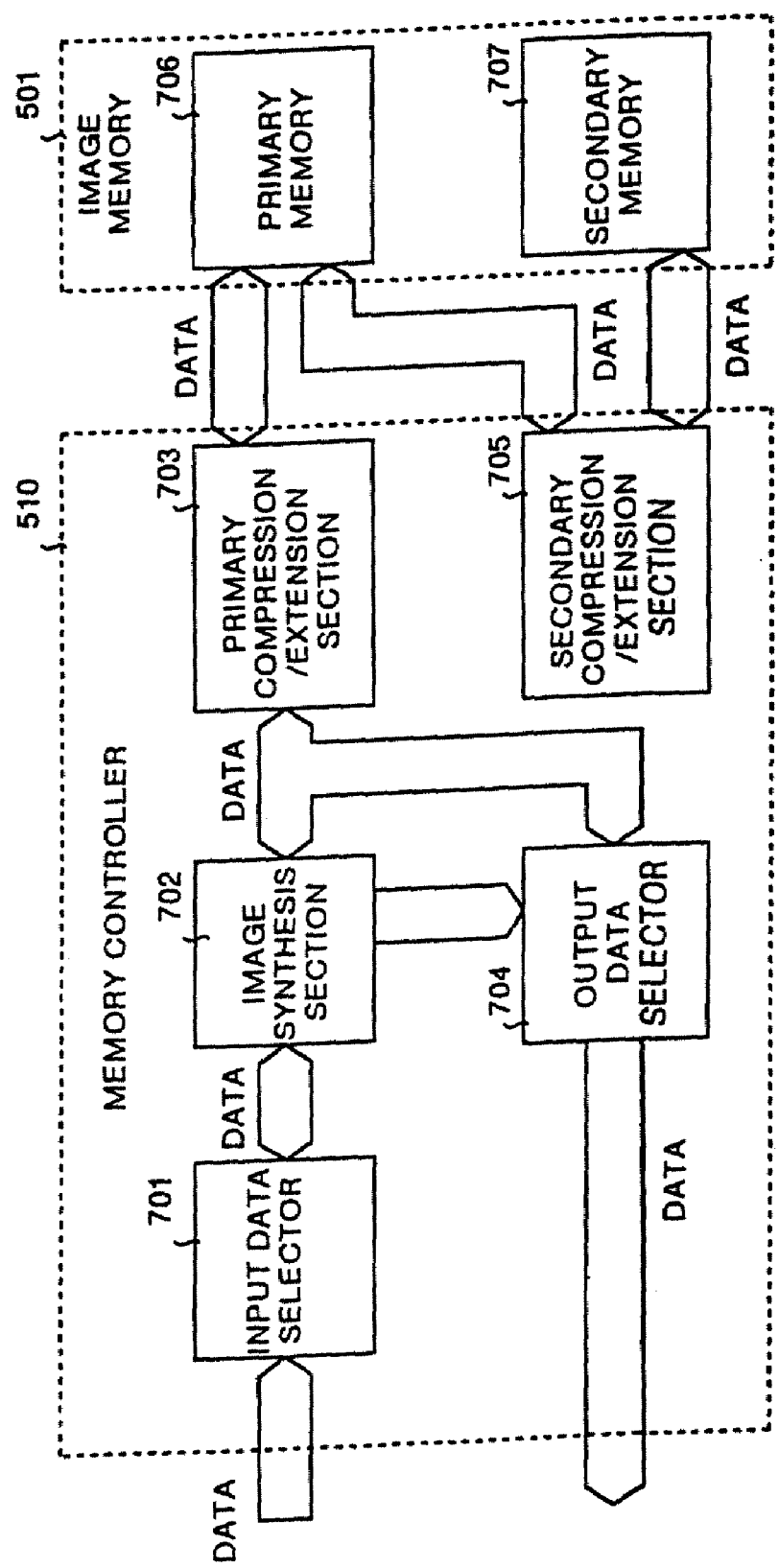
FIG. 17 is a block diagram showing detail configuration of the memory controller and an image memory.

The memory controller 510 and image memory 501 are described in detail below with reference to FIG. 17. FIG. 17 shows a detail configuration of the memory controller 510 and the image memory 501. The memory controller 510 has an input data selector 701, an image synthesis section 702, a primary compression/extension section 703, an output data selector 704, and a secondary compression/extension section 705. Control data for each of the system components above is set by the CPU 511. The address and data shown in FIG. 16 show an address of image data and the data. Data and address for control data inputted into or outputted from the CPU 511 are not shown in this figure.

The image memory 501 comprises a primary memory 706 and a second memory 707. As the primary memory 706, a device enabling high speed access to a DRAM or the like is used so that image data can be written into or red out from the image memory 501 substantially in synchronism to a transfer rate of the inputted image data. The primary memory 706 can simultaneously execute input and output of image data by dividing a memory area into a plurality of areas according to a volume of image data to be processed. (For that purpose, an interface section with the memory controller 510 is used, although not shown herein.)

To enable concurrent input and output of image data into or from each of the divided area, two pairs of address data line for read and write are connected to an interface section with the memory controller 510. With this configuration, an image can be outputted (read) from an area 2 while an image is inputted (written) into an area 1.

The secondary memory 707 is a large capacity memory used to store therein data for synthesizing or sorting inputted images. By using elements enabling high speed access in both the primary memory 706 and secondary memory 707, data processing can be executed equivalently in both the primary memory 706 and secondary memory 707, and in addition the memory controller 510 can be controlled easily. However, a DRAM is rather expensive, so that, in this embodiment, data I/O is executed by using elements enabling high speed access only in the primary memory 706. It is needless to say that high speed elements such as a DRAM may be used not only in the primary memory 706, but also in the secondary memory 707.

As described above, by forming the image memory 501 with the primary memory 706 and secondary memory 707, it is possible to realize a digital copying machine which enables input/output, storage, and processing of a large quantity of image data with relatively simple configuration. Concentrated images generated by the concentrate copy function are written into and stored in the primary memory 706 in an arrayed form just like being written on a sheet of recording paper.

An outline of the operations executed by the memory controller 510 are described below. At first an operation for inputting an image (storing image data into the image memory 501) is described below.

The input data selector 701 selects image data to be written into an image memory (primary memory 706) from a plurality of data. The image data selected by the input data selector 701 is supplied to an image synthesis section 702. The image synthesis section 702 synthesizes the image data with data already stored in the image memory 501. Image data processed in the image synthesis section 702 is subjected to data compression by the primary compression/extension section 703, and the compressed data is written into the primary memory 706. The data written into the primary memory 706 is further subjected to compression by the secondary compression/extension section 705 according to the necessity, and is stored in the secondary memory 707.

An operation for outputting an image (for reading image data from the image memory 501) is described below. In this process, at first, image data stored in the primary memory 706 is read out. When an image to be outputted is stored in the primary memory 706, image data stored in the primary memory 706 is extended in the primary compression/extension section 703, and the extended data, or data obtained by synthesizing the extended data with input data is selected by the output data selector 704, thus the image data being outputted.

The image synthesis section 702 executes such processing as synthesis of data stored in the primary memory 706 with inputted data (with an image data phase adjustment function) and selection of a destination to which the synthesized data is outputted (output of an image, write-back to the primary memory 706, and simultaneous output to both destinations for output).

When an image to be outputted is not stored in the primary memory 706, input data which is stored in the secondary memory 707 and is to be outputted is extended in the secondary compression/extension section 705, the extended data is written into the primary memory 706, and then the image output operation as described below is executed.

Figure 13:
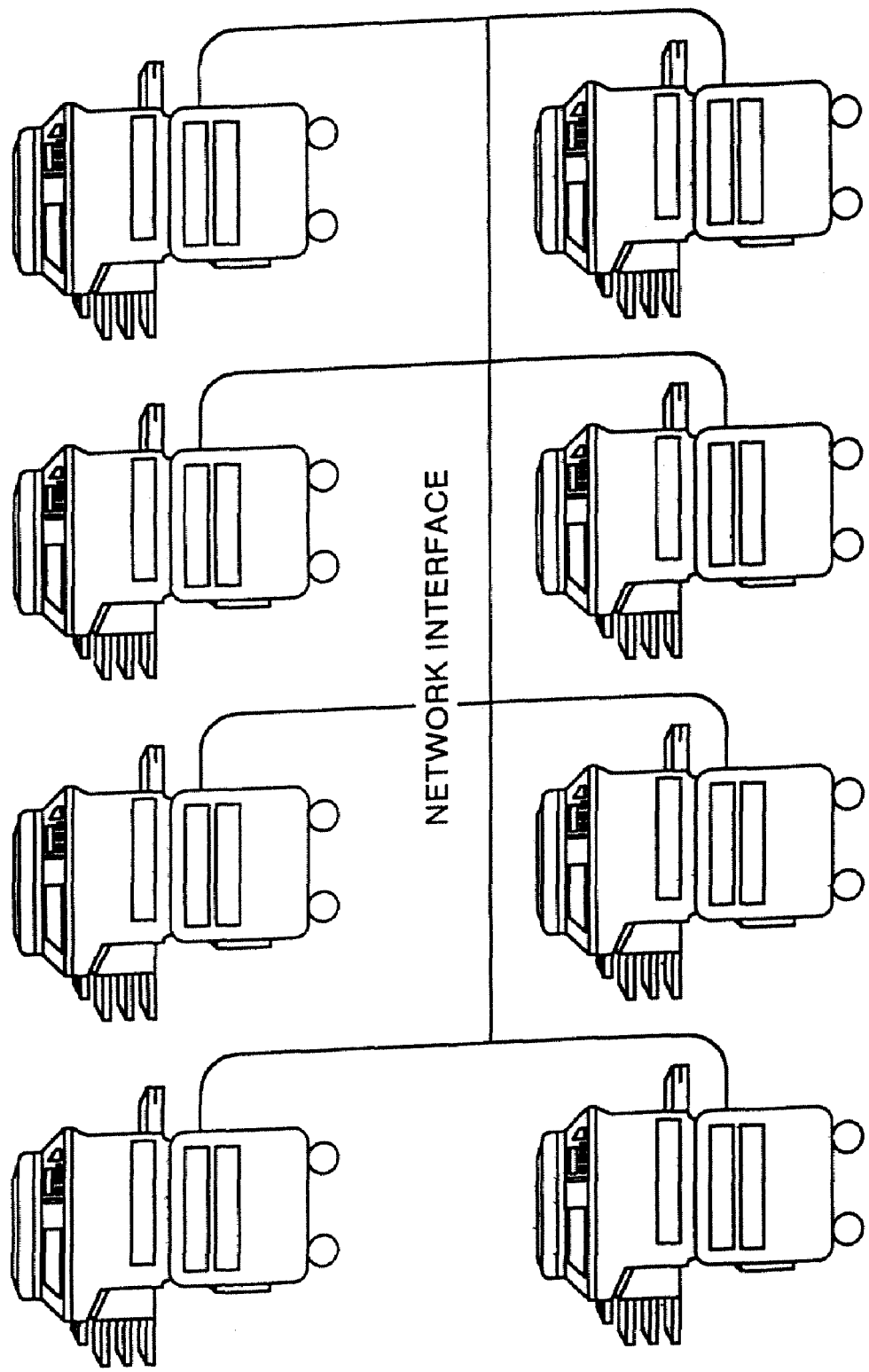
FIG. 13 is a view showing an example of a copying machine network system.

Configuration of the Digital Copying Machine Network System:

FIG. 13 shows a copying machine network system in which a plurality of digital copying machine according to the first embodiment of the present invention are connected to each other (A digital copying machine constituting the copying machine network is described as "network copying machine" hereinafter). As shown in FIG. 13, a plurality of digital copying machines are connected to each other through a network interface. FIG. 13 shows an example in which eight units of digital copying machines are networked. The number of units of digital copying machines connected to each other is not limited to the example described above. Any number of units can be connected to each other. Further, different types of digital copying machines may be connected to each other on the condition that mutual communications is possible between the digital copying machines.

Various ways such as use of the Ethernet as a physical means and use of TCP/IP (Transmission Control Protocol/Internet Protocol) communications which is an OSI (Open System Interface) reference model for data communications can be considered as the means for network communications. With the configuration as shown in FIG. 13, not only image data, but also information concerning an intra-machine state of each machine present on the network, and control command or set commands such as the remote output command described later are transferred.

Figure 14:
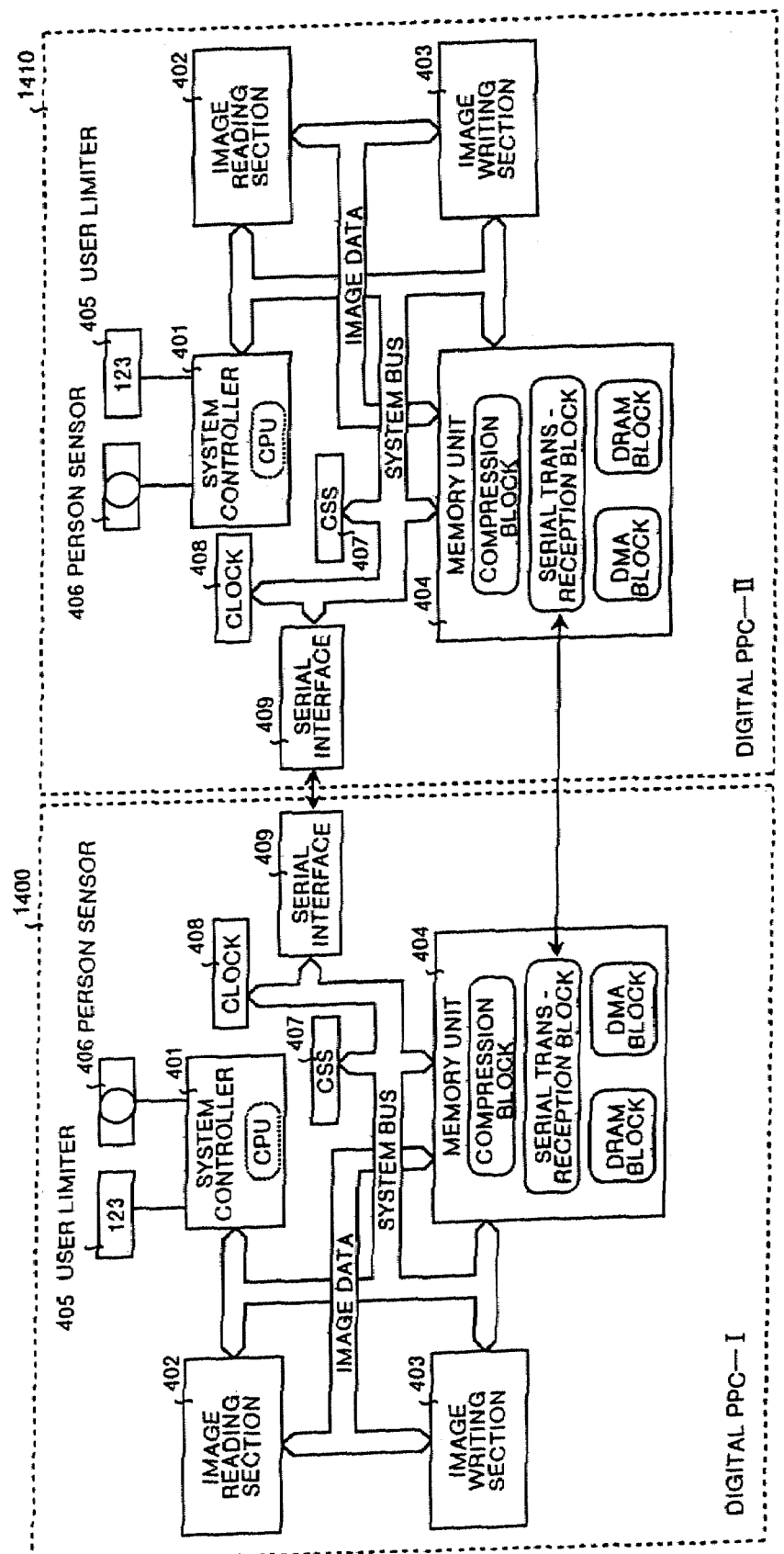
FIG. 14 is a view showing hardware configuration of a network copying machine.

Digital Copying Machine System:

FIG. 14 shows an example in which two units of digital copying machines (digital PPC-I) 1400, and (digital PPC-II) 1410 are connected to each other peer-to-peer. Hardware configuration of the digital copying machines 140010 of in FIG. 14 is the same as that of the digital copying machine shown in FIG. 11. Image data is transferred via a serial trans-reception block between the digital copying machines 1400 and 1410, and the received image data is once stored in the DRAM block. Further, control data such as control commands or set commands are transferred between the digital copying machines through the serial interface 409. Although a serial interface is used in this example, image data and control data may be transferred by using the SCSI (Small Computer System Interface).

When the link copy mode is executed by the digital copying machines 1400, 1410, the machine in which the link copy key 310 is pressed to effect the link copy mode functions as a master machine (an operating machine). The master machine sends a request for linkage to a digital copying machine (slave machine) to be linked thereto and executed the link copy mode. In this link copy mode, image data for a document read by the master machine is transferred to the slave machine, and is printed by both the master machine and slave machine. Namely a copy job is shared by the master and slave machines. The digital copying machines 1400, 1410 are connected to each other peer-to-peer, so that each machine can function as both a master machine and a slave machine. In the following description, it is assumed that the digital copying machines 1400 functions as a master machine and the digital copying machine 1410 functions as a slave machine.

Operation for transferring an image read by the "digital PPC-I" to an image writing section in the "digital PPC-II"

Figure 15:
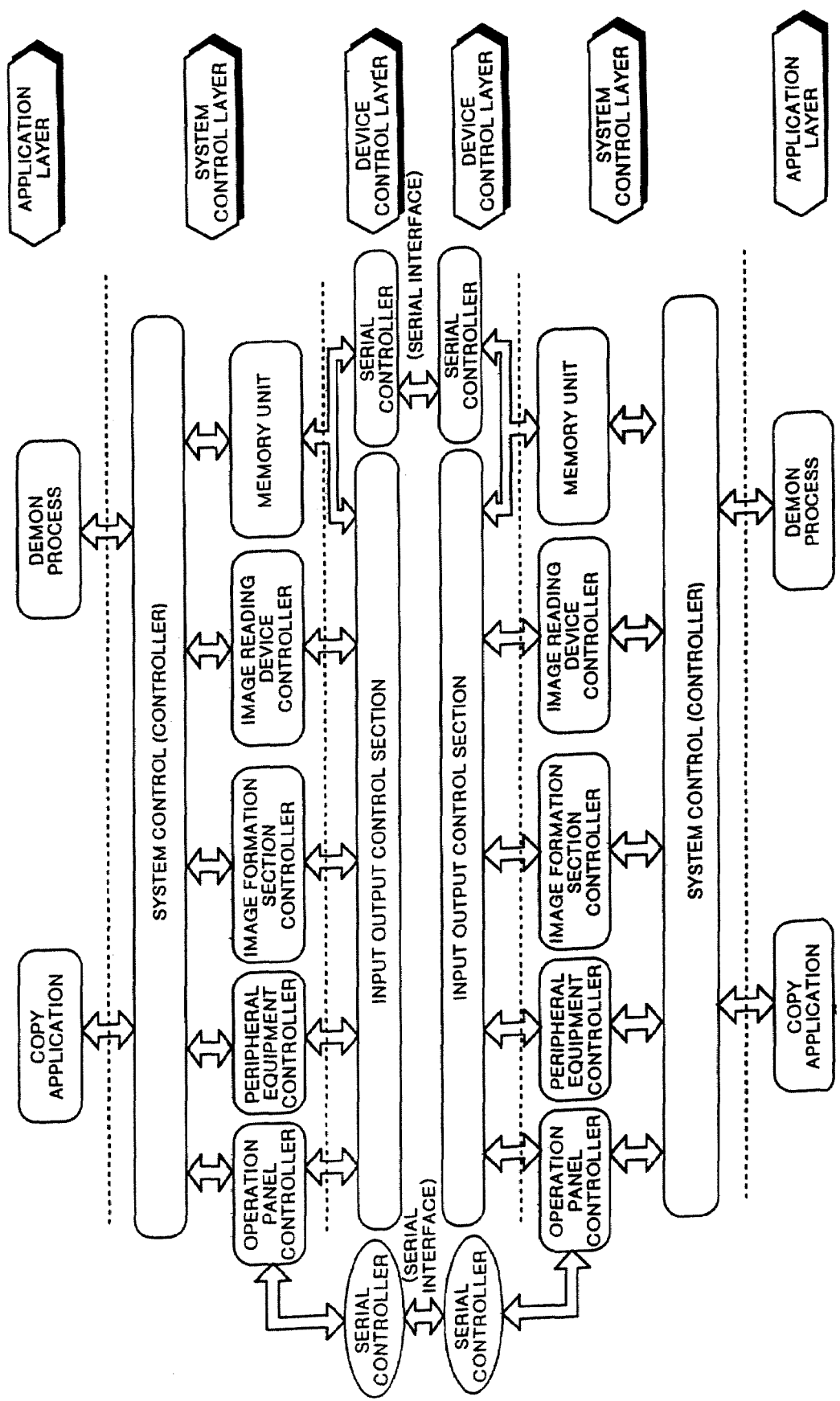
FIG. 15 is a conceptual view showing software configuration of the network copying machine.

(the operation is described as "remote output" hereinafter) is described below with reference to FIG. 15. FIG. 15 is a conceptual diagram showing software of the digital copying machines 1400, 1410 (digital PPC-I and digital PPC-II).

In FIG. 15, "copy application" indicates an application for executing a copy sequence to execute a copy operation, "input/output control" indicates a layer (device driver) for logically or physically converting data, and the operation panel controller indicates a layer for executing MMI (Man Machine Interface) (a layer for executing such operations as LCD display, LED ON/OFF, and key entry scan at a logic level). Further, the "peripheral machine controller" indicates a layer for providing controls over peripheral machines attached to a PPC such as an automatic two side copy unit, a sorter, or an ADF at a logic level, and the "image formation section controller", "image reader controller", and "memory unit" are as described above.

The "demon process" is present there as an application for reading out image data stored in the memory unit when a print request is received from other machine on the network and transferring the image data to the "image formation section". It is needless to say that transfer of an image from the other machine on the network must be finished before an image is read from the memory unit and printed in the "demon process".

The operation panel, peripheral devices, image formation section, image reader, and memory unit are treated as resources owned by each PPC. When the "digital PPC-I" shown in the figure executes a copy operation using each of the resources provided in itself (when the print start key is pressed", the "digital PPC-I" demands the "system controller" to allow use of each resource such as an "image formation device", an "image reader", "peripheral devices", and "memory unit" according to the necessity.

The "system control" section arbitrates conflicts over the right to use each resource in response to a request from the "copy application", and reports the result of arbitration (whether the requested resource is available or not) to the "copy application". When the "digital PPC-I" is used as a stand-alone machine (not connected to a network), all of resources owned by the system can be occupied by the "copy application", so that a copy operation is immediately started. When a printing operation is executed by utilizing resources of other machine present on the network (described as a remote digital PPC hereinafter), the right for use of the resources is demanded to the "system controller" in the remote digital PPC.

The system controller in the remote digital PPC (slave machine) arbitrates conflicts over the resources according to the request, and reports the result of arbitration to an application in the machine having sent the request. When the right for use of the application is allowed, the remote digital PPC reads an image, stores the image in a memory unit in the remote digital PPC itself. When the image is stored, the remote digital PPC transfers the image to a memory unit in a machine as a destination for remote output through an interface. When the image transfer is over, the remote digital PPC transmits various conditions for execution of a printing job (such as a paper-feed port, a paper-discharge port, a number of sheets to be printed) to a "demon process" in the machine as a destination for remote output, and then transmits the "print start" command. When the "demon process" at the destination for remote output receives the "print start" command, the "demon process" sends a request for starting printing to the "system controller" in the machine (which executes remote output), thus remote output being executed by the system controller.

When a memory unit in the "digital PPC-II" is used by the "digital PPC-I", the memory unit in the "digital PPC-II" can not be used excluding an application in the "digital PPC-II" (or digital PPCs other than the "digital PPC-I" when a plurality of digital PPCs are connected to each other on the network as shown in FIG. 13).

EXAMPLE OF OPERATIONS IN THE LINK COPY MODE

Operations of the digital copying machine system shown in FIG. 14 in the link copy mode are described below with reference to the flow chart.

EXAMPLE OF OPERATION 1-1

Figure 20:
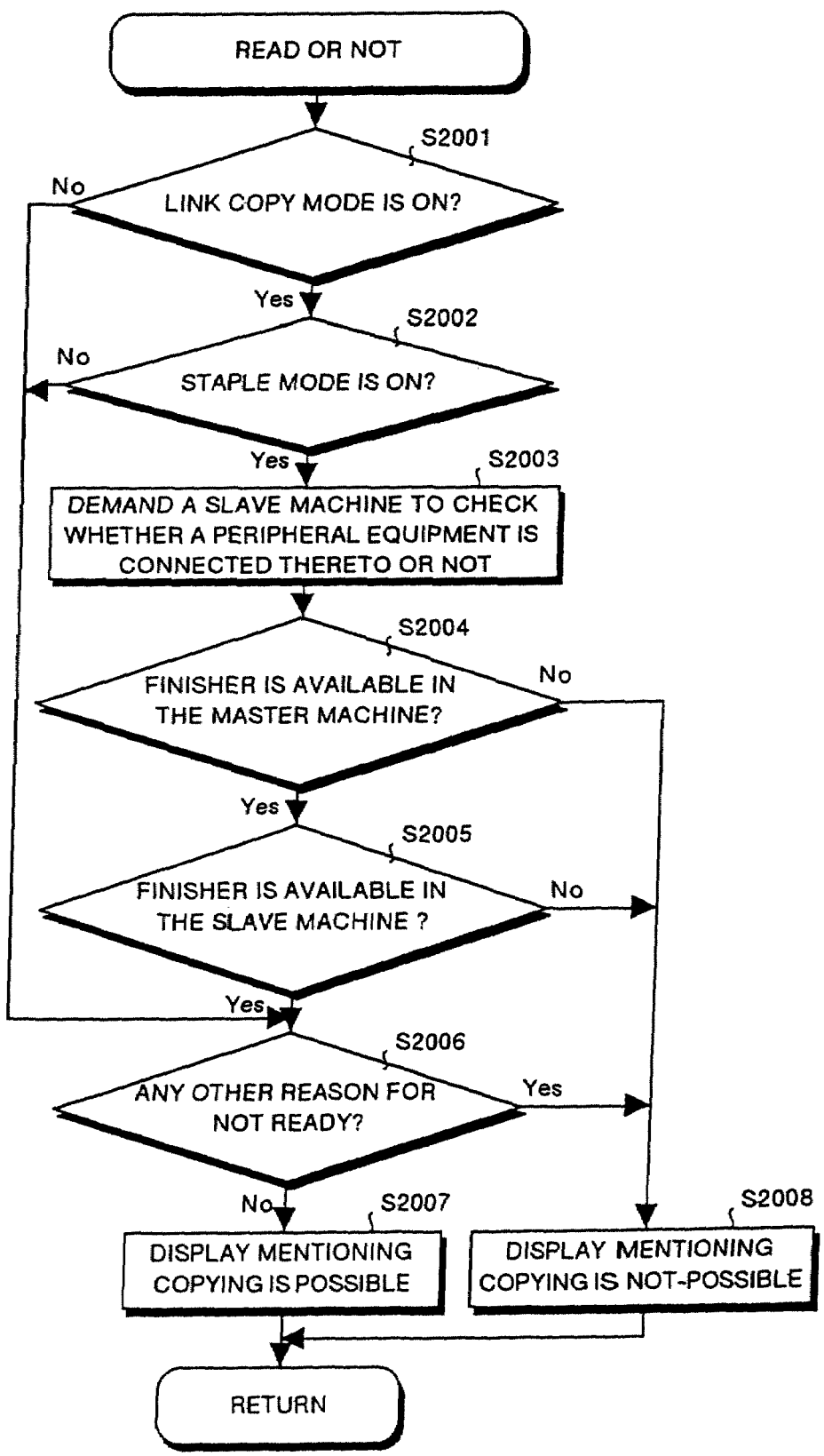
FIG. 20 is a flow chart showing a series of operations for determining whether copying is allowable according to a first embodiment of the present invention.

FIG. 20 is a flow chart showing operations for determining whether operations in the link copy mode are possible or not according to the first embodiment of the present invention. At first it is determined whether the digital copying machine 1400 is in the link copy mode or not (S2001). Namely it is determined whether the link copy mode is set by pressing the link copy key 301 on the liquid crystal touch panel 205 of the operation panel 201. When it is determined in this step that the digital copying machine 1400 is not in the link copy mode, the processing in step S2006 described below is executed. When it is determined that the digital copying machine 1400 is in the link copy mode (in the state shown in FIG. 5). it is determined whether the staple mode has been turned ON or not in the digital copying machine 1400 (master machine) (S2002). When it is determined in this step that the staple mode is not ON, the processing in step S2006 described below is executed. When it is determined that the staple mode is ON, the digital copying machine 1400 demands the digital copying machine (slave machine) 1410 to report whether any peripheral device is connected thereto or not (S2003).

In response to this demand, the slave digital copying machine 1410 sends information concerning connection of a peripheral equipments to the master digital copying machine 1400. The digital copying machine 1400 then determined whether a finisher 122 is connected or not to the local device (master machine) (S2004). When it is determined that the finisher 122 is not connected thereto, the digital copying machine 1400 displays a message on the operation panel 201 mentioning that the copy operation is not possible (S2008) with the system control returned to an initial step of the operation flow. On the other hand, when it is determined that the finisher 122 is connected to the local machine, the digital copying machine 1400 determines whether the finisher 122 is connected to the slave digital copying machine 1410 or not (S2005). If it is determined that the finisher 122 is not connected to the slave machine, the message is displayed on the operation panel 201 mentioning that the copy operation is not possible (S2008) with the system control returned to an initial step of the operation flow.

When it is determined in step S2005 that the finisher 122 is connected to the slave digital copying machine 1410, the digital copying machine 1400 determines whether there is any other cause disabling a copy operation (such as paper jamming, open door, or paper end) or not (S2006). When it is determined in this step that there is no specific cause disabling a copy operation, a message mentioning that a copy operation is possible is displayed on the operation panel 201 (S2007) with the system control returned to an initial step of the operation flow. On the contrary, when it is determined in this step that there is a specific cause disabling a copy operation, a message indicating that a copy operation is not possible is displayed on the operation panel 201 (S2008) with the system control returned to an initial step of the operation flow.

The operations described above are described in more detail below. The operations described above are executed when the operating mode is changed by an operator, or when an engine status (such as information on jamming, information on the door, information on supply (such as recording paper, or toner) changes. When both the link copy mode and staple mode are ON, the master machine sends to the slave digital copying machine 1410 a request for reporting whether any peripheral device is connected to the slave machine or not to check what functions are available in the slave digital copying machine 1410. More specifically, the master digital copying machine 1400 requests the slave digital copying machine 1410 to check whether the finisher 122 with a stapler 130 loaded thereon is available in the slave digital copying machine 1410 or not.

Figure 7:
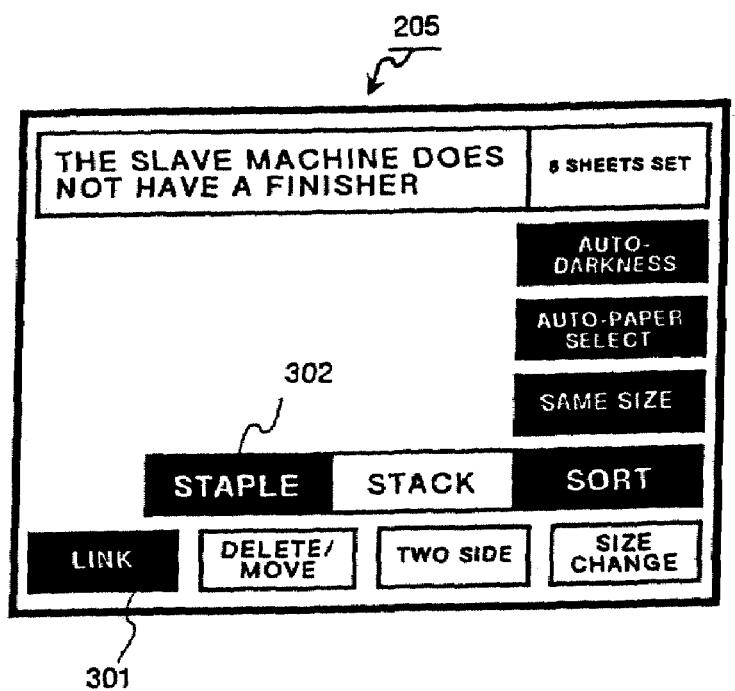
FIG. 7 is a view showing a display screen of the operation panel when the link copy mode and staple mode are set in a state where a finisher is not connected to the slave machines.

When the finisher 122 is present, the staple mode can be executed. When the finisher 122 is not present, the staple mode can not be executed. When the finisher 122 is not present in either one of the master digital copying machine 1400 and slave digital copying machine 1410, a message indicating that a copy operation is not possible is displayed on the operation panel 201. When the finisher 122 is present in both of the master and slave machines 1400, 1410, then whether there is any other cause (such as paper has jammed, the door is open, or the paper is not available). When it is determined that there is a specific cause disabling a copy operation, a message indicating that a copy operation is not possible is displayed on the operation panel 201. When it is determined that there is no specific cause disabling a copy operation, a message indicating that a copy operation is possible is displayed on the operation panel 201. FIG. 7 shows an example of display on the operation panel provided when the link copy mode and staple mode are set in a state where the finisher 122 is not connected to the slave digital copying machine 1410.

In the example of operation 1-1 described above, in the state where the link copy mode has been selected, when a mode which can not be executed in the master machine or slave machine (such as the staple mode) is selected, the link copy operation is inhibited. Because of this configuration, when a user sets a mode which can not be executed in the link copy mode, generation of a copy mistake can be prevented.

EXAMPLE OF OPERATION 1-2

Figure 21:
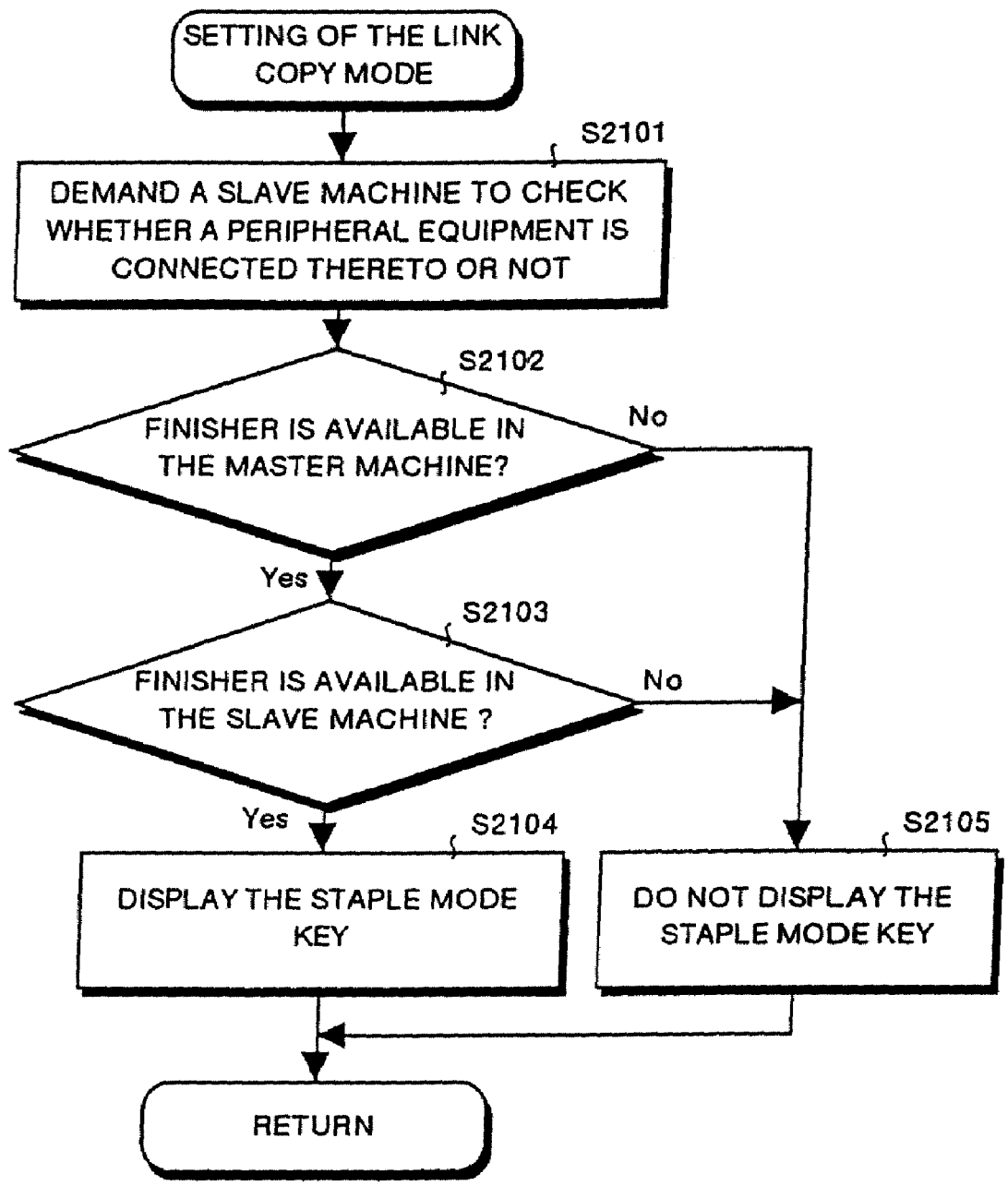
FIG. 21 is a flow chart showing the example (1) of link copy mode setting according to the first embodiment.

FIG. 21 is a flow chart showing an example of the link copy mode (1) according to the first embodiment of the present invention. FIG. 21 shows the operations executed when the link copy key 301 is pressed and the link copy mode is effected. When the link copy mode is set in the master digital copying machine 1400, the master digital copying machine 1400 demands the slave machine 1400 to check whether any peripheral device is connected thereto or not (S2101). In response to this request, the slave digital copying machine 1410 sends information concerning connected of a peripheral equipments to the master digital copying machine 1400. The master digital copying machine 1400 determines whether the finisher 122 is present in the master digital copying machine 1400 or not (S2102). When it is determined that the finisher 122 is not present in the master digital copying machine 1400, the master digital copying machine 1400 does not display the staple mode key 302 (S2105) with the system control returned to an initial step of the operation flow.

When it is determined in step S2102 that the finisher 122 is present in the master digital copying machine 1400, the master digital copying machine 1400 further determines whether the finisher 122 is present in the slave machine 1411 or not (S2103). When it is determined in this step that the finisher 122 is not present in the slave digital copying machine 1410, the staple mode key is not displayed (S2105) with the system control returned to an initial step of the operation flow. On the contrary, when it is determined that the finisher 122 is present in the slave machine 1400, the master digital copying machine 1400 displays the staple mode key 302 with the system control returned to an initial step of the operation flow.

Figure 8:
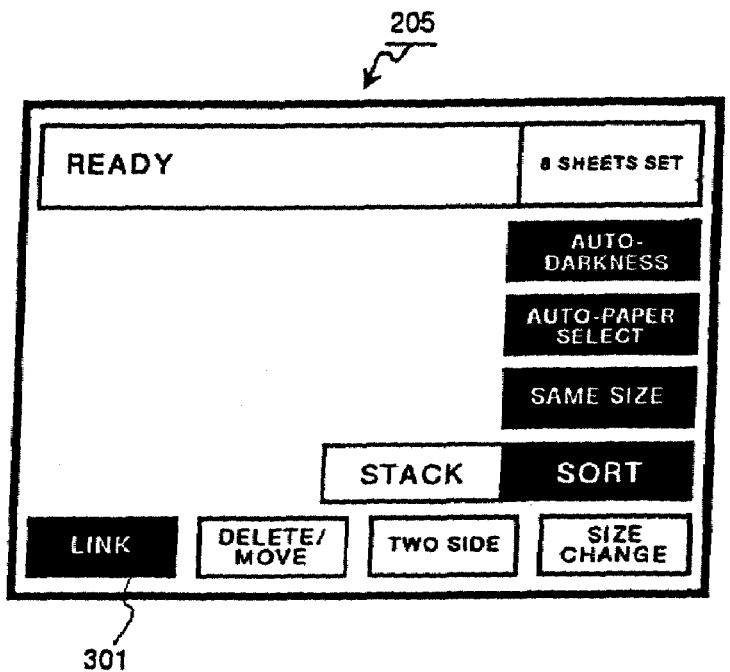
FIG. 8 is a view showing a display screen of the operation panel when the link copy mode is set in a state where a finisher is connected to the slave machines.

Namely when the finisher 122 is present in both of the master digital copying machine 1400 and slave digital copying machine 1410, the staple mode key 302 is displayed, and otherwise the staple mode key 302 is not displayed. With this configuration, it is possible to prevent a staple mode which can not be executed in the link copy mode from being set. FIG. 8 shows an example of display on the operation panel 201 when the link copy mode is set in a state where the finisher 122 is connected to the slave 1410. Before the link copy mode is set, the staple mode key 302 is displayed as shown in FIG. 4, but after the link copy mode is set, the staple mode key 302 is not displayed.

In the example of operation 1-2 described above, in the state where the link copy mode has been selected, when a mode which can not be executed in the master machine or slave machine is selected, a select key for the corresponding function is not displayed. Because of this configuration, when a user tries to set a mode which can not be executed both in the master and slave machines 1400, 1410, generation of a mistakes in copying can be prevented, which improves the operability.

EXAMPLE OF OPERATION 1-3

Figure 22:
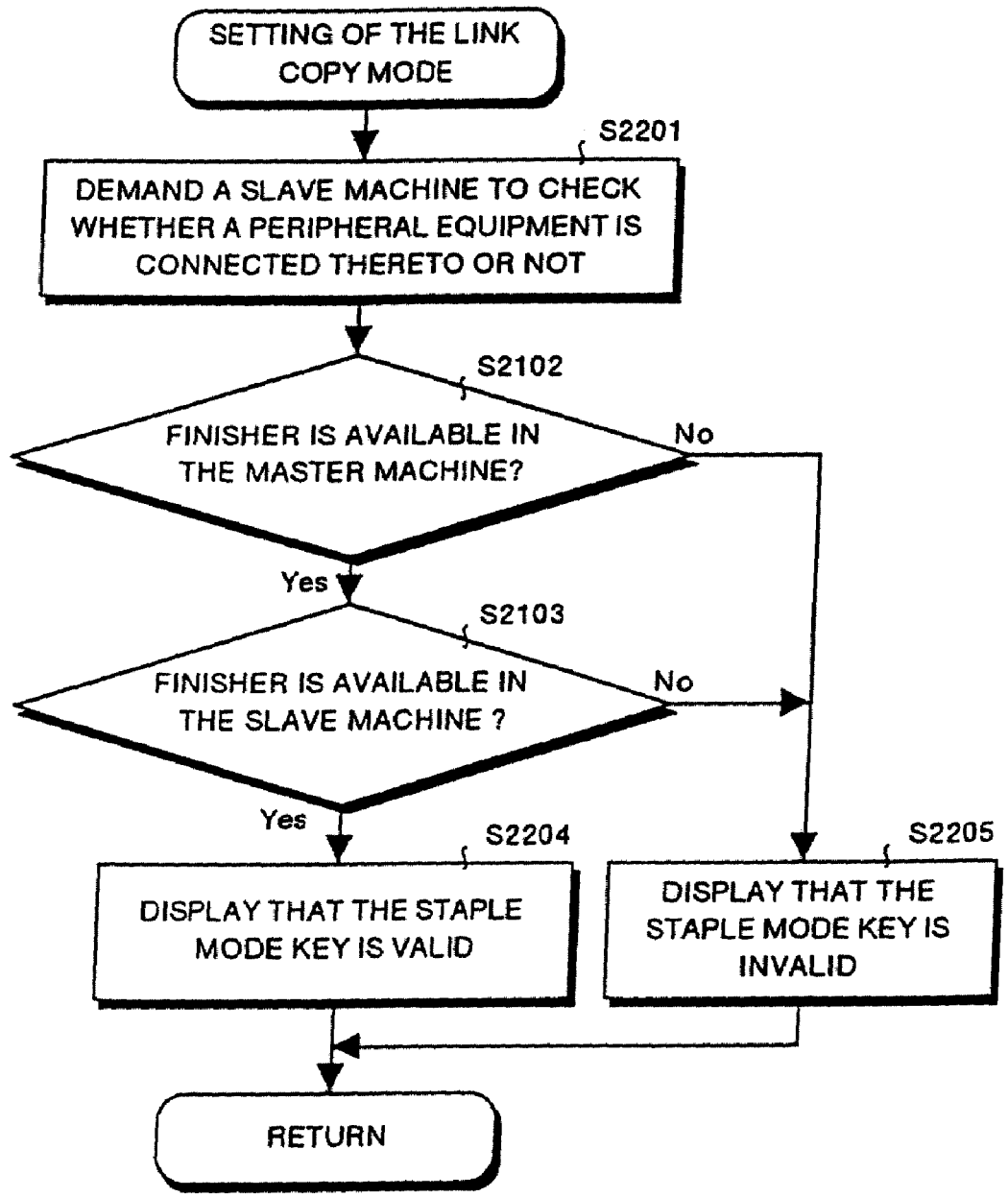
FIG. 22 is a flow chart showing the example (2) of link copy mode setting according to the first embodiment.

FIG. 22 is a flow chart showing an example of the link copy mode (2) according to the first embodiment of the present invention. FIG. 22 shows the operations executed when the link copy key 301 is pressed and the link copy mode is set. When the link copy mode is set, the master digital copying machine 1400 at first demands the slave digital copying machine 1410 to report a connection state of a peripheral equipments (S2201). In response to this request, the slave digital copying machine 1410 sends to the master digital copying machine 1400 the information concerning a connection state of a peripheral equipments. The master digital copying machine 1400 determines whether the finisher 122 is present in the master digital copying machine 1400 or not (S2202). When it is determined that the finisher 122 is not present in the master digital copying machine 1400, the master digital copying machine 1400 displays a message indicating that the staple mode key 302 is invalid (S2105) with the system control returned to an initial step of the operation flow.

On the contrary, when it is determined in step S2202 that the finisher 122 is present in the master digital copying machine 1400, the master digital copying machine 1400 further determines whether the finisher 122 is present in the slave digital copying machine 1410 or not (S2203). When it is determined that the finisher 122 is not present in the slave digital copying machine 1410, the master digital copying machine 1400 displays a massage that the staple mode key 302 is invalid (S2205) with the system control returned to an initial step of the operation flow. On the contrary, when it is determined that the finisher 122 is present in the slave digital copying machine 1410, the master digital copying machine 1400 displays a message that the staple mode key 302 is valid (S2204) with the system control returned to an initial step of the operation flow.

Figure 9:
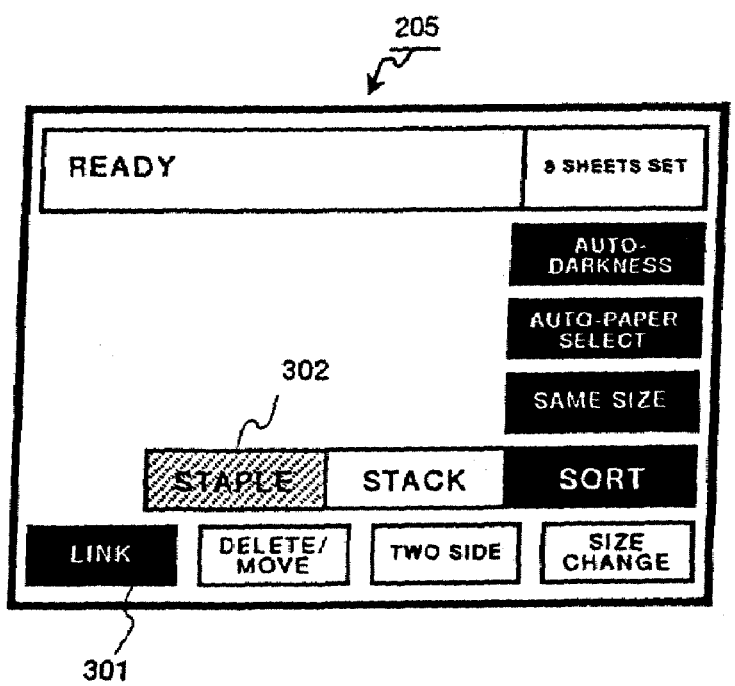
FIG. 9 is a view showing a display screen of the operation panel when the link copy mode is set in a state where a finisher is connected to the slave machines.

Namely when the finisher 122 is present in both of the master digital copying machine 1400 and slave digital copying machine 1410, display indicating that the staple mode key 302 is valid is provided, and otherwise a message indicating that the staple mode key 302 is invalid is provided. Because of this configuration, it is possible to prevent the staple mode which can not be executed in the link copy mode from being set. FIG. 9 shows an example of display on the operation panel 201 when the link copy mode is set in the state where the finisher 122 is not connected to the salve device 1410. Herein by differentiating the staple mode key 302 from other function keys (with, for instance, a half-tone display), invalidity of this key is indicated.

In the example of operation 1-3 described above, in a state where the link copy mode has been selected, when a mode which can not be executed in a master machine or in a slave machine, invalidity of the select key for the corresponding function is displayed. Because of this configuration, when a user tries to set a mode which can not be executed in the link copy mode, generation of a mistake in a copy operation can be prevented with the operability improved.

EXAMPLE OF OPERATION 1-4

Figure 23:
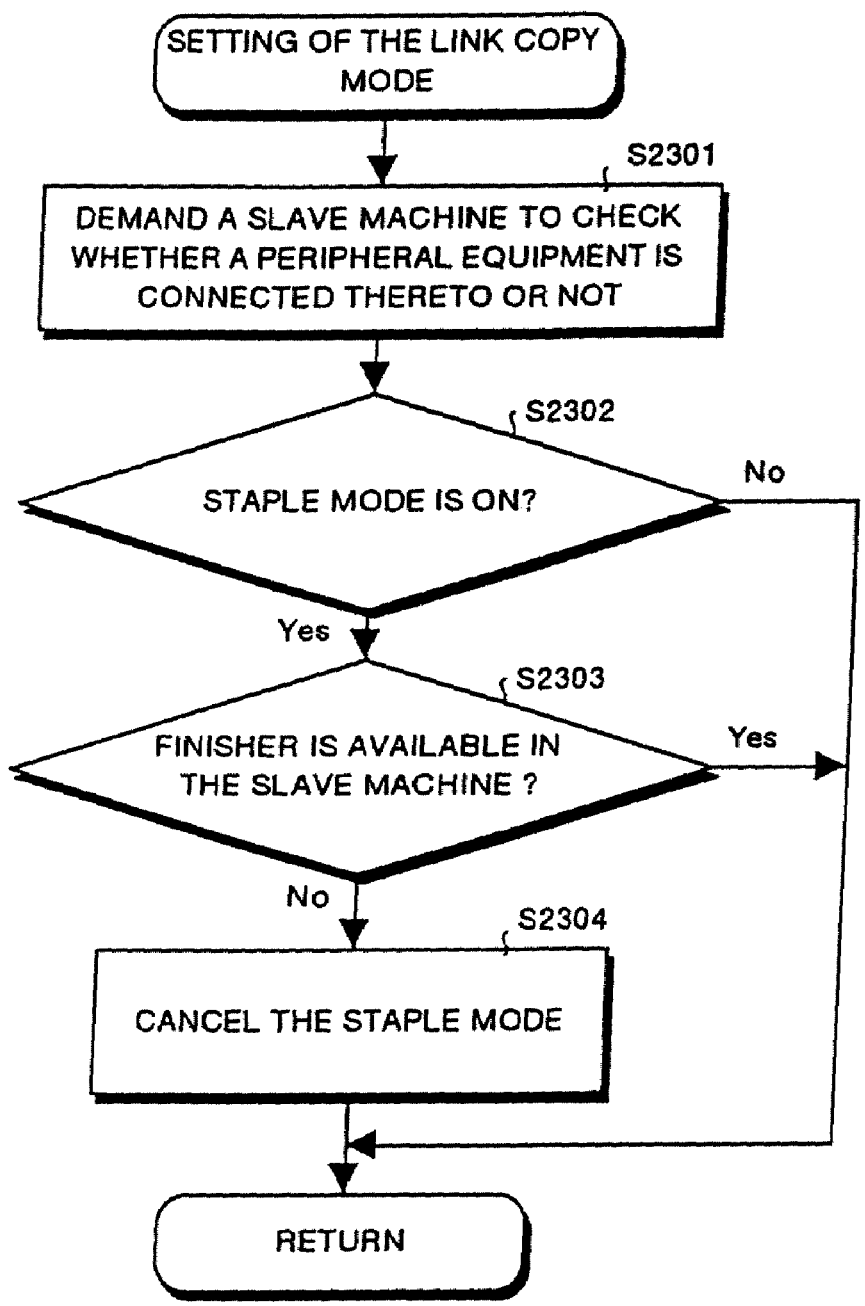
FIG. 23 is a flow chart showing the example (3) of link copy mode setting according to the first embodiment.

FIG. 23 is a flow chart showing an example of operation (3) in the link copy mode according to the first embodiment of the present invention. This figure shows a case where the link copy key 301 is pressed and the link copy mode is effected. When the link copy mode is set, at first, the digital copying machine (master machine) 1400 demands the slave digital copying machine 1410 to report whether any peripheral equipment is connected to the slave digital copying machine 1410 or not (S2301). In response to this request, the slave digital copying machine 1410 sends information concerning a connection state of the peripheral equipments to the master digital copying machine 1400. The master machine then determines whether the staple mode is ON or not (S2302). When it is determined that the staple mode is ON, the master digital copying machine 1400 further determines whether the finisher 122 is present in the slave digital copying machine 1410 or not (S2303). When it is determined that the finisher 122 is not present in the slave digital copying machine 1410, the master digital copying machine 1400 cancels the staple mode with the system control returned to an initial step of the operation sequence.

Figure 10:
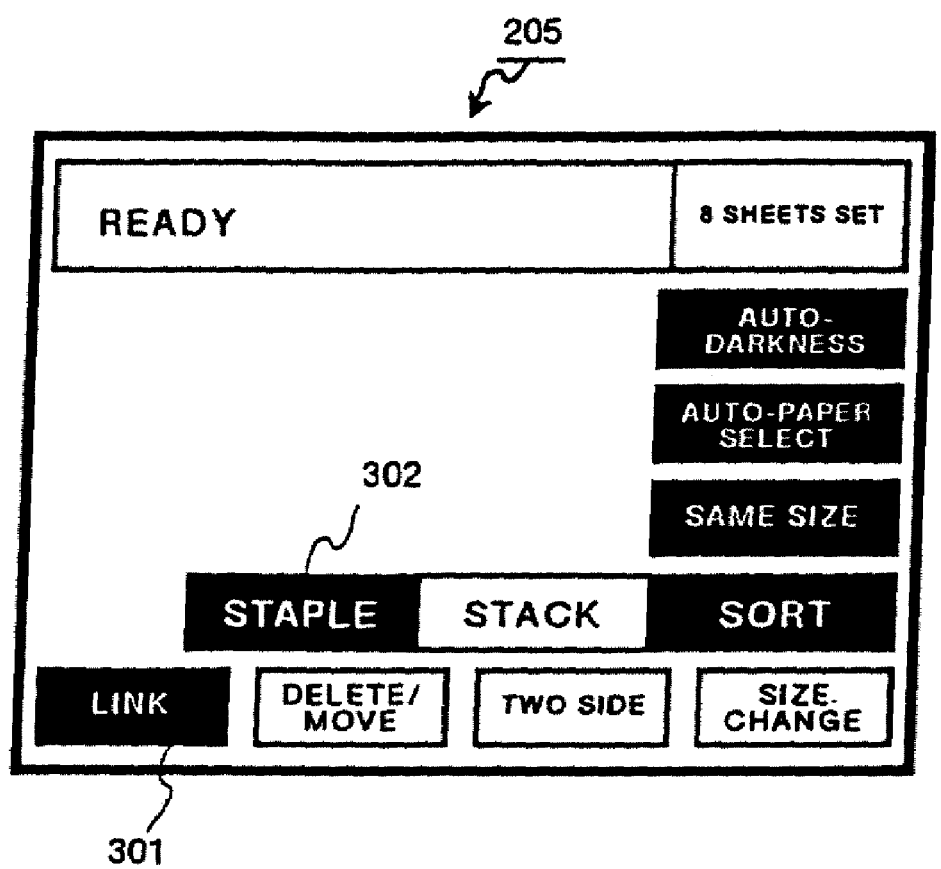
FIG. 10 is a view showing a display screen of the operation panel when the staple mode is selected independently.

Namely, when the staple mode has been set but the finisher 122 is not present in the slave digital copying machine 1410, the staple mode is automatically canceled. Because of this configuration, the contradiction that a mode which can not be executed in the link copy mode is set can be prevented. FIG. 10 shows an example of display on the operation panel when the staple mode is independently selected. When the link copy mode is set in a state where the finisher 122 is connected to the slave digital copying machine 1410, the staple mode is canceled, and the display shown in FIG. 5 is provided.

In the example of operation 1-4 described above, in a state where the link copy mode has been selected, a mode which can not be executed in the master machine or slave machine, the link copy mode is automatically cancelled. Because of this configuration, it never occurs in the link copy mode that a user sets a mode which can not be executed in both of the master and slave machines, which insures improved operability in the link copy mode.

A second embodiment of the present invention is described below with reference to FIG. 24 to FIG. 38. Basic configuration of the digital copying machine according to the second embodiment of the present invention is the same as that according to the first embodiment. Examples of operations of the digital copying machine shown in FIG. 14 are described herein.

SET KEYS ON THE OPERATION PANEL AND EXAMPLES OF SCREEN SHIFT

Figure 24:
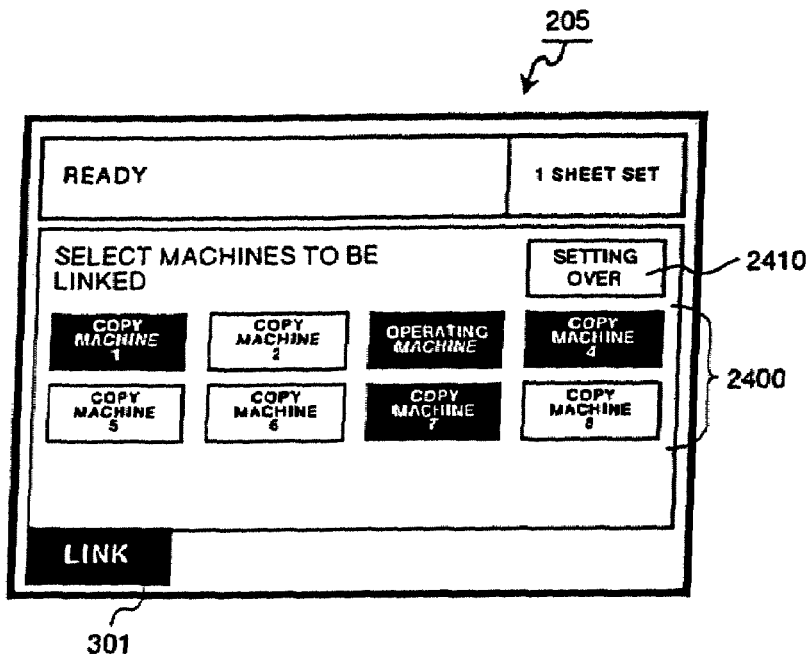
FIG. 24 is a view showing an example of a screen when the link copy key is pressed to set the link copy mode.
Figure 25:
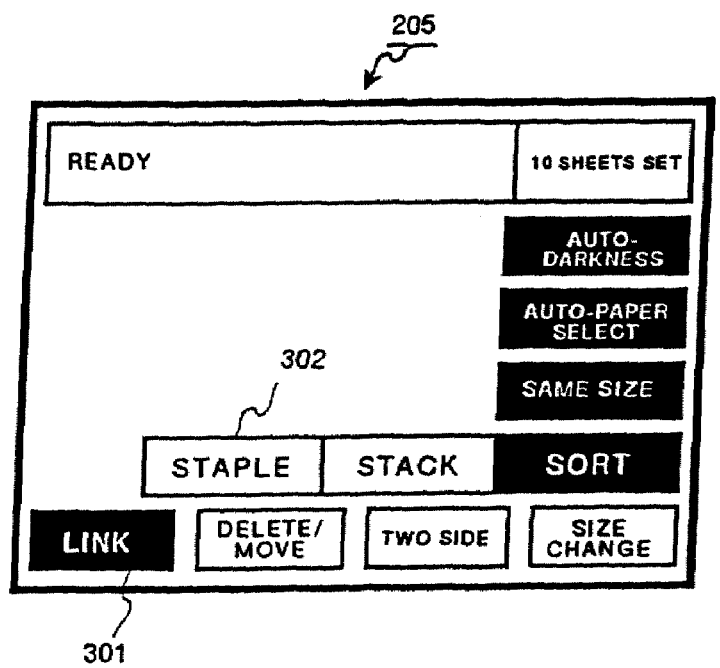
FIG. 25 is a view showing an example of a link copy mode setting screen when a setting end key is pressed on the screen shown in FIG. 24.

FIG. 24 is an example of a screen when the link copy key 301 is pressed the link copy mode is set. The screen is switched to a link copy mode set screen as shown in FIG. 24 when the link copy key 301 is pressed in the state as shown in FIG. 3. The link copy mode set screen is selected by pressing a link device select key 2400 for each copying machine (8 units herein). After selection is made, when the set-end key 2410 is pressed, the screen is switched to that shown in FIG. 25, and the link copy mode is set. With this operation, as shown on the screen in FIG. 25, the link copy mode is effected, and such functions as auto-darkness selection, auto-paper selection, copying with the same size, and sorting can be used. The link copy mode is canceled when the link copy key 301 is pressed again, and then the screen shown in FIG. 3 is restored.

Figure 26:
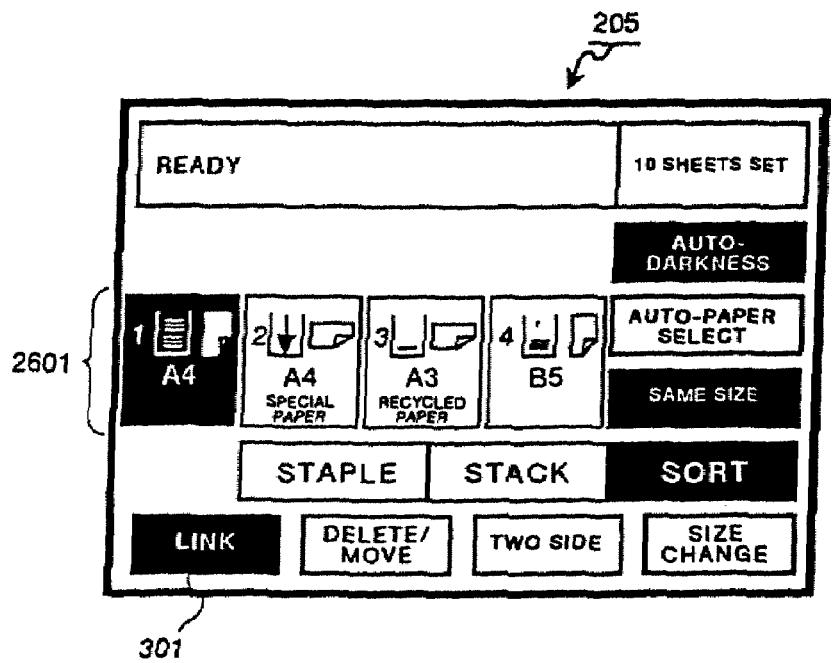
FIG. 26 is a view showing an example of a screen when the paper is selected manually (not automatically in response to detection of the paper)

FIG. 26 shows an example of a screen shown in a state where a size of recording paper is manually selected (not through automatic selection by a paper-size detection mechanism). This screen shows that "1" for size A4 in the horizontal posture has been manually selected with a manual paper-size select key 2601. Select keys for special paper (tracing paper, sheet for OHP, label paper or the like), paper with size A4 in the vertical posture, recycled paper with size A3 in the vertical posture, and paper size paper-size B5 in the horizontal posture are prepared as manual paper-size select keys 2601.

Figure 27:
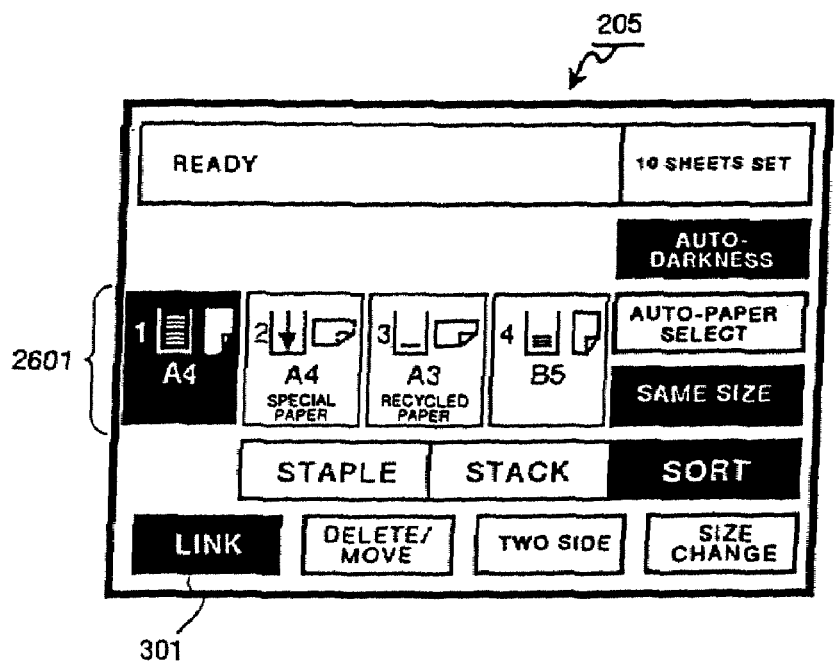
FIG. 27 is a view showing an example of a screen on which a not-selectable paper feed state is displayed with half brightness.
Figure 28:
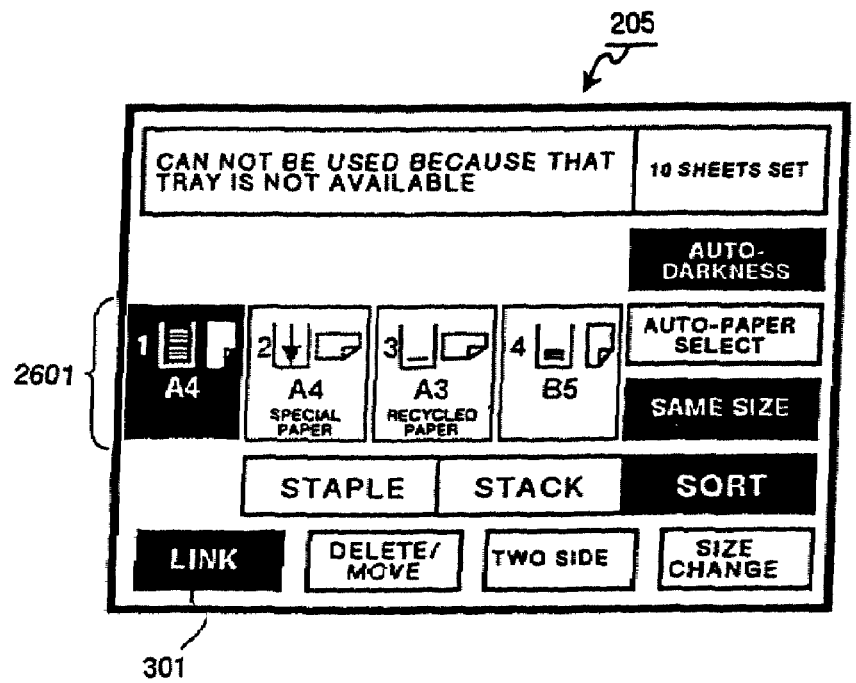
FIG. 28 is a view showing an example of an alarm display generated when an identical tray is not available in the link copy mode.

FIG. 27 shows an example of a screen on which not-available paper-feed stages are displayed with a half brightness degree, and in the case as shown on this screen, a key for special paper with size A4 is displayed with a half brightness degree. When a user tries to press the key displayed with a half brightness degree to select the corresponding function, for instance, such a message such as "can not be because that tray is not available" as shown in FIG. 28 is provided as an alarm display.

Figure 29:
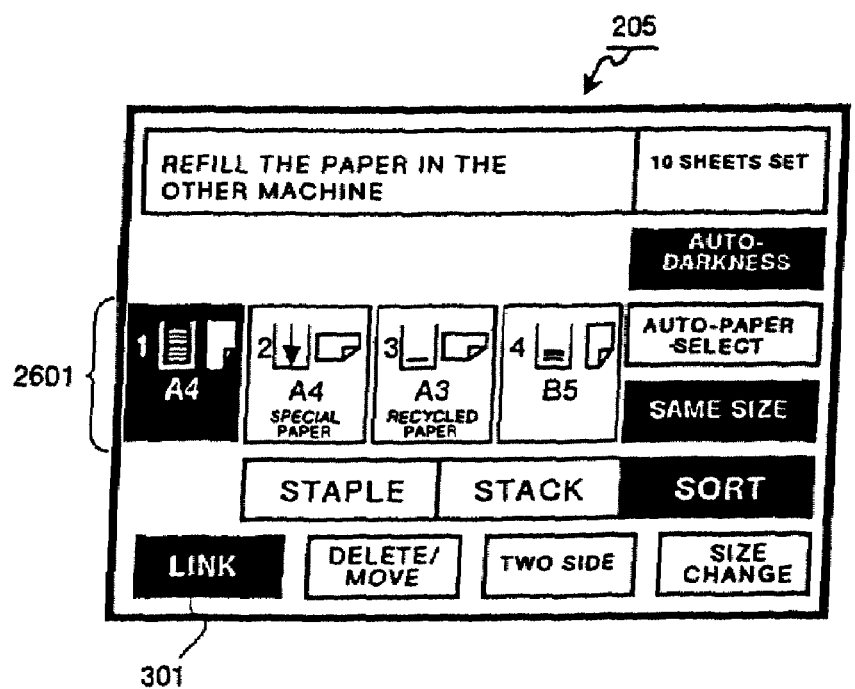
FIG. 29 is a view showing an example of a screen showing an alarm display when supply of paper is required in a machine (slave machine) other than the machine currently being operated (master machine) in starting operations in the link copy mode.
Figure 30:
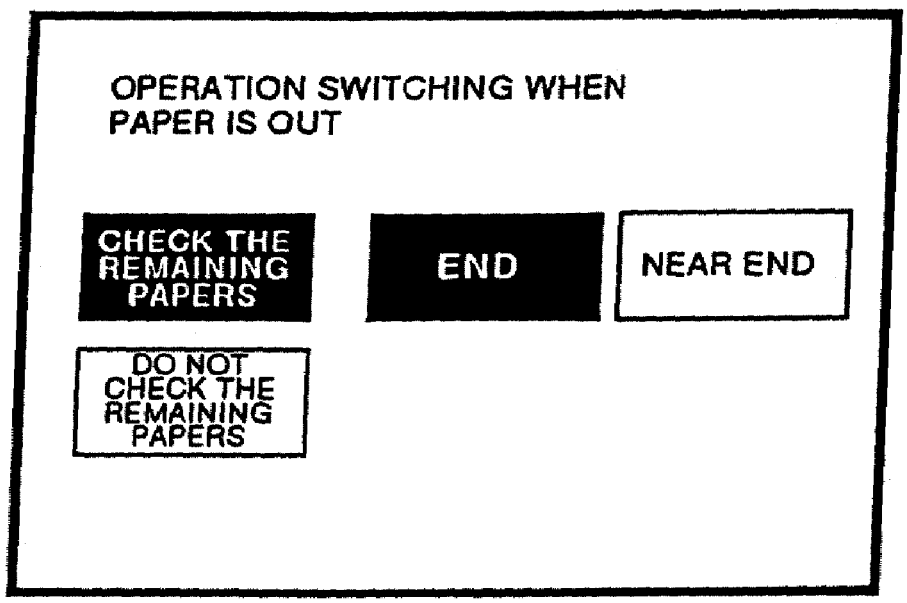
FIG. 30 is a view showing an example of setting screen for switching an operation when paper is out in an image formation apparatus.

FIG. 29 shows an example in which, when an operation in the link copy mode is started, if supply of recording paper is required in another device (slave machine) other than an operating device (master machine), the operation is terminated, and a message of, for instance, "refill the paper in the other machine" is provided as an alarm indicating necessity of supplying recording paper. FIG. 30 is an example of a set screen for switching an operation in the paper end state. In this example, a level for checking a quantity of remaining recording paper is set when the operation in the link copy mode is started. Namely an option whether a quantity of remaining paper is to be checked or not, and an option whether the check for a quantity of remaining paper is to be executed in the paper-end state, or paper near-end state. Shift to this screen can be executed by pressing the default settings key 207.

EXAMPLE OF HARDWARE CONFIGURATION OF THE SERIAL COMMUNICATION SECTION

Figure 31:
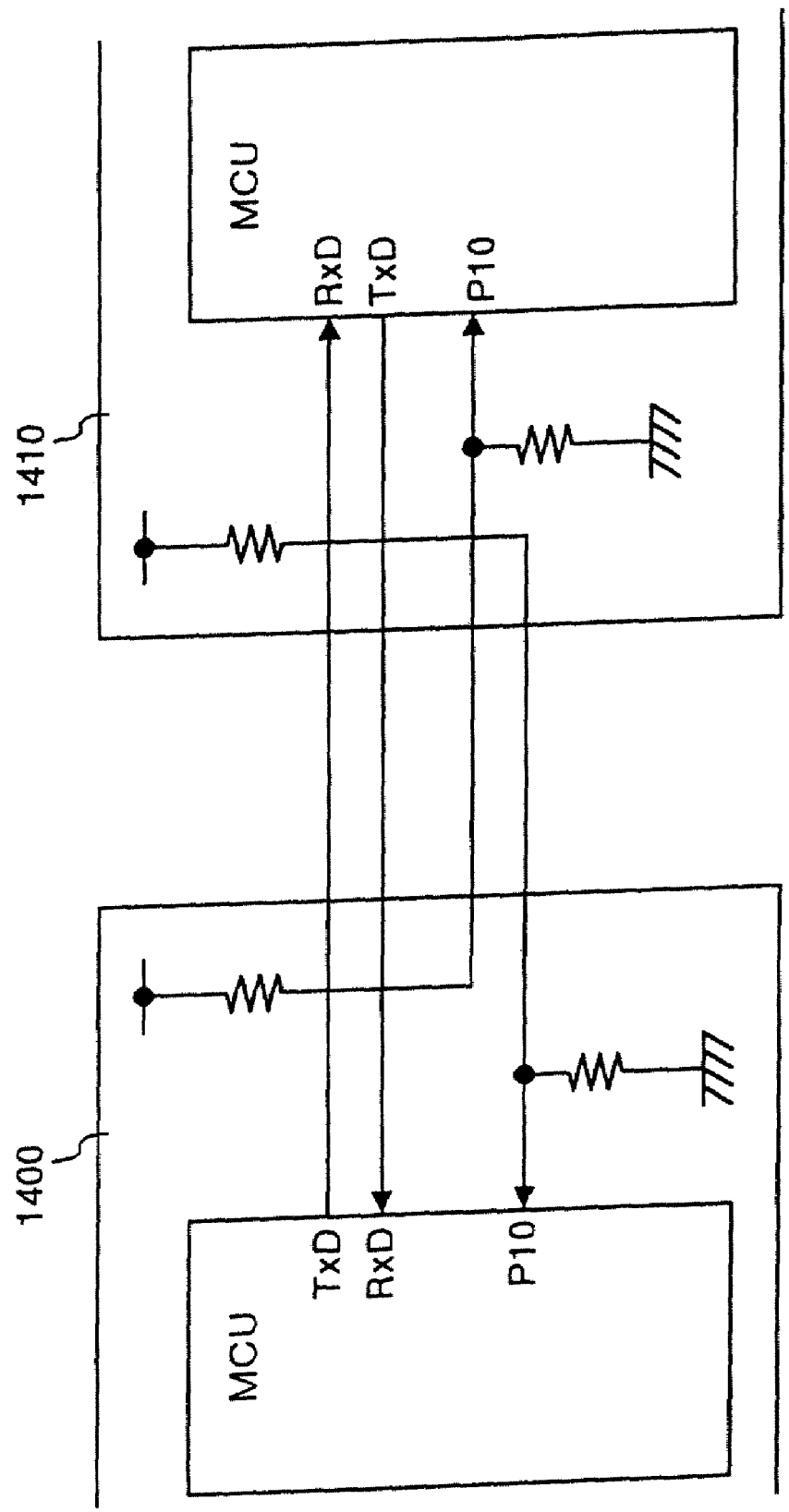
FIG. 31 is a view showing a first example of hardware configuration of a section around a serial communication line between the master machine and the slave machine.

FIG. 31 shows a first example of hardware configuration of a serial interface for the digital copying machines 1400, 1410. The master digital copying machine 1400 and slave digital copying machine 1410 have the same configuration of that of the digital copying machine described above, and are connected to each other pier-to-pier. For convenience of description, herein the devices are differentiated as a master machine (the operating machine in FIG. 24) and a slave machine (corresponding to the copying machines 1, 4, 7 shown in FIG. 24) respectively.

As shown in FIG. 31, a TxD terminal for receiving serial data and an RxD terminal for receiving serial data in a USAT (universal asynchronous receiver-transceiver) of a MCU incorporated in the master digital copying machine 1400 and slave digital copying machine 1410 respectively are connected to each other in the crossed state, so that command transaction can be executed between the terminals.

Different from the two serial communication lines described above, another signal line for checking whether power for a device in communication is ON or not. This signal line is pulled up to Vcc in the device in communication, and pulled down in the local device, so that, when power for the device in communication is ON, a value read at an input port P10 indicates H level, and when power for the device is OFF, a value read at the input port P10 indicates L level. Because of this configuration, each equipment can determine whether power for a device in communication is ON or not by checking whether an input signal level at the input port P10 is high (H) or low (L).

Figure 32:
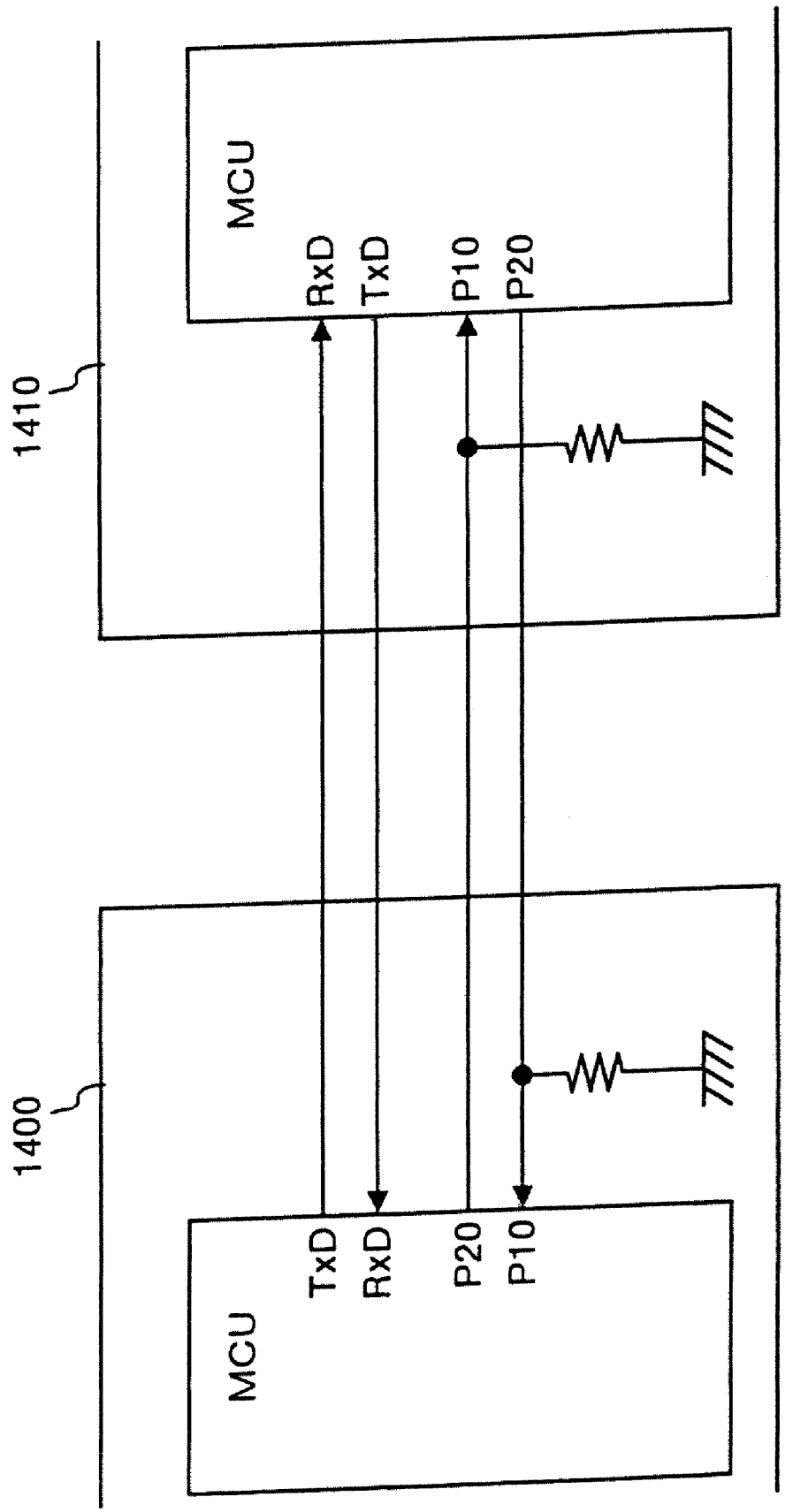
FIG. 32 is a view showing a second example of hardware configuration of a section around the serial communication line between the master machine and the slave machine.

FIG. 32 shows a second example of hardware configuration of a serial interface for the digital copying machines 1400, 1410. In this example, different from the serial communication line described above, two signal lines for checking that communications with a device in communication can be executed are prepared. With this signal line, an output port P20 of a local device is connected to an input port P10 of the device in communication.

Each device executes various types of processing for initialization after power thereto is turned ON. In this step, and output level from the output port P20 is set at a level L. After this operation, such operations as initialization of the URAT and initialization of an interruption controller are executed. When the device is ready for receiving serial data, and output level from the output port P20 is set at a level H. With this operation, each device can determine whether power for a device in communication is ON or not by checking whether an input signal level at the input port P10 is high (H) or low (L).

Figure 33:
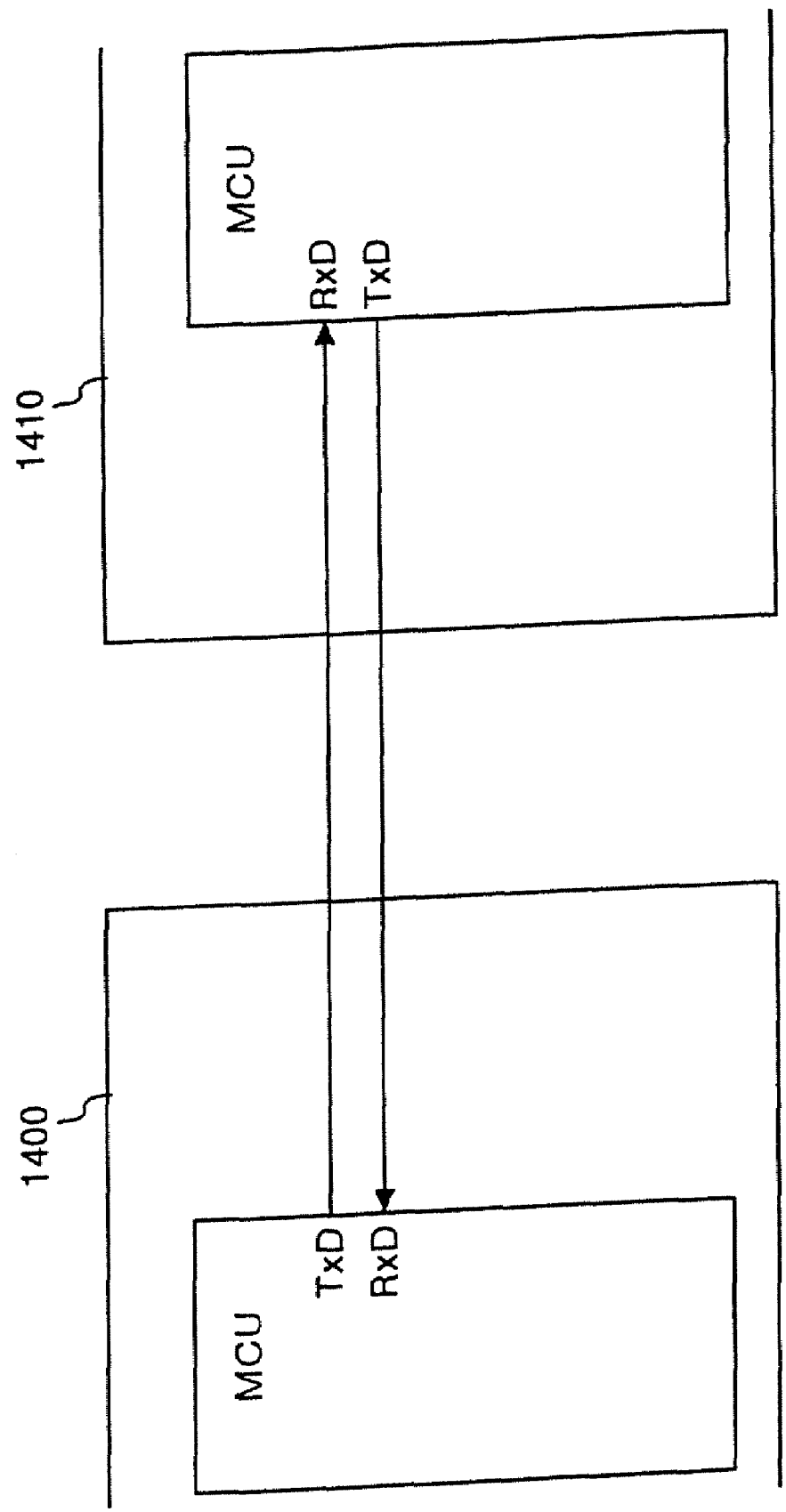
FIG. 33 is a view showing a third example of hardware configuration of a section around the serial communication line in the master machine as well as in the slave machine.

FIG. 33 shows a third example of hardware configuration of a serial interface for the digital copying machines 1400, 1410 shown in FIG. 14. In this example, signal lines other than the serial communication line described above are omitted for cost reduction. In this example, whether a local device can communication with another device as an object for communications can be detected by transacting the communication connection check command between the devices.

EXAMPLE OF OPERATION 2-1

Figure 34:
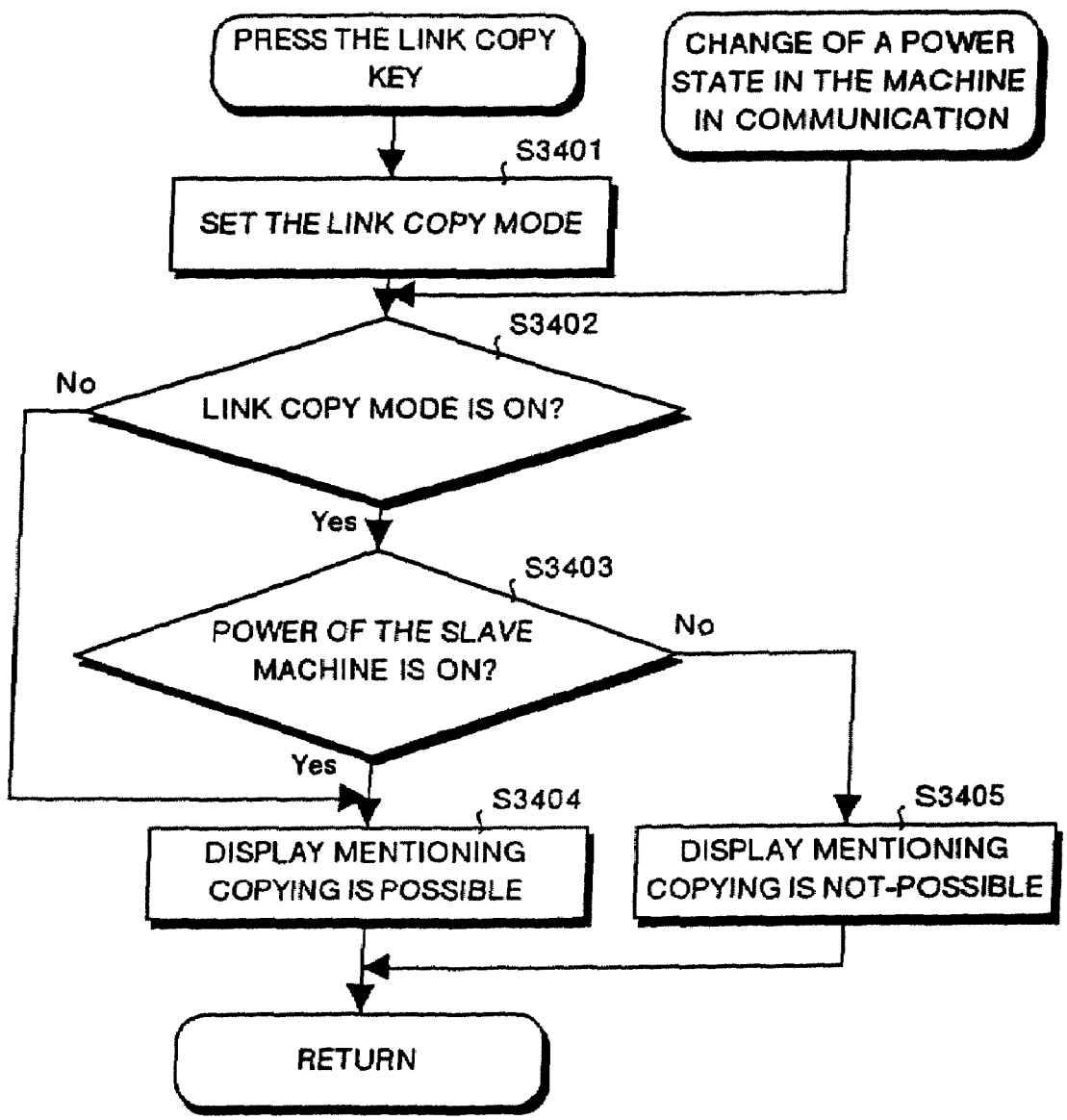
FIG. 34 is a flow chart showing an example of processing when the link copy key according to a second embodiment of the present invention is pressed and when power state in the slave machine changed.

FIG. 34 is a flow chart showing an example of operations in the master machine when the link copy key is pressed and when a power state in the slave machine changes. At first, when the link copy key 301 is pressed and the link copy mode is set (S3401), the digital copying machine 1400 determines whether the link copy mode has been set or not (S3402). When it is determined that the link copy mode has been set, the digital copying machine (master machine) 1400 determines whether the power of the slave digital copying machine 1410 is ON or not (S3403). Whether the power of the slave machine 1400 is ON or OFF is checked with the configuration shown in FIG. 31 or in FIG. 32.

In step S3403, when it is determined that power of the slave digital copying machine 1410 is ON (a value read at the input port P10 indicates a level H), the master digital copying machine 1400 provides a display of, for instance, "ready" on the operation panel of the master digital copying machine 1400 (S3404), while the print key 202 is set in the print green state. On the contrary, when the master digital copying machine 1400 determines that power of the slave machine is OFF (a value read at the input port P10 indicates a level L), the master digital copying machine 1400 provides a display such as "Wait" indicating that copying is not possible on the operation panel of the master digital copying machine 1400 (S3405), and the print key 202 is set in the print red state.

When a power state for the slave machine 1400 changes during the operation described above, the operation sequence in step S3402 and on is executed. When the link copy mode is not set, however, the message of "ready" is provided regardless of whether power of the slave machine 1400 is ON or OFF, and the print key 202 is set in the print green state.

In the example of operation 2-1 described above, when power for the slave machine is OFF, the master machine inhibits operations in the link copy mode. Because of this configuration, even when a linked device is at a remote site, whether a link copy operation can be executed or not can be determined only with the master machine being operated by a user without directly checking whether power for the slave machine is ON or OFF, which insures improved operability.

EXAMPLE OF OPERATION 2-2

Figure 35:
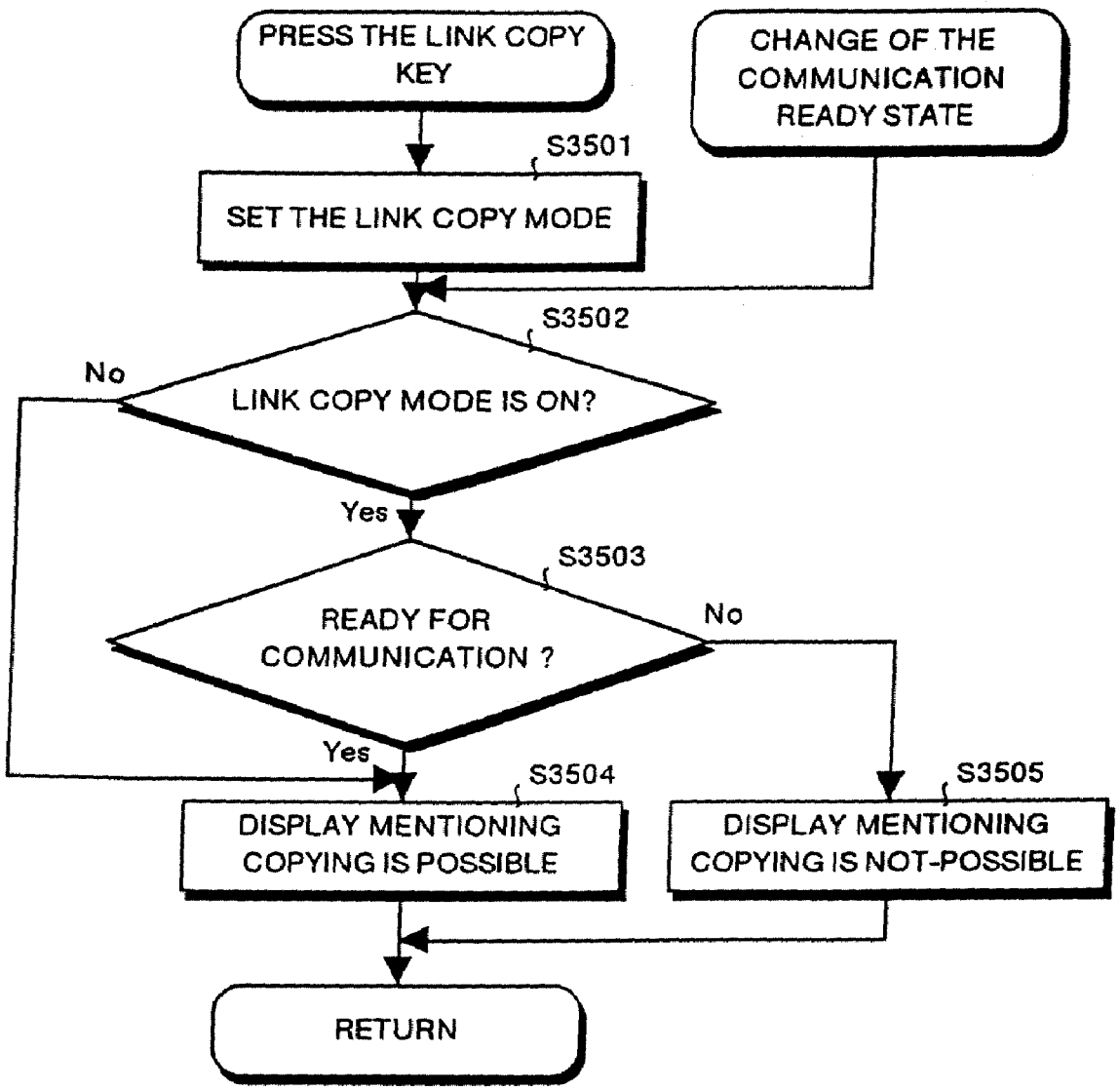
FIG. 35 is a flow chart showing an example of the processing when the link copy key according to the second embodiment of the present invention is pressed and when a communication-ready state changes in the slave machine.

FIG. 35 is a flow chart showing an example of the processing executed by the master machine when the link copy key is pressed and when the communication-ready state in the slave machine changes. At first, when the link copy key 301 is pressed and the link copy mode is set (S3501), the digital copying machine 1400 determines whether the link copy mode has been set or not (S3502). When it is determined in this step that the link copy mode has been set, the digital copying machine 1400 (master machine) further determines whether the slave digital copying machine 1410 is read for communication or not (S3503). Whether the slave machine 1400 is ready for communication or not is determined by transacting the communication connect command previously set in the configuration shown, for instance, in FIG. 33 between the master and slave machines.

In step S3503, when it is determined that the slave digital copying machine 1410 is ready for communication, the master digital copying machine 1400 displays a message indicating possibility of a copy operation on the operation panel (S3504) with the print key 202 set in the print green state. On the contrary, when it is determined in step S3505 that the slave digital copying machine 1410 is not ready for communication (communication not-ready state), the master digital copying machine 1400 displays a message indicating impossibility of a copy operation such as "wait" on the operation panel (S3505) with the print key 202 set in the print red state.

When the communication ready state in the slave machine changes, the operation sequence instep S3502 and on is executed. When the link copy mode has not been set, however, the master machine displays a message of "ready" on the operation panel regardless of whether the slave machine is ready for communications or not with the print key 202 set in the print green state.

With the example of operation 2-2, when it is determined that the slave machine is not ready for communication, the master machine inhibits operations in the link copy mode. Because of this configuration, even when a linked device is at a remote site, it is possible to determine whether a link copy operation can be executed or not with a device currently being operated by a user (master machine) without directly checking whether the slave machine is ready for communications or not, which insures improved operability in the link copy mode.

EXAMPLE OF OPERATION 2-3

Figure 36:
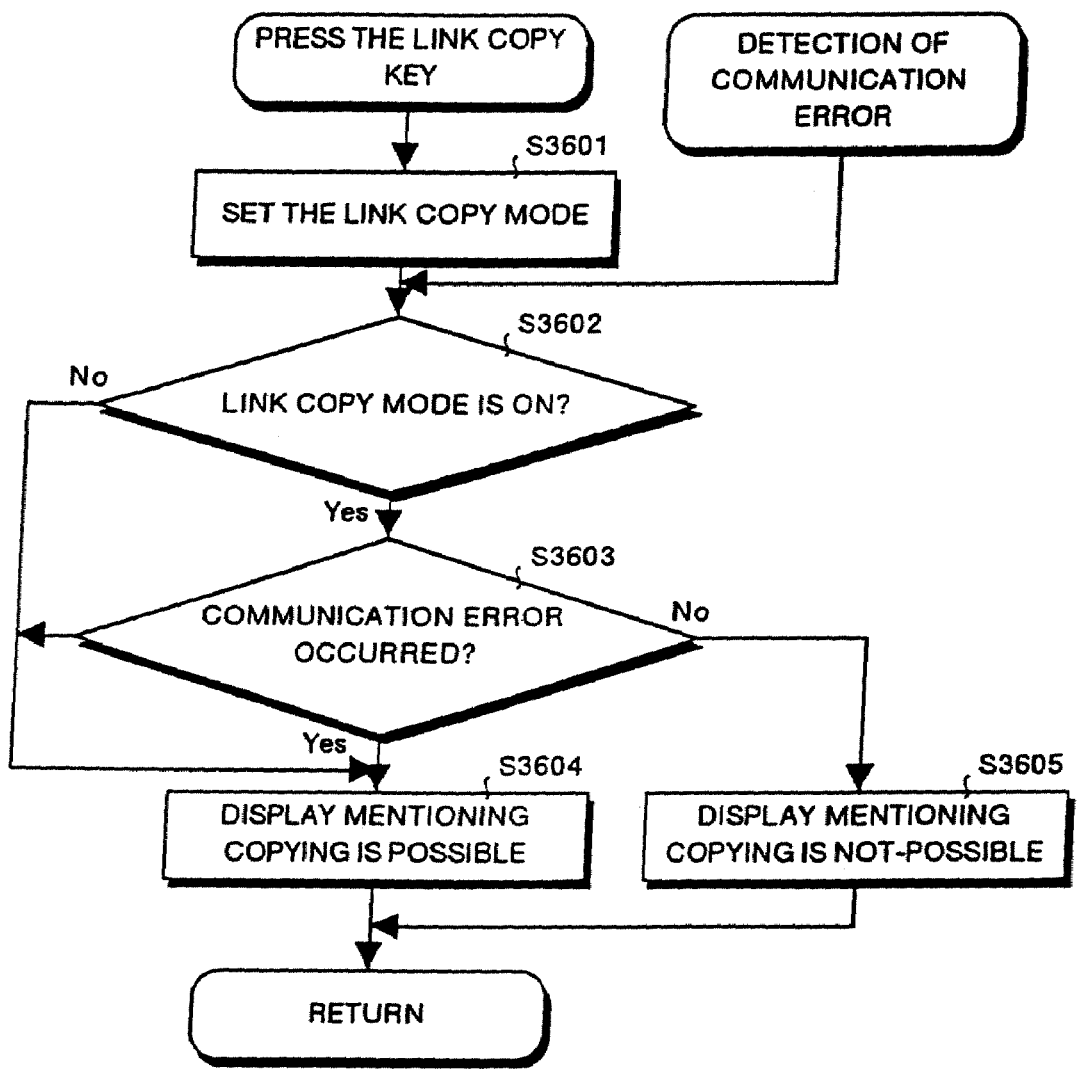
FIG. 36 is a flow chart showing an example of the processing when the link copy key according to the second embodiment of the present invention is pressed and when a communication error is generated.

FIG. 36 is a flow chart showing an example of operations by a master machine when the link copy key is pressed and when a communication error is detected. At first, when the link copy key 301 is pressed and the link copy mode is set in the digital copying machine 1400 (S3601), the master machine determines whether the link copy mode has been effected or not (S3602). When it is determined in step S3602 that the link copy has been effected, the digital copying machine 1400 (master machine) further determines whether a communication error has occurred in the slave digital copying machine 1410 (S3603).

When it is determined in step S3603 that a communication error has not occurred in the slave digital copying machine 1410, the master digital copying machine 1400 displays a message indicating possibility of copying such as "ready" (S3604) with the print key 202 set in the print green state. On the contrary, when it is determined in step S3606 that a communication error has occurred in the slave digital copying machine 1410, the master digital copying machine 1400 displays a message indicating impossibility of copying such as "wait" on the operation panel of the master digital copying machine 1400 (S3605) with the print key 202 set in the print red state.

When a communication error in the slave digital copying machine 1410 is detected, the operating sequence in step S3602 and on is executed. When the link copy mode has not been set, however, the master machine displays a message indicating possibility of copying such as "ready" with the print key 202 set in the print green state.

In the example of operation 2-3 described above, when a communication error occurs in a slave machine, a master machine inhibits a link copy operation. Because of this configuration, even when a linked device is at a remote site, it is possible to check whether a link copy operation can be executed or not only with a master machine currently being operated by a user and without directly checking whether a communication error has occurred in the slave machine or not, and the necessity of executing a copy operation again due to a communication error is eliminated, which insures the operability in the link copy mode.

Figure 37:
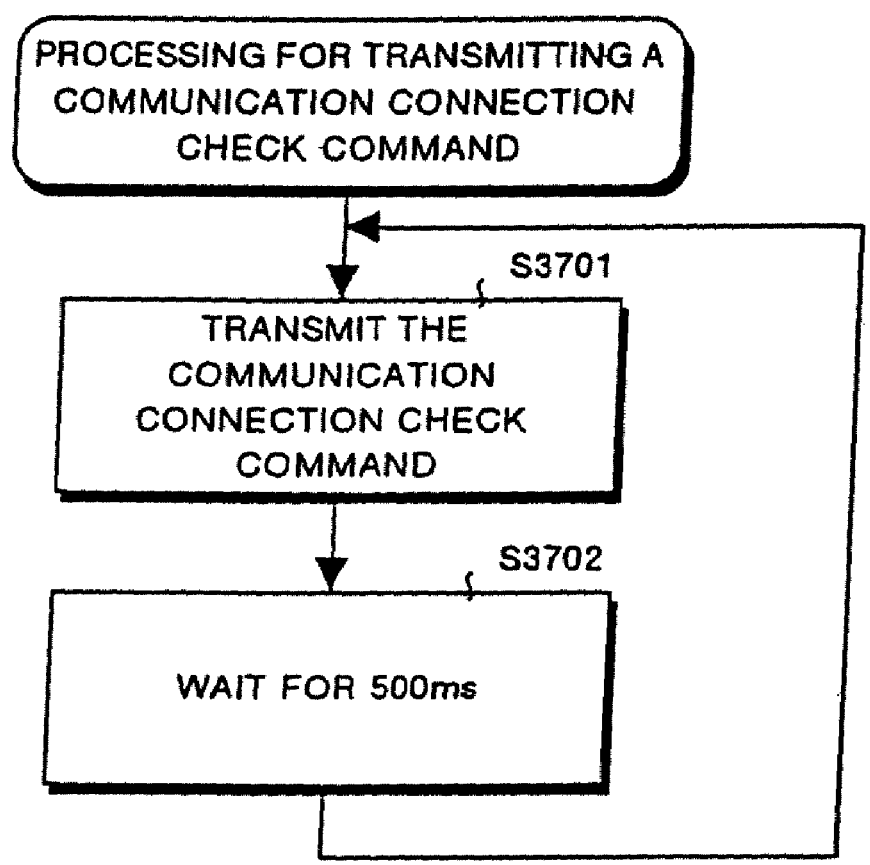
FIG. 37 is a flow chart showing an example of the processing for transmitting a communication connection confirm command for checking whether communications according to the second embodiment of the present invention can be performed.

Processing for Sending a Communication Connection Check Command:

FIG. 37 is a flow chart showing the processing for sending the communication connection check command for checking whether communications can be executed or not. After power is turned ON, the digital copying machines 1400, 1410 connected to each other mutually transmit the communication connection check command (S3701), wait for 500 ms (S3702), and then transmit the communication connection check command. Namely the digital copying machines 1400, 1410 mutually transmit a communication connection check command once for every 500 ms through a serial communication line to each other.

Figure 38:
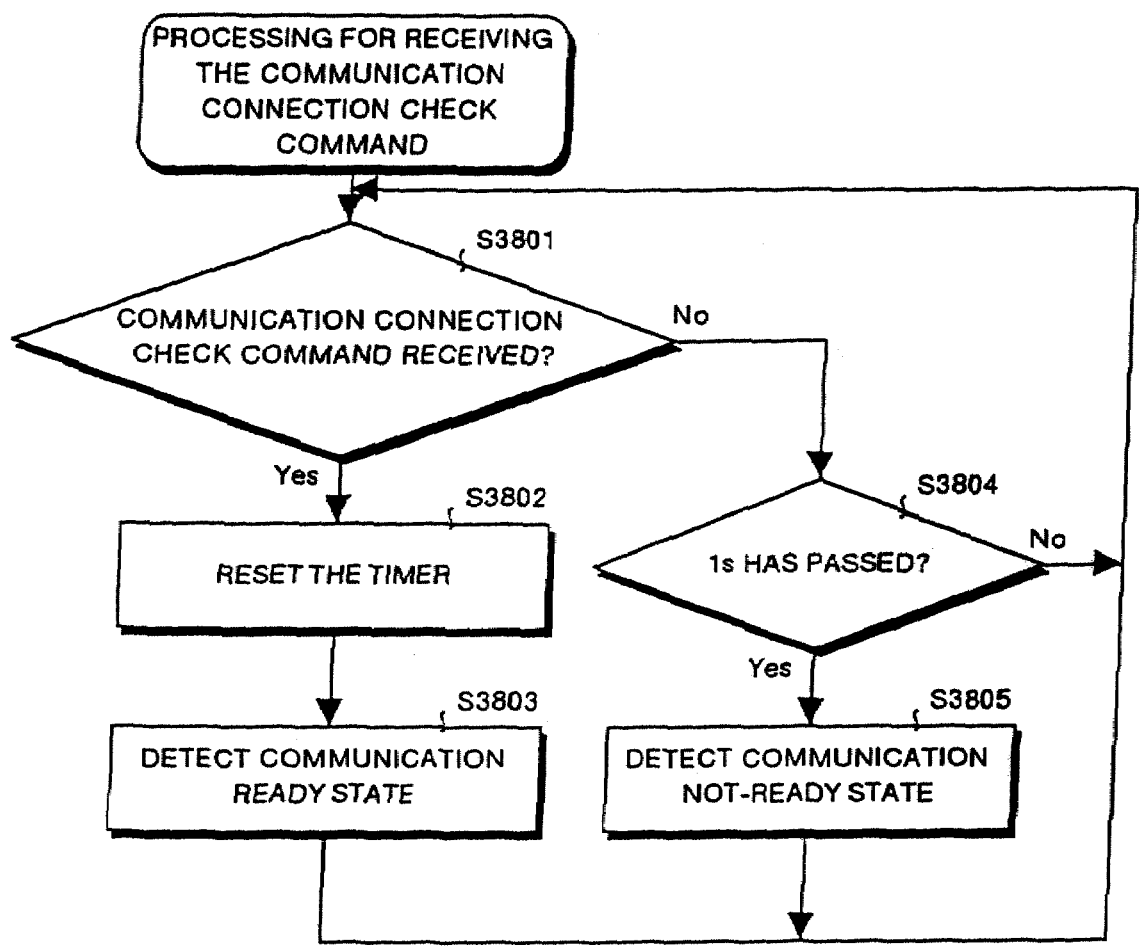
FIG. 38 is a flow chart showing an example of the processing for receiving the communication connection confirm command for checking whether communications according to the second embodiment of the present invention can be performed.

Processing for Receiving the Communication Connection Check Command:

FIG. 38 is a flow chart showing an example of the processing for receiving the communication connection check command for checking whether communications can be executed or not. This processing is executed in each of the digital copying machines 1400, 1410. At first the digital copying machine determines whether the communication connection check command has been received or not (S3801). When it is determined in step S3801 that the communication connection check command has been received, the digital copying machine resets a timer for time counting (S3802), and detects the communication ready state (S3803). On the other hand, when it is determined that the communication connection check command has not been received for some reason, the digital copying machine determines whether one second has passed after the last command is received or not (S3804), and determines, after one second has passed, that the communication can not be performed (communication not-ready state) (S3805).

A third embodiment is described below with reference to FIG. 39 to FIG. 44. Configuration of the digital copying machine according to the third embodiment has the same configuration as that of the digital copying machine according to the second embodiment. In the third embodiment, operations in the link copy mode for inhibiting selection of the link copy mode when power for a slave machine is OFF, when the slave machine is not ready for communication, or when a communication error occurs in the slave machine. Example of operations of the digital copying machine system shown in FIG. 14 is described below.

EXAMPLE OF OPERATION 3-1

Figure 39:
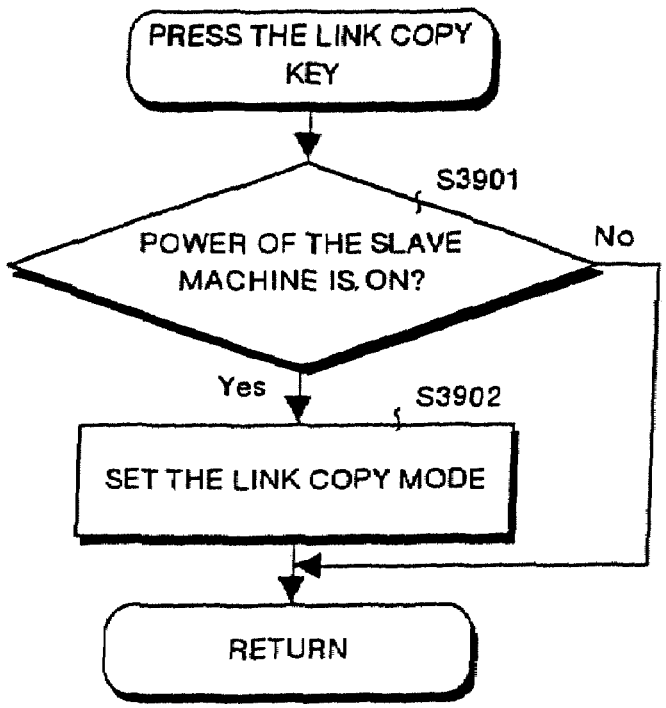
FIG. 39 is a flow chart showing the processing executed when a link copy key according to a third embodiment of the present invention is pressed.
Figure 40:
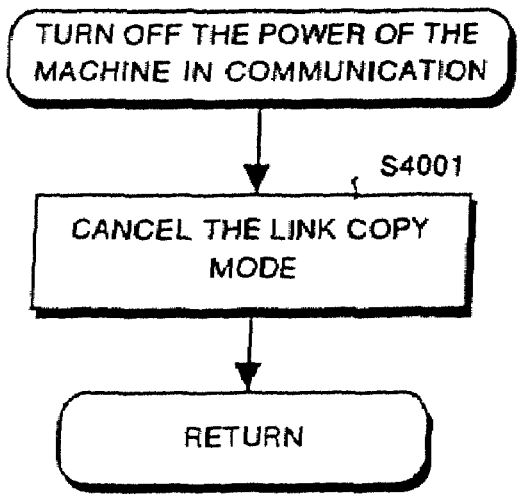
FIG. 40 is a flow chart showing the processing executed when a power OFF state in the slave machine according to the third embodiment is detected.

FIG. 39 is a flow chart showing the processing executed by the master digital copying machine 1400 when the link copy key 301 is pressed, and FIG. 40 is a flow chart showing the processing executed by the master machine when a power OFF state in the slave digital copying machine 1410 is detected. In FIG. 39, when the link copy key 301 is pressed, the master digital copying machine 1400 at first determines whether power of the slave digital copying machine 1410 is ON or not (S3901), and when it is determined that power of the slave digital copying machine 1410 is ON, the master digital copying machine 1400 sets the link copy mode (S3902). When it is determined that power of the slave digital copying machine 1410 is OFF (for instance, with the circuit configuration shown in FIG. 31, and FIG. 32), the master digital copying machine 1400 cancels the link copy mode (S4001).

In the example of operation 3-1 described above, when power of the slave machine is OFF, the master machine inhibits selection of the link copy mode. Because of this configuration, even when a linked device is at a remove site, it is possible to determined whether a link copy operation can be executed or not only with the master machine currently being operated by a user and without directly checking a power ON/OFF state of the slave machine, which insures improved operability in the link copy mode. When a mode disabling a link copy operation has been selected, selection of the link copy mode is inhibited, so that it is possible to alert a user before selection of the link copy mode that a link copy mode is impossible, which insures further improvement in the operability.

EXAMPLE OF OPERATION 3-2

Figure 41:
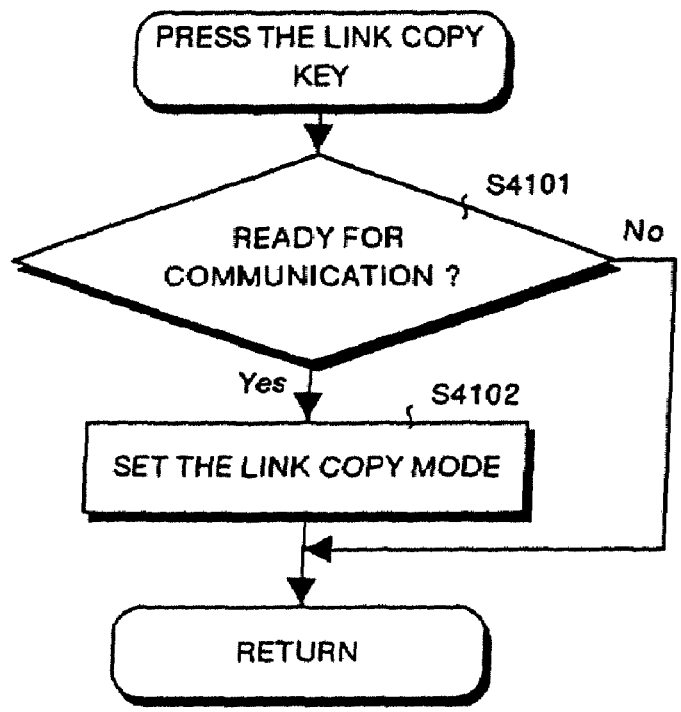
FIG. 41 is a flow chart showing the processing executed when the link copy key according to the third embodiment of the present invention is pressed.
Figure 42:
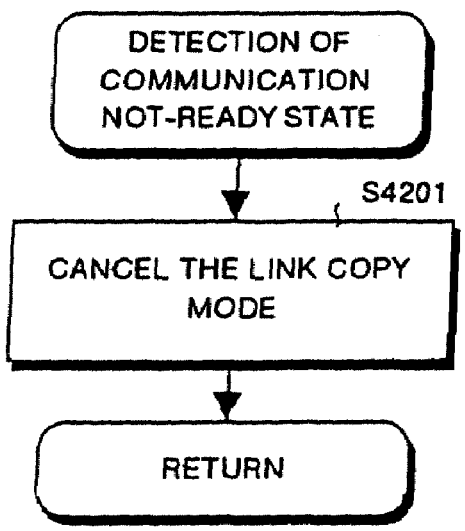
FIG. 42 is a flow chart showing the processing executed when a communication not-ready state in the slave machine according to the third embodiment of the present invention is detected.

FIG. 41 is a flow chart showing the processing executed by a master machine when the link copy key 301 is pressed, and FIG. 42 is a flow chart showing the processing executed by the master machine when a communication not-ready state in a slave machine is detected. In FIG. 41, when the link copy key 301 is pressed, the master key 1400 at first determines whether the slave digital copying machine 1410 is ready for communications or not (S4101). When it is determined in step S4101 that the slave machine is ready for communication, the master digital copying machine 1400 sets the link copy mode (S4102). When it is determined in step S4101 that the slave machine is not ready for communications, the master machine cancels the link copy mode (S4201).

In the example of operation 3-2 described above, when it is determined that a slave machine is not ready for communications, a master machine inhibits selection of the link copy mode. Because of this configuration, even when a linked device is at a remove site, it is possible to determined whether a link copy operation can be executed or not only with the master machine currently being operated by a user and without directly checking whether the slave machine is ready for communications or not, which insures improved operability in the link copy mode. When a link copy operation is impossible, selection of the link copy mode is inhibited, so that it is possible to alert a user before selection of the link copy mode that a link copy operation can not be executed, which insures further improved operability in the link copy mode.

EXAMPLE OF OPERATION 3-3

Figure 43:
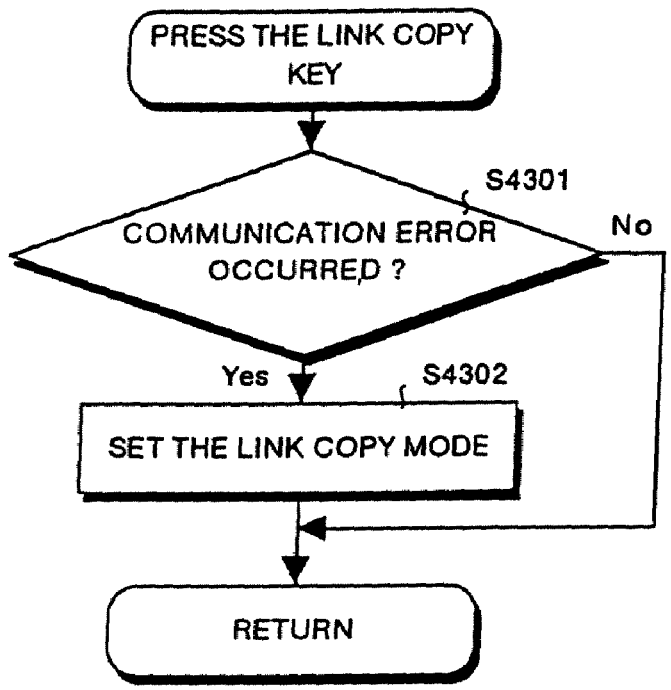
FIG. 43 is a flow chart showing the processing executed when the link copy key according the third embodiment of the present invention.
Figure 44:
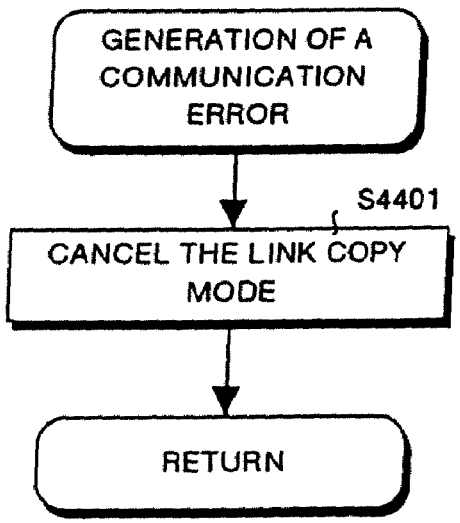
FIG. 44 is a flow chart showing the processing executed when a communication error according to the third embodiment of the present invention is detected.

FIG. 43 is a flow chart showing the processing executed by a master machine when the link copy key 301 is pressed, and FIG. 44 is a flow chart showing the processing executed by the master machine when a communication error is detected. When the link copy key 301 is pressed, the digital copying machine 1400 at first determines whether a communication error has occurred or not in the slave digital copying machine 1410 (S4301). When it is determined that a communication error has not occurred, the digital copying machine 1400 sets the link copy mode (S4302). When a communication error is detected during transaction of commands with the slave digital copying machine 1410, the master digital copying machine 1400 cancels the link copy mode (step S4401).

In the example of operation 3-4 described above, when a communication error occurs in a slave machine, a master machine inhibits selection of the link copy mode. Because of this configuration, even when a linked device is at a remove site, it is possible to determine whether a link copy operation is possible or not only with the master machine currently being operated by a user and without directly checking whether a communication error has occurred in the slave machine or not, and further the necessity of executing a copy operation again when a communication error occurs is eliminated, which insures improved operability in the link copy mode. In addition, when a link copy operation is impossible, selection of the link copy mode is inhibited, so that it is possible to alert a user before selection of the link copy mode that a link copy operation is not possible, which insured further improved operability in the link copy mode.

The processing for transmitting the communication connection check command and processing for receiving the command in each step are the same as those shown in FIG. 37 and FIG. 38. Therefore, the contents is not described here.

A fourth embodiment of the present invention is described with reference to FIG. 45 to FIG. 51. Configuration of a digital copying machine according to the fourth embodiment is the same as that according to the second embodiment. In the fourth embodiment, a case where the link copy operation is started according to a change in a supply state (a state of recording paper used for printing, and toner), an error state of a print engine, a state of a display screen, and an operating state of the print engine in a slave machine as an object for a link copy operation is described. Herein, an example of operations of the digital copying machine shown in FIG. 14 is described.

Figure 45:
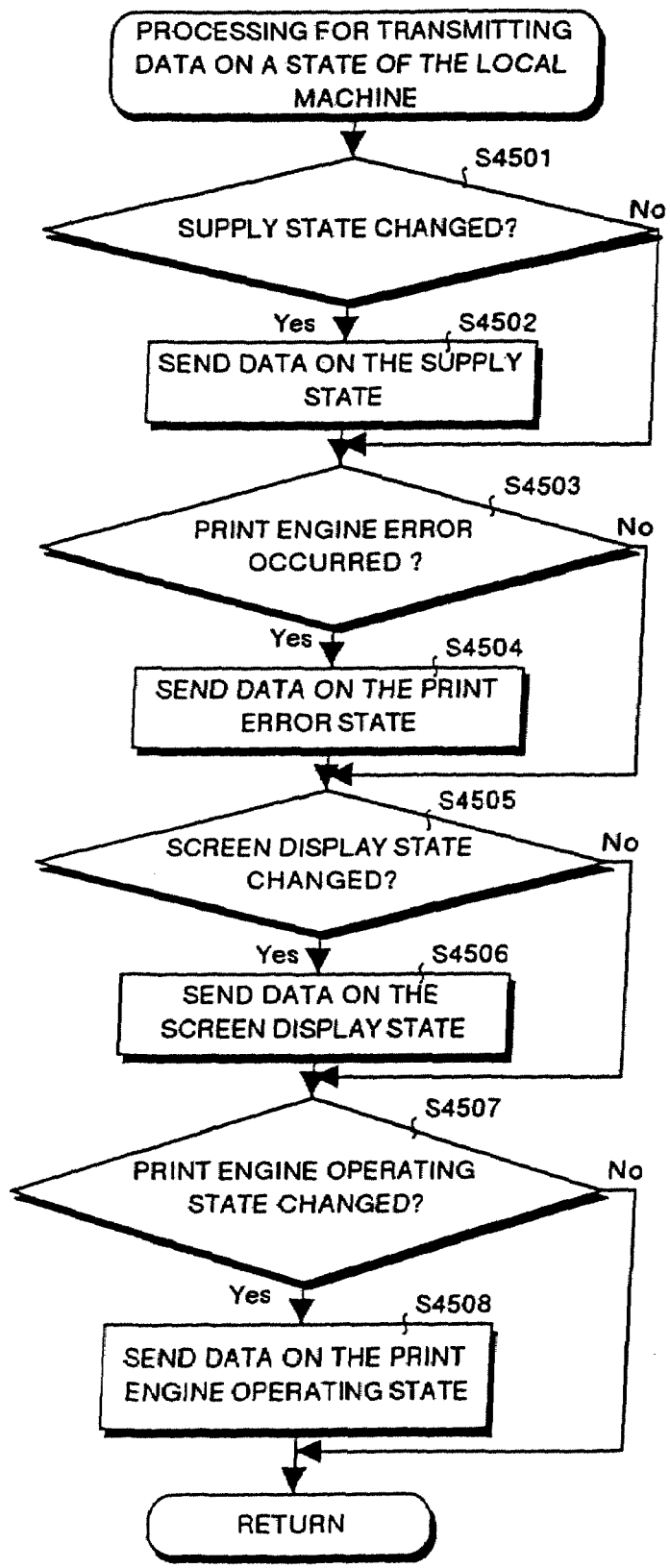
FIG. 45 is a flow chart showing an example of the processing for transmitting information concerning a state in a local machine according to a fourth embodiment of the present invention to a machine with which the local machine is communicating.

Processing for Sending Data on a State of a Local Machine:

FIG. 45 is a flow chart showing the processing for sending data on a state of a local machine to other machine(s) in communication. This processing is executed in the digital copying machines 1400, 1410 respectively. In FIG. 45, at first the digital copying machine determines whether any changed has occurred in relation to toner or recording paper in the machine or not, namely where a toner end/paper end state has occurred in the machine or not (S4501). A paper-end state in a paper-feed tray, namely in first, second, and third trays 109, 110, and 111 is detected by the sensors (not shown) provided in the digital copying machine. A toner-end state can be detected by a toner sensor (not shown) or a darkness sensor provided in the development unit 118. The sensor mechanism is well known, and will not be described here.

When it is determined that a state of supply has changed in the digital copying machine, data on the supply state is sent to a digital copying machine connected thereto (S4502). After transmission of the data on a supply state, or when it is determined that no change has occurred in the supply state, the digital copying machine determines whether any change has occurred in an error state of a print engine (digital copying machine) or not (S4503). A print engine error is defined herein as an abnormal state causing influence over a printing operation of the device as a whole. Namely the abnormal state as defined herein includes abnormality concerning carriage of recording paper (jamming, or failure in feeding recording paper), abnormality in rotation of a photosensitive drum 116, abnormality in a fixing unit, and abnormality in a post-processing unit or the like. Abnormalities concerning a scanner or an ADF each not required in the link copy mode is not included in the abnormality as defined herein.

When it is determined in step S4503 that a print engine error has occurred, the digital copying machine sends data on the print engine error (S4504), and further determines whether a display state of a screen of the operation panel has changed or not (S4505).

When it is determined that a screen display state has changed, the digital copying machine sends data on the current screen display state to a digital copying machine connected thereto (S4506). The screen display state as defined herein includes but not limited to a initialize screen for setting operating conditions of the device, and a maintenance mode screen (Refer to FIG. 48) for maintenance of the device.

The digital copying machine sends data on the screen display state, and then determines whether any change has occurred in an operating state of the print engine (S4507). When it is determined that an operating state of the print engine has changed, the digital copying machine sends data on the operating state of the print engine to a digital copying machine connected thereto (S4508).

Figure 46:
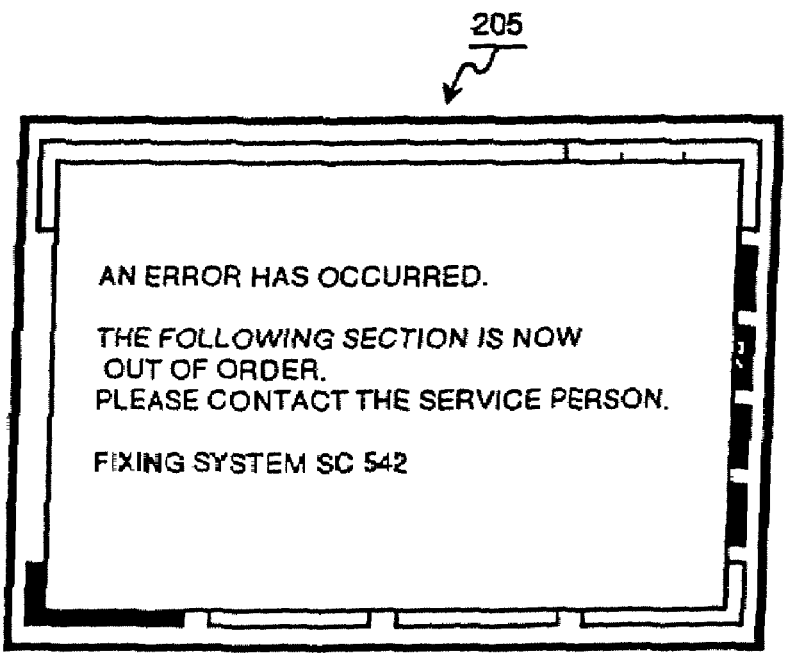
FIG. 46 is a view showing an example of screen display when an error is generated in a print engine according to the fourth embodiment of the present invention.

FIG. 46 shows an example of screen display provided when an error has occurred in the print engine. The figure shows a case where an error (such as melting down of temperature fuse due to excessive temperature in fixing, or breakage of a fixing heater) has occurred, and a message of "The following section is out of order. Please contact a service person. Fixing system SC542) is displayed.

Figure 47:
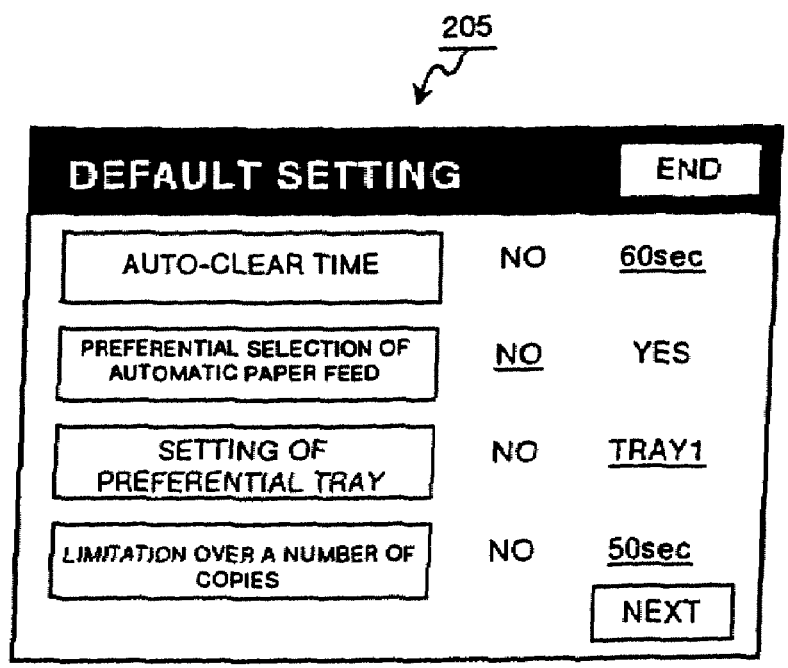
FIG. 47 is a view showing an example of screen display showing selection of each item and a preset value for each item in a default mode according to the fourth embodiment of the present invention.

FIG. 47 shows an example of screen display for selection of items and preset values when the device is initialized. This screen is displayed when the initialize key shown in FIG. 2 is pressed, and the normal copy screen is restored when the end key on the screen is pressed. The display screen in this figure shows a case where the auto-clear time is set to "60 sec", preferential paper size selection is "not required", a preferential tray is set to "Tray 1", and a limit of sheets to be copies is set to "50 sheets".

FIG. 48 shows an example of screen display showing a state where the maintenance mode has been set. A special key dedicated to setting of the maintenance mode is not provided so that a user will not carelessly try to effect this screen mode, and the screen shift is executed by pressing keys in the order which seldom occurs in the normal operation. The order of pressing keys is, for instance, "Mode clear" to "CL/STOP" and then to "#". The screen display in this figure shows a case where a resist adjustment value is set to "+1.5 mm", temperature for fixing to "185° C.", development bias to "550 V", and magnification in the main scanning direction to "0.0%" respectively.

Figure 49:
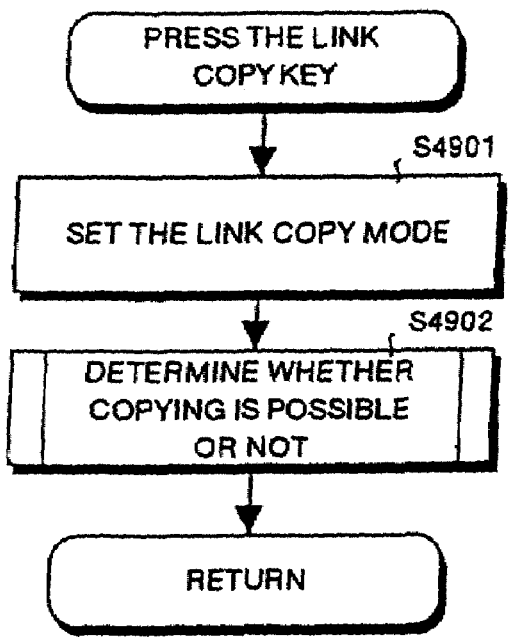
FIG. 49 is a flow chart showing the processing executed when a link copy key according to the fourth embodiment of the present invention is pressed.

Processing for Possibility of a Copy Operation in the Link Copy Mode:

FIG. 49 is a flow chart showing an example of the processing executed when the link copy key 301 is pressed. When the link copy key 301 is pressed, the digital copying machine 1400 sets the link copy mode (S4901), and executes the processing for determining whether copying is possible or not (Refer to FIG. 51). This processing is described in detail later.

Figure 50:
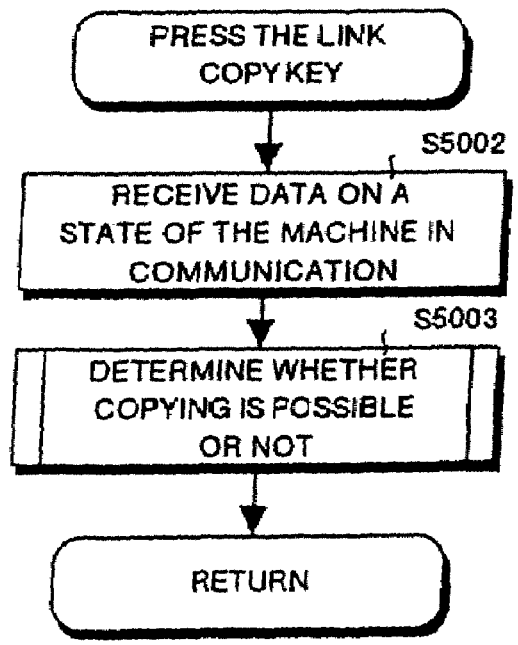
FIG. 50 is a flow chart showing the processing executed when information concerning a state of the machine with which the local machine is currently communicating according to the fourth embodiment of the present invention is received.

FIG. 50 is a flow chart showing an example of the processing executed by a master machine when data on an operating state of a device in communication is received. At first, the digital copying machine 1400 receives data on an operating state of the digital copying machine 1410 as a result of the transmission processing shown in FIG. 45 (S5001), and executes the processing for determining whether copying is possible or not (Refer to FIG. 51) (S5002). This processing is described in detail later.

Figure 51:
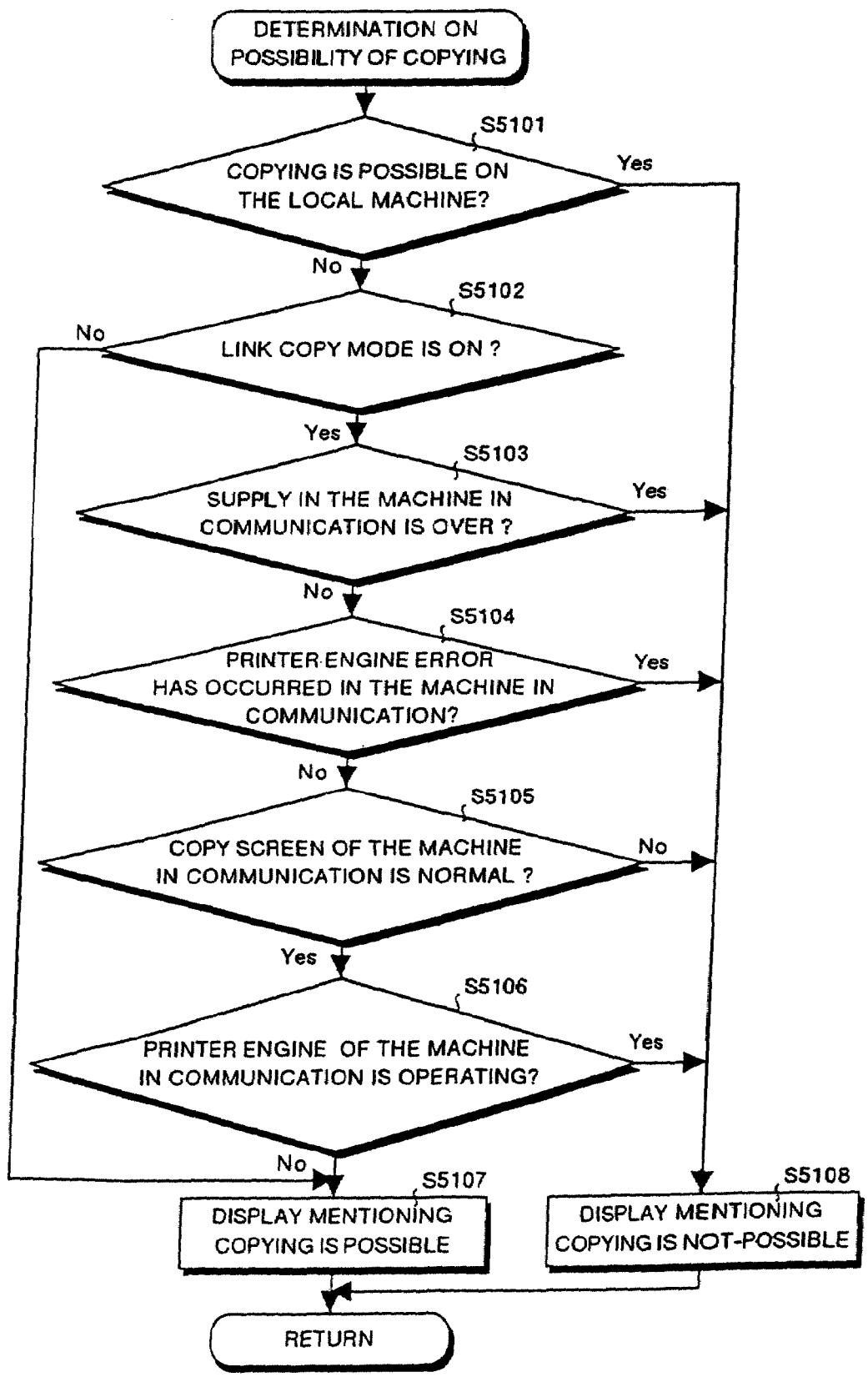
FIG. 51 is a flow chart showing the processing for determining whether copying is allowable in the link copy mode according to the fourth embodiment of the present invention.

FIG. 51 is a flow chart showing the processing for determining whether copying is possible or not (S4902) shown in FIG. 49, while FIG. 50 is a flow chart showing contents of the processing for determining whether copying is possible or not shown in FIG. 50. In FIG. 51, the digital copying machine 1400 at first determines whether there is any reason so that the machine can not perform the copy operation (S5101). When it is determined that local machine can not perform the copy operation, the digital copying machine 1400 unconditionally displays a message indicating that copying is not possible on the operation panel (S5108). On the contrary, when it is determined that the local machine can perform the copy operation, the digital copying machine 1400 further determines whether the link copy mode has been effected or not (S5102). When it is determined that the link copy mode has not been set, the digital copying machine 1400 displays a message indicating that a copy operation is possible on the operation panel 201 (S5107).

When it is determined in step S5102 that the link copy mode has been set, the digital copying machine 1400 further determines whether the digital copying machine to which the digital copying machine 1400 is to be connected is in the supply (recording paper, toner) end state or not (S5103). When it is determined that the digital copying machine 1410 is not in the supply end state, the digital copying machine 1400 further determines whether the digital copying machine 1410 is in the print engine error state or not (S5104). When it is determined in step S5104 that the digital copying machine 1410 is not in the print engine error state, the digital copying machine 1400 further determines whether the digital copying machine 1410 is displaying the normal copy screen or not (S5105). When it is determined that the digital copying machine 1400 is displaying the normal copy screen, the digital copying machine 1400 further determines whether the print engine of the digital copying machine 1400 is operating or not (S5106). When it is determined in the step above that a print engine of the digital copying machine 1410 is not operating, the digital copying machine 1400 displays a message of, for instance, "ready" (S5107) on the operation panel.

As described above, in the link copy mode, the digital copying machine 1400 successively accesses data on an operating state of the digital copying machine 1410, and displays a message indicating possibility of copying when the digital copying machine 1410 is not in the supply end or print engine error state and is displaying the normal copy screen, and simultaneously when a print engine of the digital copying machine 1410 is not operating. When the digital copying machine 1410 in the supply end state or the print engine error state, or when the digital copying machine 1410 is not displaying the normal copy screen or a print engine thereof is operating, the digital copying machine 1400 displays a message indicating that copying is not possible on the operation panel 201 (S5108).

In the example of operation described above, when it is determined that a slave machine is in the supply end state, a master machine inhibits the link copy mode. Because of this configuration, even when a linked device is at a remote site, it is possible to determined whether a link copy operation can be executed or not only with the master machine currently being operated by a user and without directly checking a supply state in the slave machine, which insures improved operability in the link copy mode.

In the example of operation described above, when a print engine error occurs in a slave machine, a master machine inhibits a link copy operation, so that it is possible to determined whether a link copy operation can be executed or not only with the master machine currently being operated by a user and without directly checking a supply state in the slave machine, which insures improved operability in the link copy mode.

In the example of operation described above, when a slave machine displays a screen other than the normal display screen, the master machine inhibits a link copy operation, so that it is possible to determined whether a link copy operation can be executed or not only with the master machine currently being operated by a user and without directly checking a supply state in the slave machine, which insures improved operability in the link copy mode. Further, a demand for execution of a link copy operation is not sent during initialization or a maintenance work, so that it is possible to prevent initialization or a maintenance work from being interrupted.

In the example of operation described above, when a print engine of a slave machine is operating, the master machine inhibits a link copy operation, so that it is possible to determined whether a link copy operation can be executed or not only with the master machine currently being operated by a user and without directly checking a supply state in the slave machine, which insures improved operability in the link copy mode. Further, as a demand for a link copy operation is not sent from other devices while a print engine is operating, so that it is possible from a print job in execution from being affected by a request from other devices.

A fifth embodiment of the present invention is described with reference to FIG. 53 to FIG. 56. In the fourth embodiment described above, an operating state of other device in communication is checked in the link copy mode, and then a link copy operation is executed, but in this fifth embodiment, such processing as inhibiting selection of the link copy mode is executed in response to an operating state of the other device in communication. The this fifth embodiment, the same processing for sending data concerning an operating state of the local device as that in the fourth embodiment (Refer to FIG. 45 to FIG. 48) is executed. Herein the processing for sending data concerning an operating state of the local machine is not described in detail. An example of operation of the digital copying machine shown in FIG. 14 is described below.

EXAMPLE OF OPERATION 5-1

Figure 52:
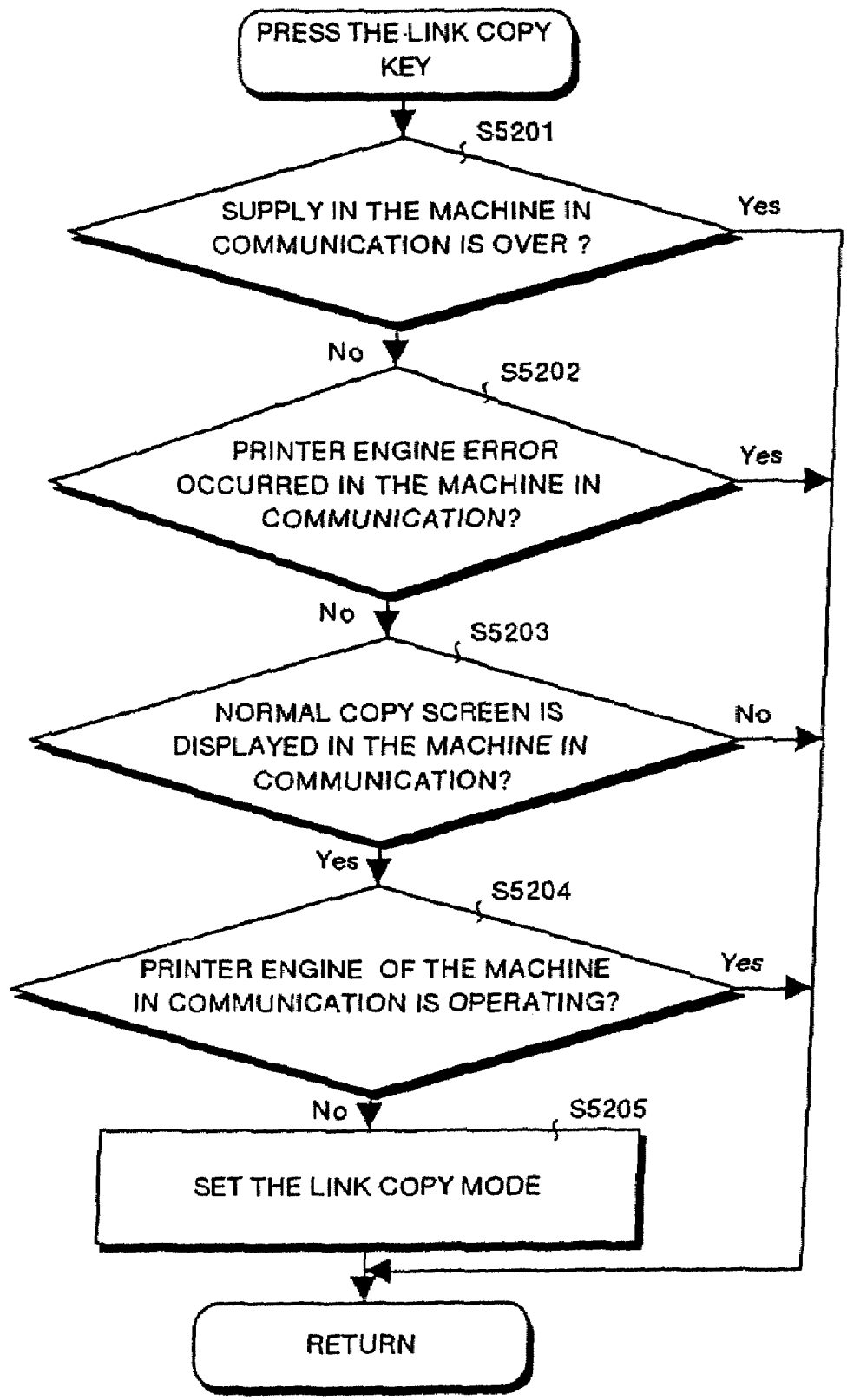
FIG. 52 is a flow chart showing an example of the processing executed when a link copy key according to a fifth embodiment of the present invention is pressed.

FIG. 52 is a flow chart showing an example of processing executed when the link copy key 301 is pressed. When the link copy key 301 is pressed by a user, the digital copying machine 1400 (master machine) at first determines whether a digital copying machine 1410 s an object for linkage (slave machine) is in the supply (recording paper, toner) end state or not (S5201). When it is determined that the digital copying machine 1410 is not in the supply end state, the digital copying machine 1400 further determines whether a print engine error has occurred in the digital copying machine 1410 or not (S5202). When it is determined that the digital copying machine 1410 is not in the print engine error state, the digital copying machine 1400 further determines whether the digital copying machine 1410 is displaying the normal copy screen or not (S5203). When the digital copying machine 1410 is displaying the normal copy screen, the digital copying machine 1400 further determines whether a print engine of the digital copying machine 1410 is operating or not (S5204). When it is determined that a print engine of the digital copying machine 1410 is not operating, the digital copying machine 1400 sets the link copy mode (S5205).

As described above, when the link copy key 301 is pressed, the digital copying machine 1400 determines an operating state of the digital copying machine 1410 connected thereto, and sets only in the case where the digital copying machine 1410 is not in the supply end state nor in the print error state, and also where the digital copying machine 1410 is displaying is not displaying a screen other than the normal copy screen and a print engine of the digital copying machine 1410 is not operating.

Figure 53:
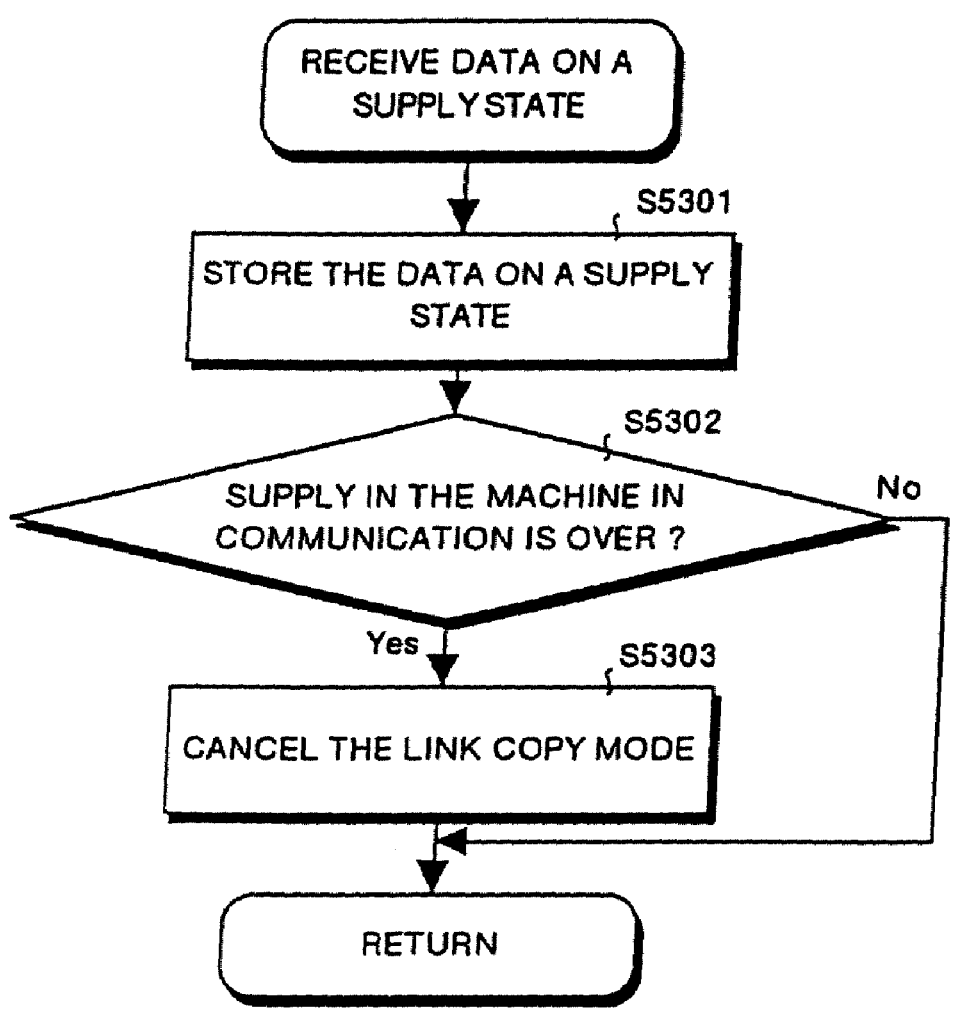
FIG. 53 is a flow chart showing an example of the processing when information concerning a supply state of the machine according to the fifth embodiment of the present invention with which the local machine is communication is received.

FIG. 53 is a flow chart showing an example of the processing executed by the master machine when data on a supply state of other device in communication is received. When data concerning availability of a supply in the digital copying machine 1410 connected to the digital copying machine 1400 is deceived, the digital copying machine 1400 at first stored contents of the data (S5301). The digital copying machine 1400 then determines whether the digital copying machine 1410 is in the supply end state or not (S5302), and when it is determined that the digital copying machine 1410 is in the supply end state, the digital copying machine 1400 cancels the link copy mode (S5303).

As described above, when the slave machine is in the supply end state, the master machine inhibits selection of the link copy mode, so that even when a linked device is at a remote site, it is possible to check whether a supply is available or not in the slave machine only with the master machine currently being operated and without directly checking availability of a supply in the slave machine, which insures improved operability in the link copy mode. Also selection of the link copy mode is inhibited in a state where a link copy operation is not allowable. Because of this configuration, it is possible to alert a user before selection of the link copy mode that a link copy operation is not possible, which insured further improved operability in the link copy mode.

Figure 54:
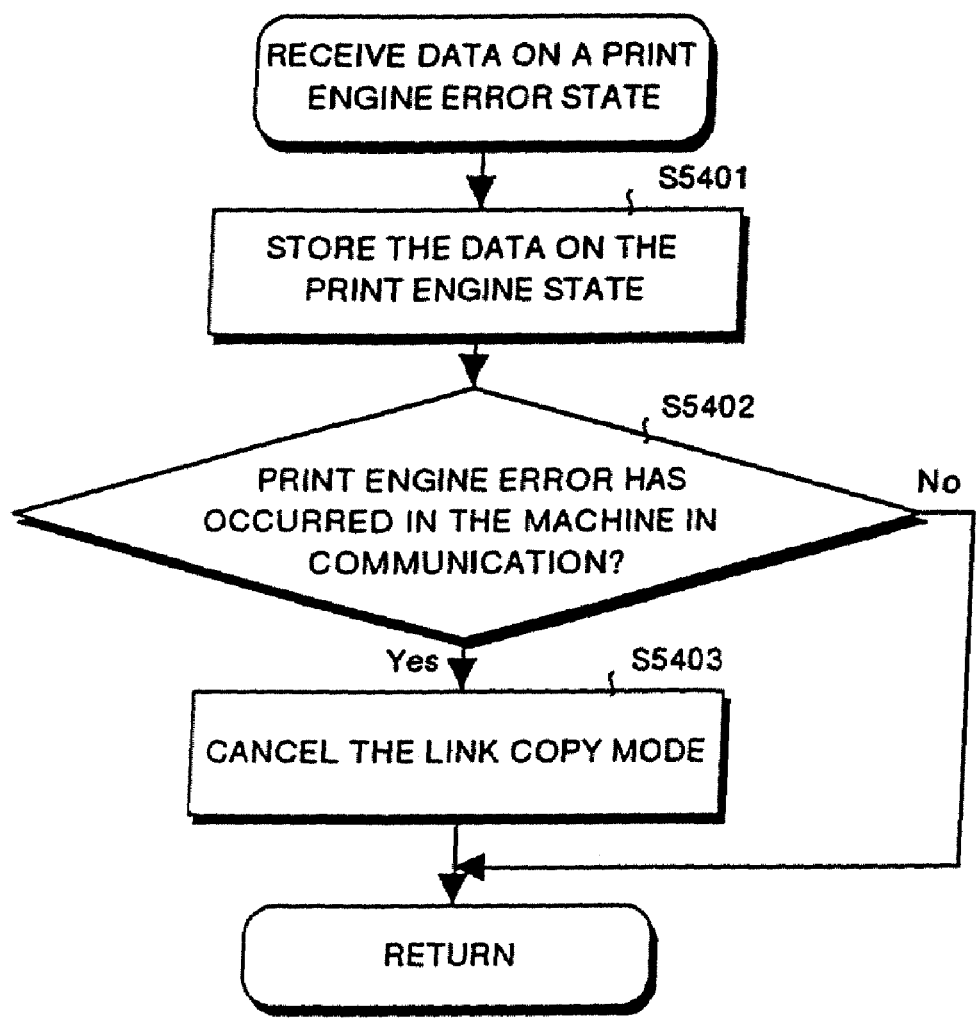
FIG. 54 is a flow chart showing an example of the processing executed when information concerning a state of a print engine in the machine according to the fifth embodiment of the present invention with which the local machine is communicating is received.

FIG. 54 is a flow chart showing the processing executed by the master machine when data concerning a print engine error having occurred in other device in communication is received. When data concerning a print engine error in the digital copying machine 1410 as an object for linkage is received, the digital copying machine 1400 at first stores the contents (S5401). The digital copying machine 1400 further determines whether the digital copying machine 1410 is in the print engine error state or not (S5402), and when it is determined that a print engine error has occurred in the digital copying machine 1410, the digital copying machine 1400 cancels the link copy mode (S5403).

As described above, when a slave machine is in the print engine error state, a master machine inhibits selection of the link copy mode. Because of this configuration, even when a linked device is at a remote site, it is possible to determine whether a link copy operation is possible or not only with the master machine currently being operated by a user and without directly checking whether the slave machine is in the print engine error state or not, which insures improved operability in the link copy mode. Further, when a link copy mode is not allowable, selection of the link copy mode is inhibited, so that it is possible to alert user before selection of the link copy mode that a link copy operation is not possible, which insured further improved operability.

Figure 55:
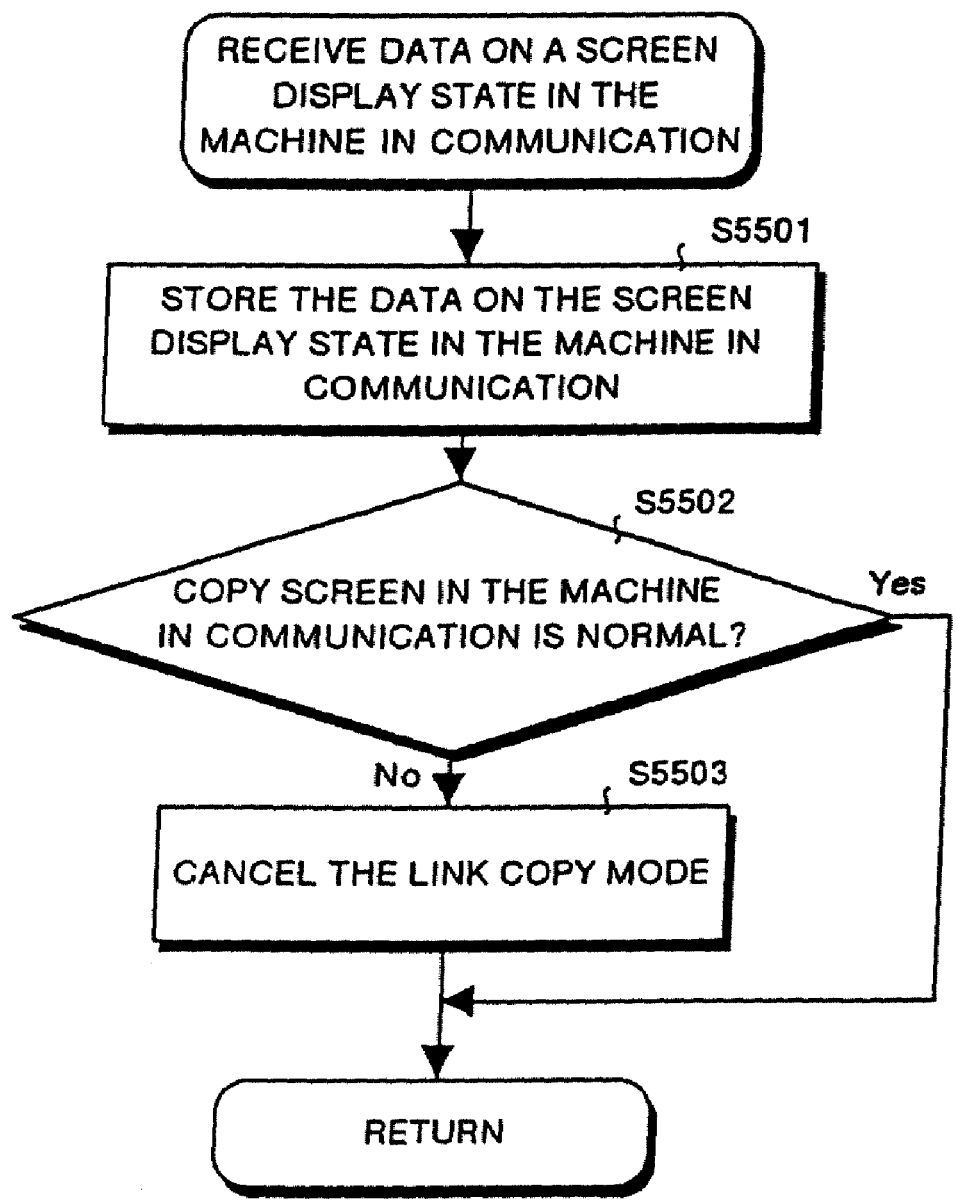
FIG. 55 is a flow chart showing an example of the processing executed when information concerning a state of screen display in the machine according to the fifth embodiment of the present invention with which the local machine is currently communicating is received.

FIG. 55 is a flow chart showing an example of the processing executed by a master machine when data concerning a screen display state of other device in communication is received. When data concerning a screen display state of the digital copying machine 1410 is received, the digital copying machine 1400 at first stores the contents (S5501). The digital copying machine 1400 then determines whether the digital copying machine is displaying the normal copy screen or not (S5502). When it is determined that the digital copying machine 1410 is not displaying the normal copy screen, the digital copying machine cancels the link copy mode (S5503).

As described above, when a slave machine is displaying a screen other than the normal display screen, the master machine inhibits selection of the link copy mode. Because of this configuration, even when a linked device is at a remove site, it is possible to determine whether a link copy operation is possible or not only with the master machine currently being operated by a user and without directly checking a state of a display screen of the slave machine, which insures improved operability in the link copy mode. When a link copy operation is not allowable, selection of the link copy mode is inhibited. Because of this feature, it is possible to alert a user before selection of the link copy mode that a link copy operation is not possible, which insured further improved operability. In addition, a demand of a link copy operation is not sent from other device during initialization or a maintenance work, so that the initialization or maintenance work is not interrupted.

Figure 56:
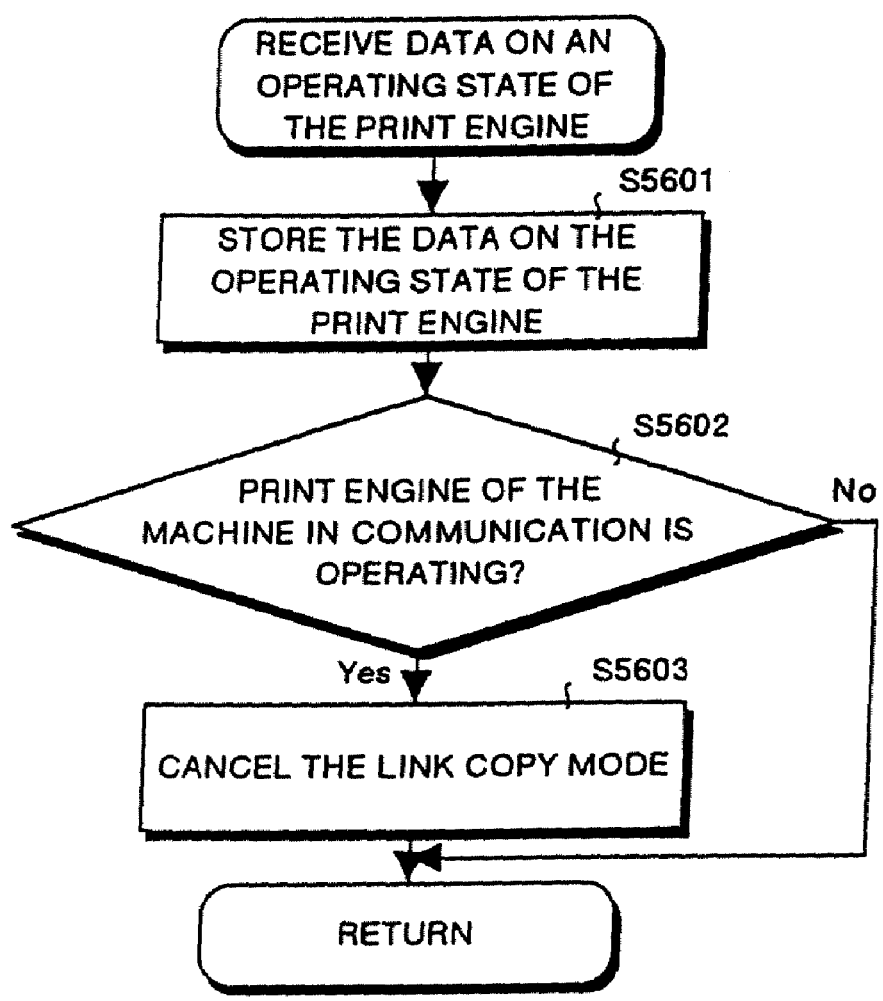
FIG. 56 is a flow chart showing an example of the processing executed when information concerning an operating state of a print engine in the machine according the fifth embodiment of the present invention with which the local machine is currently communicating is received.

FIG. 56 is a flow chart showing an example of the processing executed by the master machine when data on an operating state of a print engine in the other device in communication. When data on an operating state of a print engine of the digital copying machine 1410 as an object for linkage is received, the digital copying machine 1400 at first stores the contents (S5601). The digital copying machine 1400 further determines whether a print engine of the digital copying machine 1410 is operating or not (S5602), when a print engine of the digital copying machine 1410 is operating, the digital copying machine 1400 cancels the link copy mode (S5603).

As described above, when a print engine of a slave machine is operating, a master machine inhibits selection of the link copy mode. Because of this configuration, it is possible to determine whether a link copy operation is possible or not only with the master machine currently being operated by a user and without directly checking an operating state of the slave machine, which insures operability in the link copy mode. When a link copy operation is not allowable, selection of the link copy mode is inhibited, so that it is possible to alert a user before selection of the link copy mode that a link copy operation is not possible, which insured further improved operability. In addition a demand for a link copy operation is not sent from other device when a print engine is operating, so that a printing job in executed is not affected by other devices.

A sixth embodiment of the present invention is described hereinafter with reference to FIG. 57 to FIG. 67. Configuration of a digital copying machine according to the sixth embodiment is the same as that in the third embodiment. In this sixth embodiment, the link copy mode is automatically selected based on data concerning a number of sheets to be printed, a number of sheets of document, a total number of images to be prepared or other factors.

Figure 57:
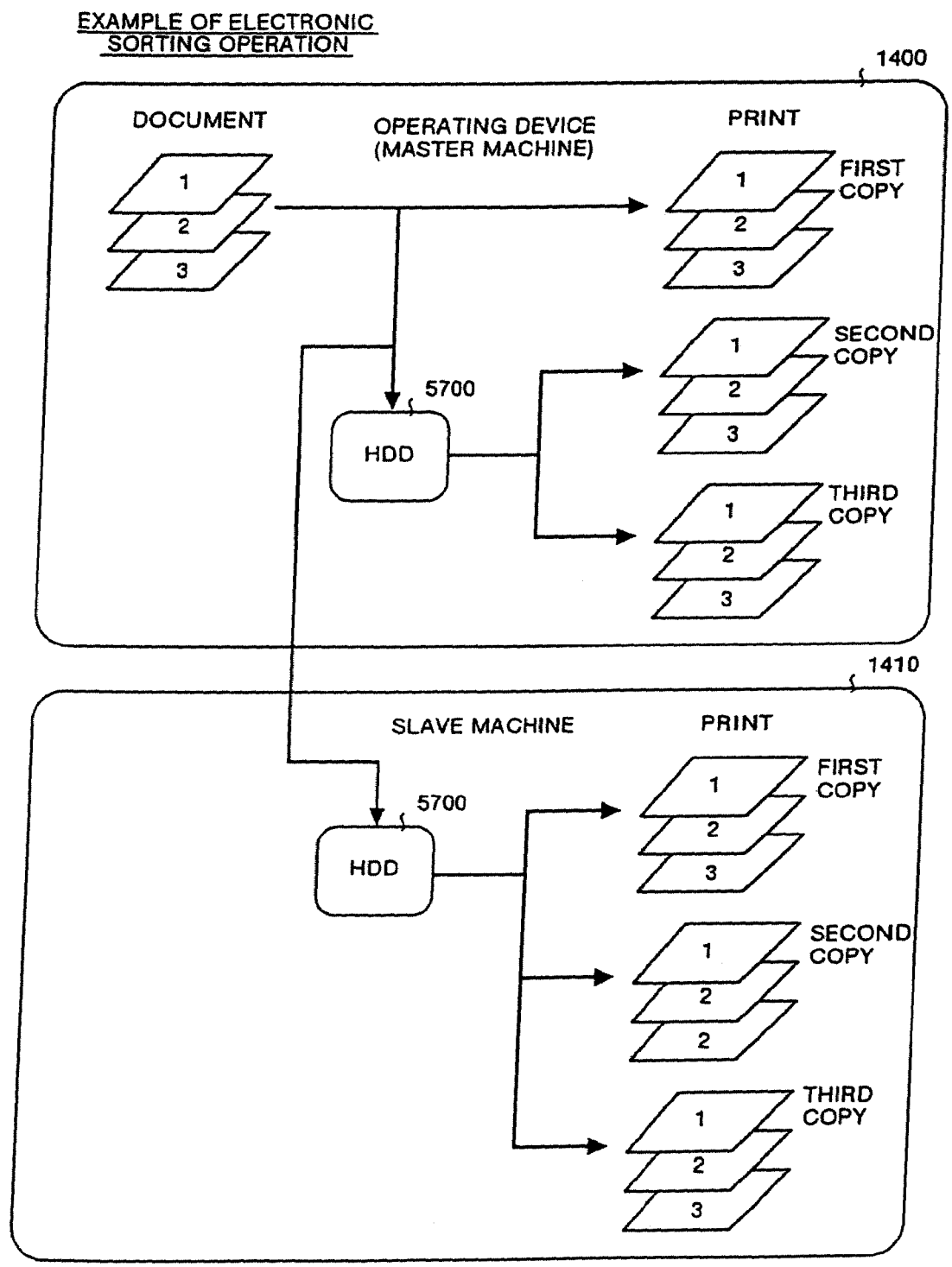
FIG. 57 is a view showing the general contents of the operations in the electronic sort mode when the link copy operation according to a sixth embodiment of the present invention is executed.

FIG. 57 shows an outline of the operations in an electronic sorting mode when the link copy mode is set. In this figure, when six copies of a document comprising three sheets are to be prepared, an operating device (master digital copying machine 1400) and another device (slave digital copying machine 1410) prepare and sort three copies of the document respectively.

The master digital copying machine 1400 usually executes an operation for reading a document and an operation for printing the read image. Actually the master machine prints a scanned image as it is, and at the same time writes the image in a HDD 5700 having the same function as that of the primary memory 706 described above. After a first print is over, a next image is read out from the HDD 5700 to prepare a second copy, and then a third copy is prepared.

The slave digital copying machine 1410 stores an image sent from the master digital copying machine 1400 in the HDD 5700. After the image is stored, an operation for printing is executed. After the first copy is printed, second and third copies are prepared successively. In the case described above, a half of a specified number of copies are prepared by each of the master and slave machines, but the allotment can freely be set, and even when a printing operation is interrupted in either one of the devices, a number of sheets for printing allocated to each device can easily be changed. In addition, a number of remaining copies to be prepared can be changed during interruption of the printing operation.

Figure 58:
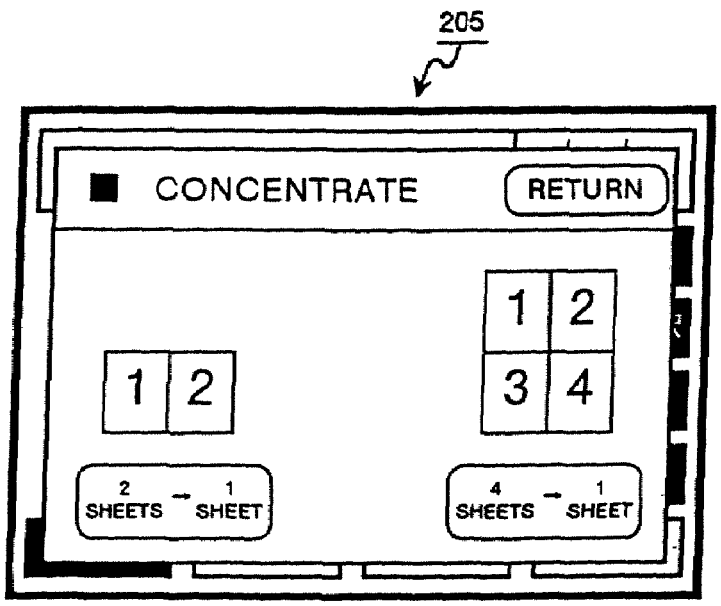
FIG. 58 is a view showing an example of a detail function setting screen displayed when a concentrate key according to the sixth embodiment of the present invention is pressed.
Figure 59:
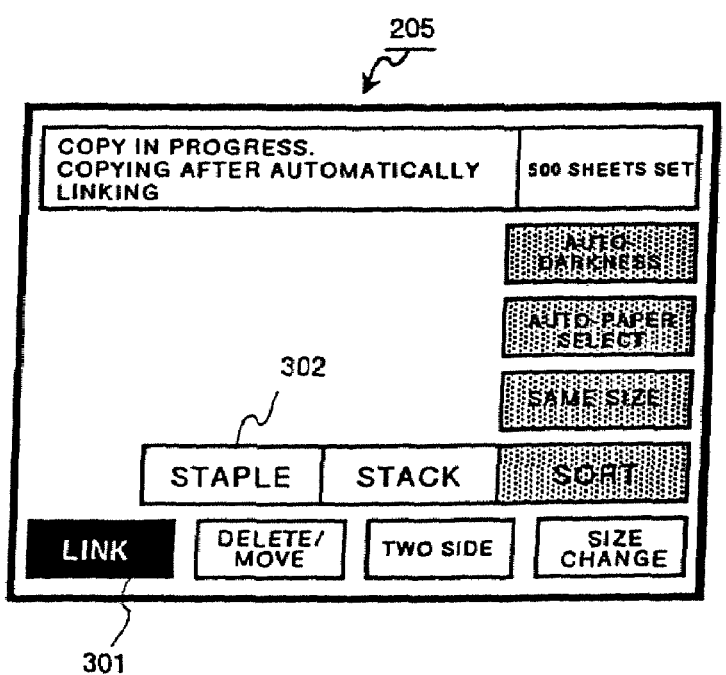
FIG. 59 is a view showing an example of a screen shown when a copying operation is being executed in the link copy mode according to the sixth embodiment of the present invention.

FIG. 58 shows an example of a setting screen of detail functions displayed when the concentrate key is pressed. On this screen, the concentrate mode for copying images of two sheets or four sheets of document can be set. FIG. 59 shows an example of a screen display when a copy operation is automatically linked in the link copy mode. In this example, 500 sheets of set documents are being copied in the link copy mode with the message of "Copy in progress. Copying after automatically linking" being displayed thereon.

Figure 60:
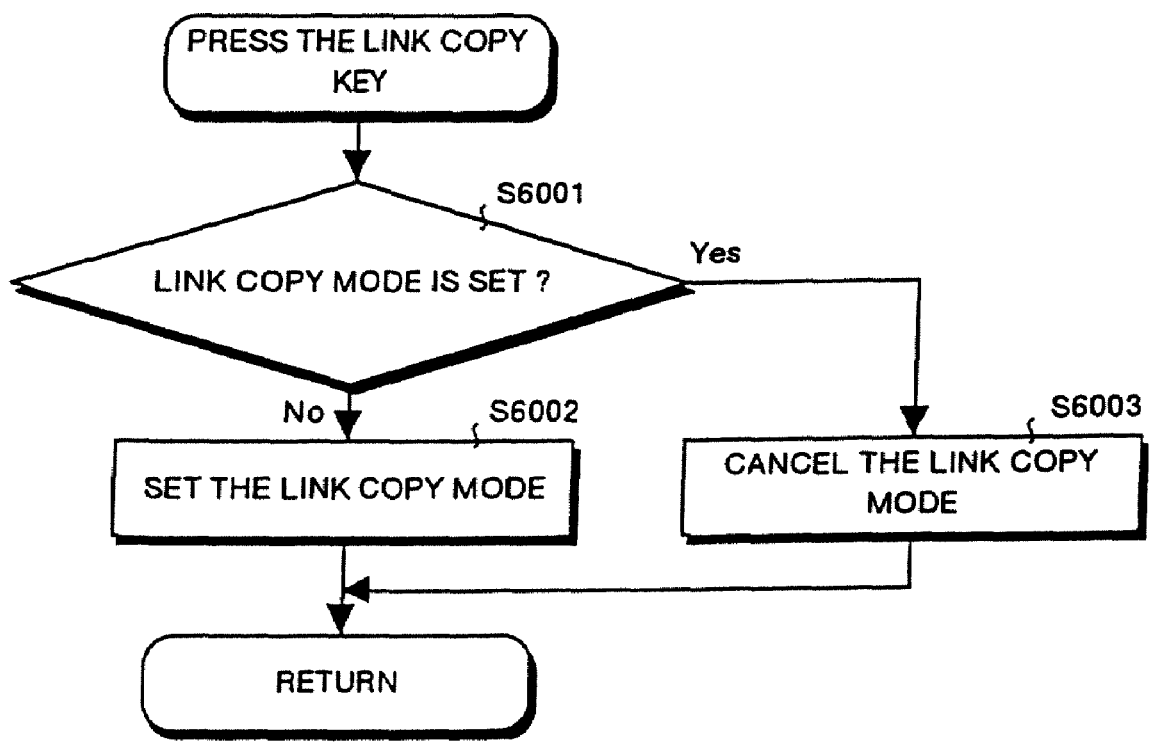
FIG. 60 is a flow chart showing an example of the processing executed when a link copy key on a liquid crystal touch panel according the sixth embodiment of the present invention.

Operations for Setting/Canceling the Link Copy Mode:

FIG. 60 is a flow chart showing an example of the processed executed when the link copy key 301 is pressed. When the link copy key 301 is pressed by a user, the digital copying machine determines whether the link copy mode has been set or not (S6001). When it is determined that the link copy mode has not been set, the digital copying machine sets the link copy mode (S6002), displays the link copy key 301 in the reverse video, and displays a message indicating that the link copy mode has been selected. When it is determined that the link copy mode has been set, the digital copying machine cancels the link copy mode when the link copy key 301 is pressed (S6003). Further, the digital copying machine cancels the inverted display of the link copy key 301 and displays a message that the link copy mode has been canceled.

EXAMPLE OF OPERATIONS OF A MASTER MACHINE

Figure 61:
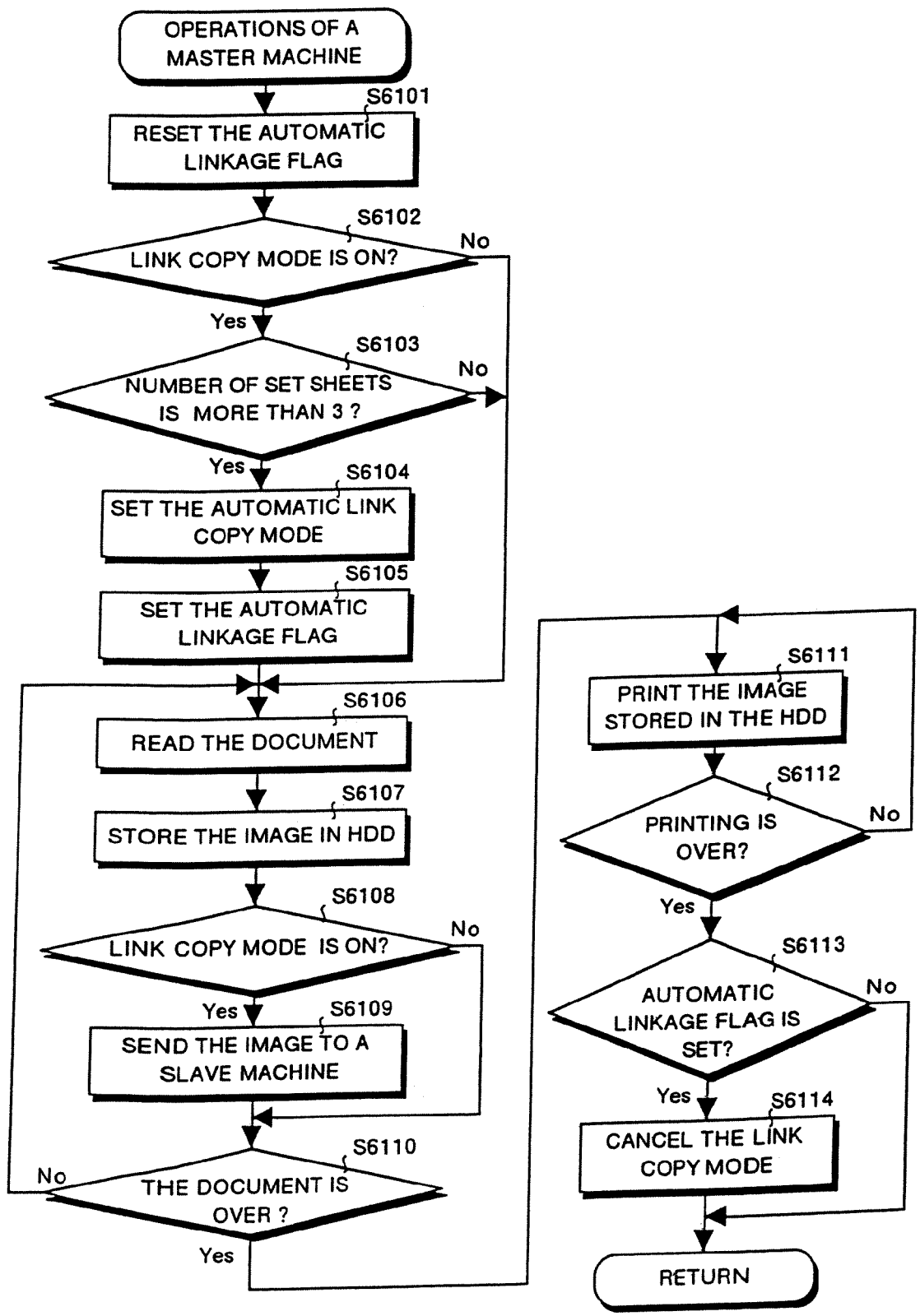
FIG. 61 is a flow chart showing a first example of the operation of a master machine just after a start key according to the sixth embodiment of the present invention is pressed.

FIG. 61 is a flow chart showing a first example of operations executed by a master digital copying machine 1400 in the link copy mode when a start key 202 is pressed. The master digital copying machine 1400 at first resets the automatic linkage flag (S6101), and determines whether the link copy mode has been set or not (S6102). If the link copy mode has not been set, the master digital copying machine 1400 determines whether a number of set sheets is more than a specified value (three in this case) or not (S6103).

When it is determined that a number of set sheets is more than a specified value, the master digital copying machine 1400 sets the link copy mode (S6104), and set the automatic linkage flag (S6105). After the automatic linkage flat is set, or when it is determined in step S6102 that the link copy mode has not been set, or when it is determined in step S6103 that a number of set sheets is less than a specified value, the master digital copying machine 1400 reads the document (S6106), and stores the image in the HDD 5700 (S6107).

The master machine then determines whether the link copy mode has been set or not (S6108). When it is determined that the link copy mode has been set, the master machine 1400 reads the image from the HHD 5700, and sends the image data to the slave digital copying machine 1410 (S6109). The master digital copying machine 1400 then determines whether the document has completely been read or not (S6110), and when it is determined that the document has completely been read, the master digital copying machine 1400 prints (copies) the image stored in the HDD 5700 onto recording paper. The master machine then determines whether the printing job is over or not (S6112), and when it is determined that the printing job is over, the master machine 1400 further determines whether the automatic linkage flag has been set or not (S6113). When it is determined that the automatic linkage flag is set, the master digital copying machine 1400 cancels the link copy mode (S6114).

As described above, when a number of set sheets to be copied is more than a specified value, namely when a long time is required for formation of a series of images, the link copy mode is automatically set, which insures improved productivity in printing. Further, the link copy mode is automatically effected even to a user who does not know the function for link copy mode, so that the print processing with high productivity can be executed.

When the link copy mode is automatically executed and a copy job is finished, the link copy mode is automatically canceled, and a state before start of the print job is automatically restored. Because of this configuration, it is possible to prevent a linked device from being occupied for a long time.

SECOND EXAMPLE OF OPERATION OF MASTER MACHINE

Figure 62:
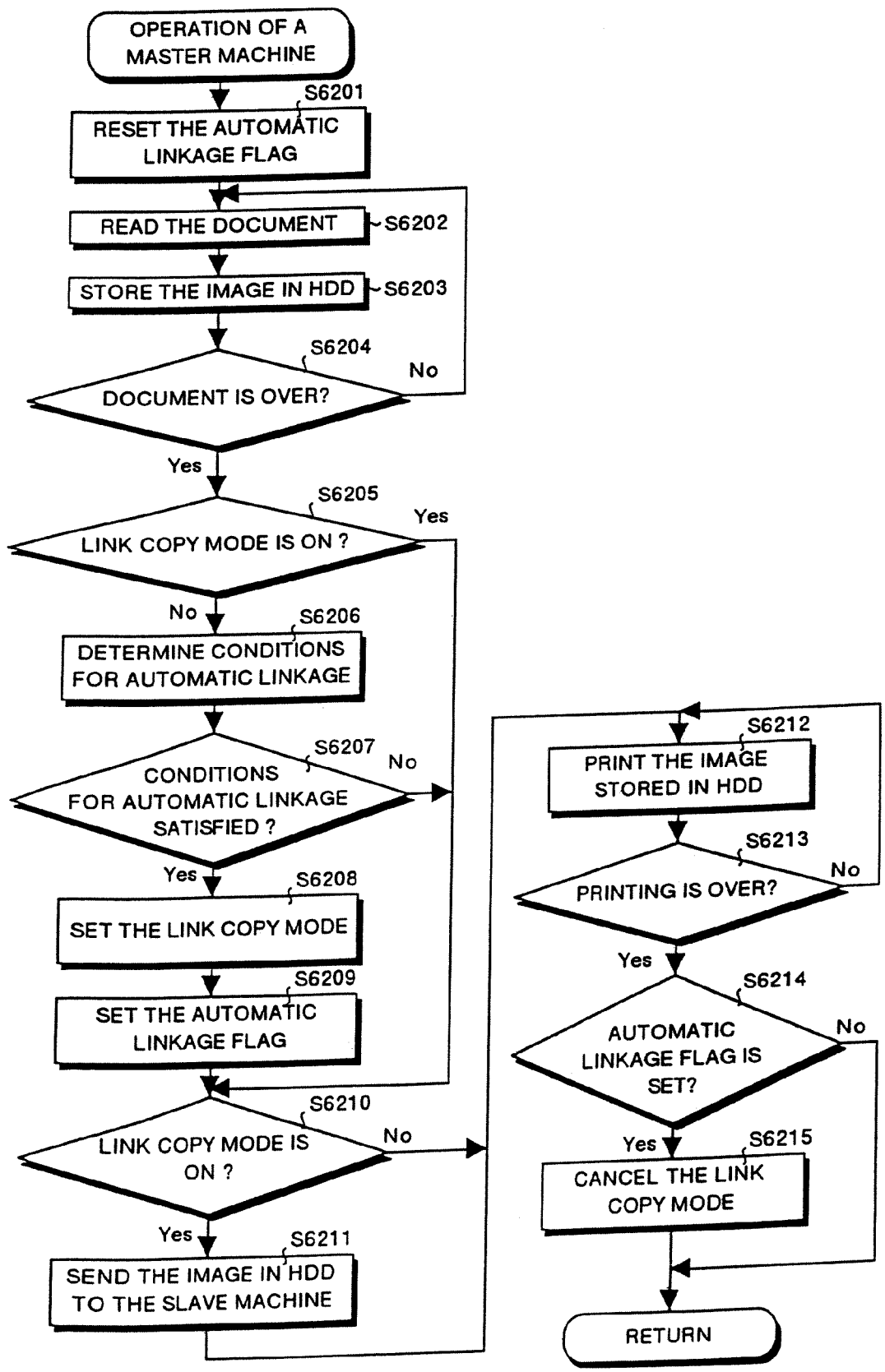
FIG. 62 is a flow chart showing a second example of the operation of the master machine just after the start key according to the sixth embodiment of the present invention is pressed.

FIG. 62 is a flow chart showing a second example of operations executed by the master machine when the start key 202 is pressed. In FIG. 62, the master digital copying machine 1400 at first resets the automatic linkage flag (S6201), reads a document (S6202), and then stores the image in the HDD 5700 (S6203). The master digital copying machine 1400 then determines whether the document has completely been read or not (S6204), and when it is determined that the document has completely been read, the master machine 1400 further determines whether the link copy mode has been set or not (S6205). When it is determined that the link copy mode has been set, the master digital copying machine 1400 executes the processing in step S6210. On the other hand, when it is determined that the link copy mode has not been set, the master digital copying machine 1400 executes the processing for determining whether conditions for operations in the link copy mode are satisfied or not (Refer to FIG. 63 to FIG. 65) (S6206), and determines whether the conditions for operation in the link copy mode have been established or not (S6207).

When it is determined in step S6207 that the conditions for operations in the link copy mode have been established, the master digital copying machine 1400 sets the link copy mode (S6208), and sets the automatic linkage flag (S6209). The master digital copying machine 1400 then determines whether the link copy mode has been set or not (S6210). When it is determined that the link copy mode has been set, the master digital copying machine 1400 sends the image stored in the HDD 5700 to the slave digital copying machine 1410 for execution of printing (S6211). Further, the master digital copying machine 1400 prints (copies) the image stored in the HDD 577 on recording paper (S6212). Thus a printing job is shared by the master digital copying machine 1400 and slave digital copying machine 1410. The master digital copying machine 1400 then determines whether the printing job has completely been finished or not (S6213), and when it is determined that the printing job has completely been finished, the master digital copying machine 1400 further determines whether the automatic linkage flag has been set or not (S6214). When it is determined that the automatic linkage flag has been set, the master digital copying machine 1400 cancels the link copy mode (S6215).

Examples 1 to 3 of processing for determining whether the conditions for operations in the link copy mode in step S6206 are described below with reference to FIG. 63 to FIG. 65.

EXAMPLE 1 OF THE PROCESSING FOR AUTOMATICALLY DETERMINING WHETHER CONDITIONS FOR OPERATIONS IN THE LINK COPY MODE HAVE BEEN ESTABLISHED OR NOT

Figure 63:
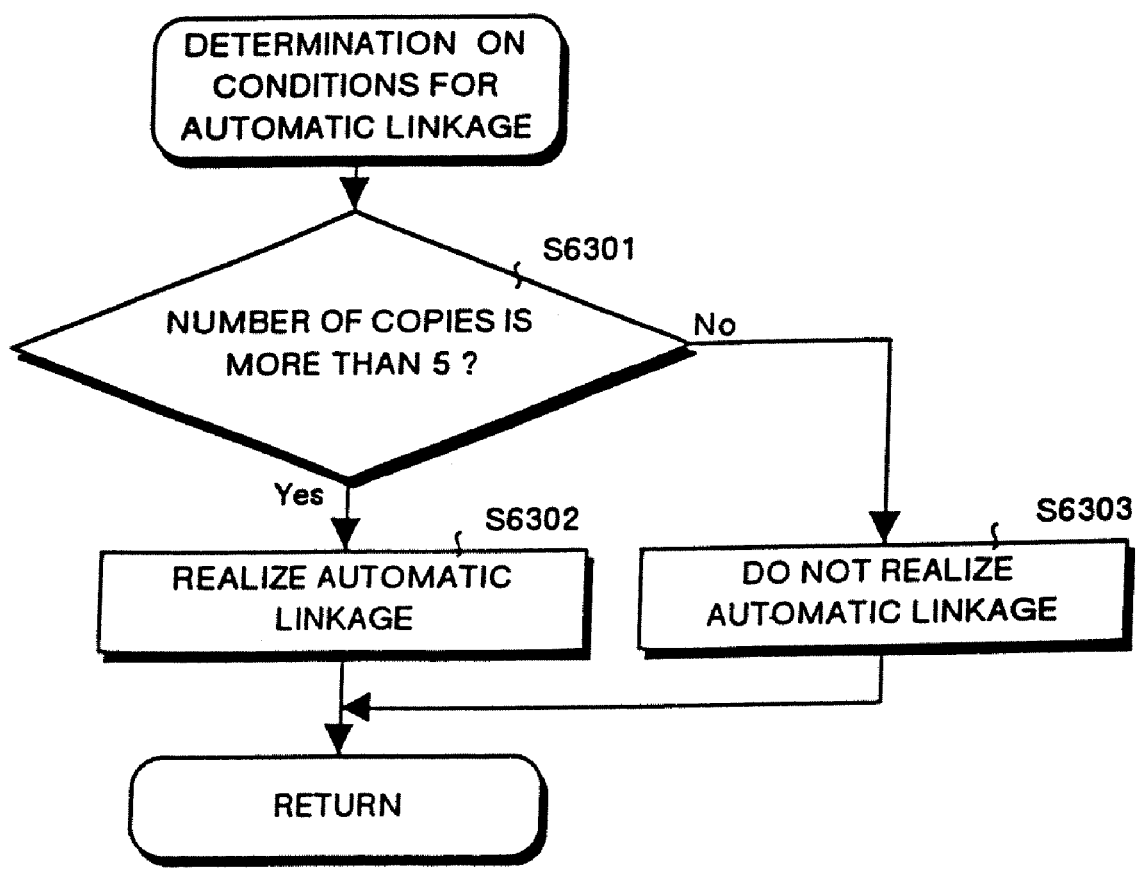
FIG. 63 is a flow chart showing an example of the processing according to the sixth embodiment of the present invention in which a criteria for determining whether the link copy operation should automatically be started is a number of pages of a document.

FIG. 63 is a flow chart showing example 1 of the processing for determining whether conditions for operations in the link copy mode have been established or not in the step S6206 above. In this example 1, a criteria for determining whether the conditions for operations in the link copy mode or not is a number of sheets of document.

In FIG. 63, the master machine at first determines whether a number of sheets of document is more than a specified value (five sheets in this case) or not (S6301). When it is determined that a number of sheets of document is five sheets or more, the master machine 140 determines that the conditions for operations in the link copy mode has been established, and displays a message indicating that "automatic linkage is to be realized" on the operation panel 201 (S6302). On the other hand, when it is determined that a number of sheets of document is less than "5", the master digital copying machine 1400 determines that the conditions for operations in the link copy mode have not been established, and displays a message indicating that "automatic linkage is not to be realized" on the operation panel 201 (S6303).

As described above, when a number of sheets of document is more than a specified value, namely when it is expected that a long time is required to form a series of images, the link copy mode is set, which insures improved productivity in printing. Further, even to a user who does not know a function for printing in the link copy mode, the link copy mode is automatically effected, which makes it possible to realize the print processing with high productivity.

EXAMPLE 2 OF THE PROCESSING FOR AUTOMATICALLY DETERMINING WHETHER CONDITIONS FOR OPERATIONS IN THE LINK COPY MODE HAVE BEEN ESTABLISHED OR NOT

Figure 64:
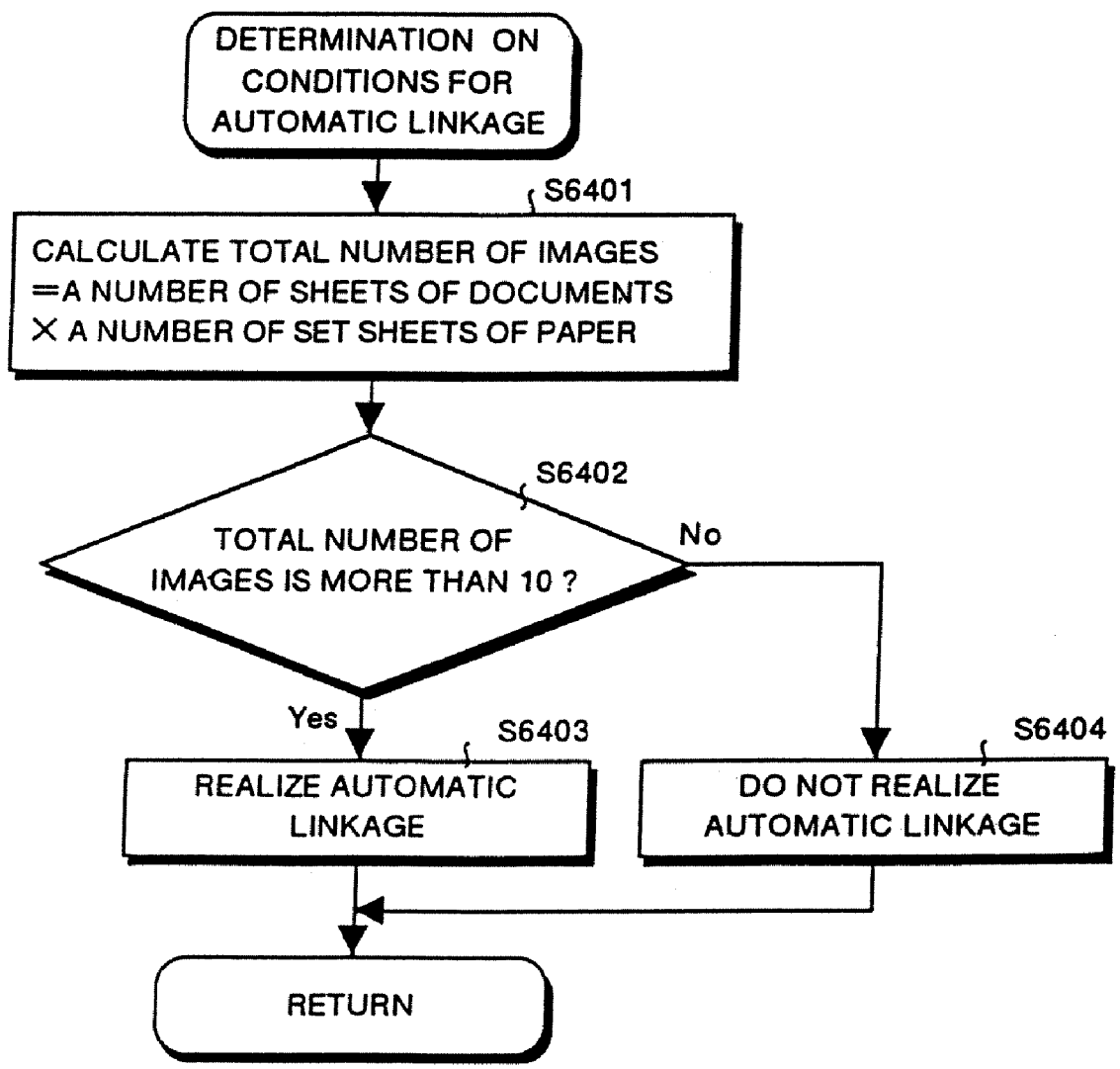
FIG. 64 is a flow chart showing an example of the processing according to the sixth embodiment of the present invention in which a criteria for determining whether the link copy operation should automatically be started is a total number of images.

FIG. 64 is a flow chart showing the processing for automatically determining whether conditions for operations in the link copy mode have been established or not in step S6201 described above. In this example 2 of the processing, a criteria for determining whether the conditions for operations in the link copy mode is a total number of images.

In FIG. 64, the master digital copying machine 1400 at first calculates a total number of images (=a number of sheets of document×a number of set sheets) (S6401), and determines whether the total number of images is more than a prespecified value (10 in this example) or not (S6402). When it is determined that the total number of images is "10" or more, the master digital copying machine 1400 determines that the conditions for operations in the link copy mode are satisfied, and displays a message that the "link copy operation is to be realized" on the operation panel 201 (S6403). When it is determined that the total number of images is less than "10", the master digital copying machine 1400 does not set the link copy mode, and displays a message that the "link copy operation is not to be realized" on the operation panel 201 (S6403).

As described above, when a total number of images is not less than a prespecified value, namely, when it is expected that a long time is required for forming a series of images, the link copy mode is automatically set, so that the link copy mode is set on accurate conditions, which insures improved productivity in printing. Further, even to a user who does not know a function for the link copy mode, the link copy mode is automatically effected, which makes it possible to realize the print processing with high productivity.

EXAMPLE 3 OF THE PROCESSING FOR AUTOMATICALLY DETERMINING WHETHER CONDITIONS FOR OPERATIONS IN THE LINK COPY MODE HAVE BEEN ESTABLISHED OR NOT

Figure 65:
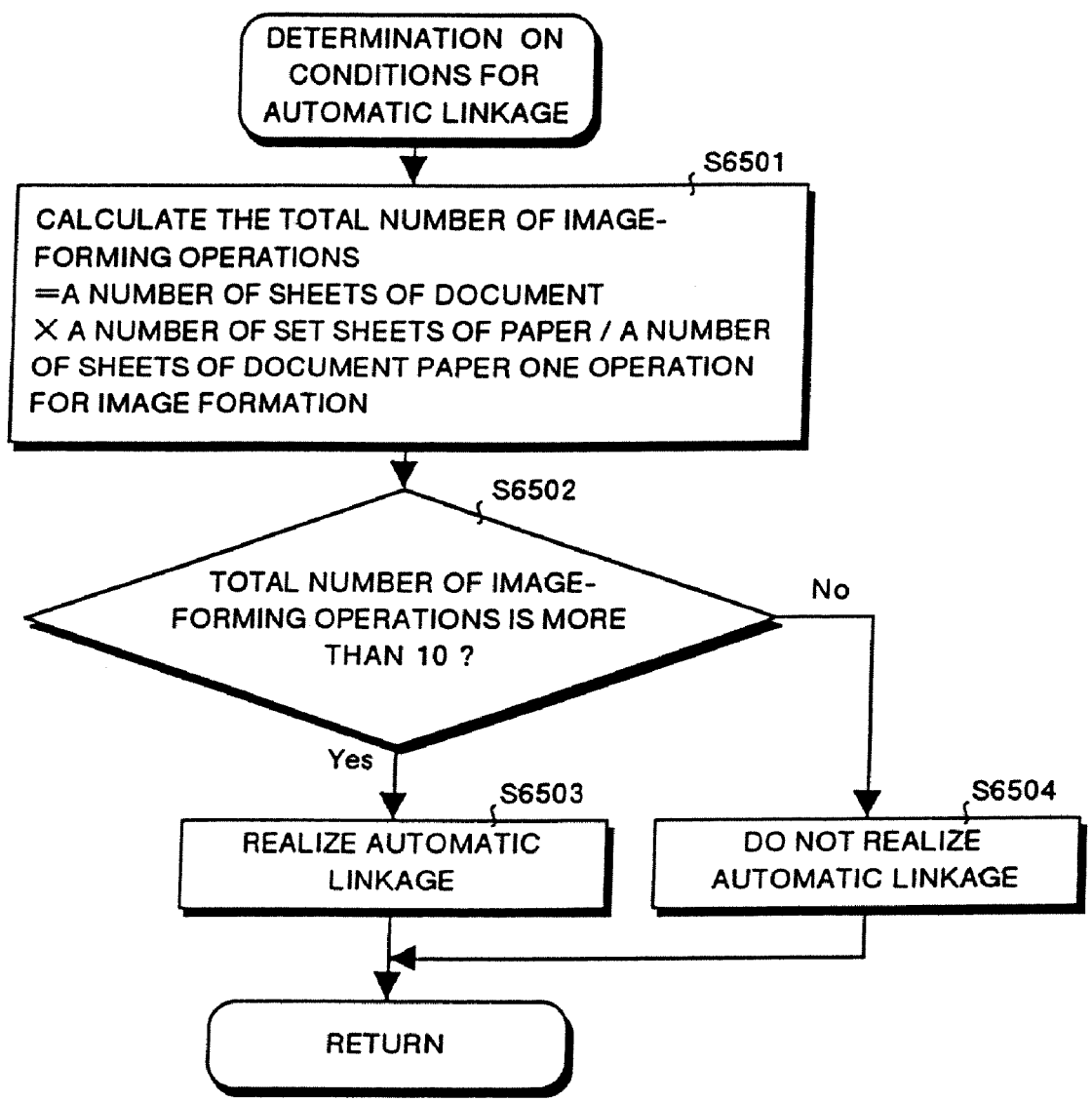
FIG. 65 is a flow chart showing an example of the processing when a criteria for determining whether the link copy operation should automatically be started is a total number of times the images are prepared.

FIG. 65 is a flow chart showing the example 3 of the processing for automatically determining whether conditions for operations in the link copy mode have been established or not. In this example 3 of the processing, a criteria for automatically determining whether conditions for operations in the link copy mode have been established or not is a total number of operation for image formation.

In FIG. 65, the master digital copying machine 1400 at first calculates a total number of operations required for image formation (=a number of sheets of document×a number of set sheets/a number of sheets of document per one image-formation surface (S6501), and determines whether a total number of operations for image formation is more than a prespecified value (10 in this example) or not (S6502). When it is determined that the total number of operations is "10" or more, the master machine determines that conditions for operations in the link copy mode are satisfied, and displays a message that the "link copy operation is to be realized" on the operation panel 201 (S6503). When it is determined that the total number of operations for image formation is less than 10, the master digital copying machine 1400 determines that the conditions for the link copy mode are not satisfied, and displays a message that the "link copy operation is not to be realized" (S6403). This determination is useful for instance in the concentrate mode described above.

As described above, when a total number of operations required for image formation is not less than a prespecified value, namely when it is expected that a long time is required for forming a series of images, the link copy mode is automatically set. Because of this configuration, when the conditions for the link copy mode correspond to the concentrate mode, a printing job can be executed more accurately with high productivity. Further, even to a user who does not know a function for the link copy mode, the link copy mode is automatically effected, which makes it possible to realize the print processing with high productivity.

Figure 66:
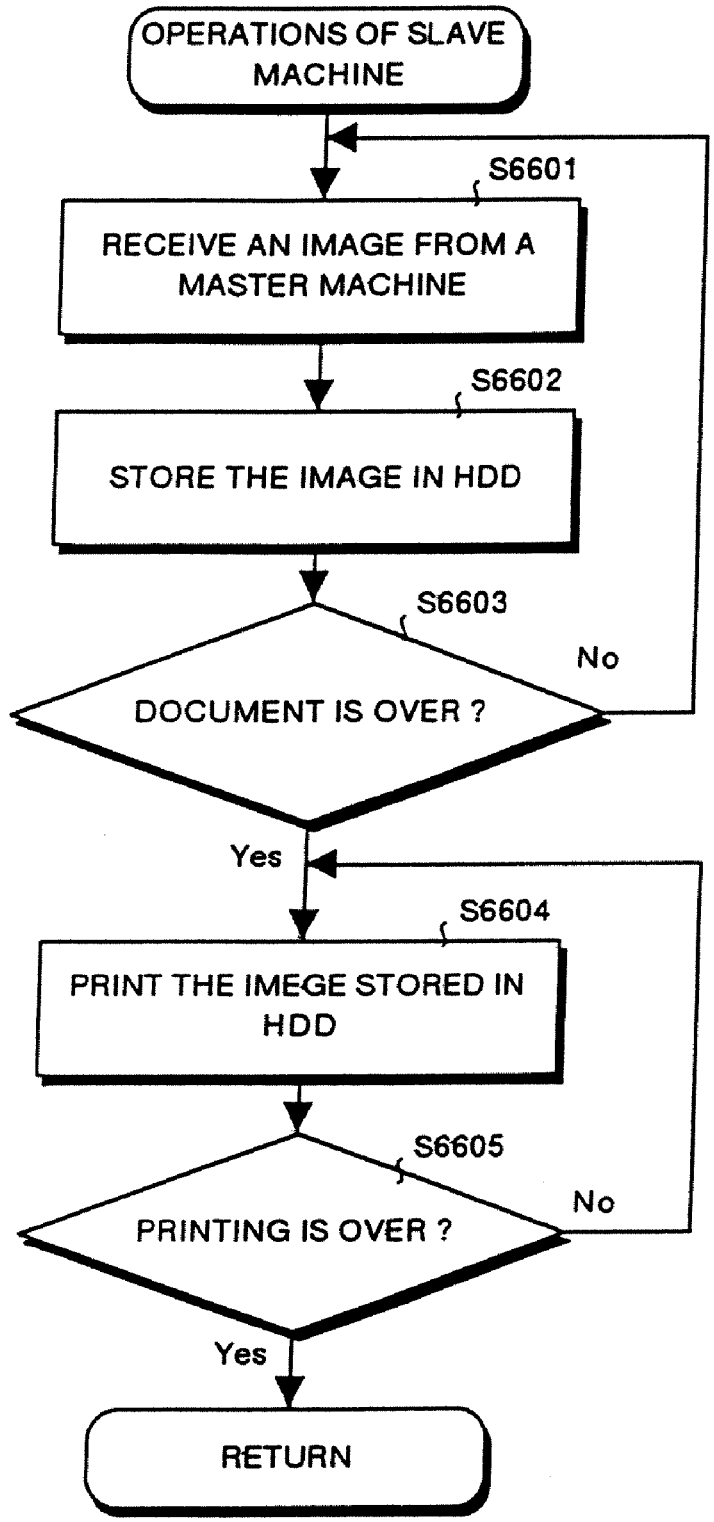
FIG. 66 is a flow chart showing an example of the processing executed in the slave machine when an operation for copying is executed in the link copy mode according to the sixth embodiment of the present invention.

Operations of a Slave Machine:

FIG. 66 is a flow chart showing an example of operations executed by a slave machine in the link copy mode. In FIG. 66, at first the slave digital copying machine 1410 receives an image from the master 1400 (S6601), and stores the received image in the HDD 5700 (S6602). The slave digital copying machine 1410 then determines whether all of the documents to be printed have completely been read or not (S6603). When it is determined that images for the document have completely be read, the slave digital copying machine 1410 reads out the images stored in the HDD 5700, and executes printing (S6604). The slave digital copying machine 1410 then determines whether all of the required images have been printed or not (S6605), and repeats the processing described above until all of the images are printed.

EXAMPLE OF A DISPLAY INDICATING THAT THE LINK COPY HAS BEEN SET

Figure 67:
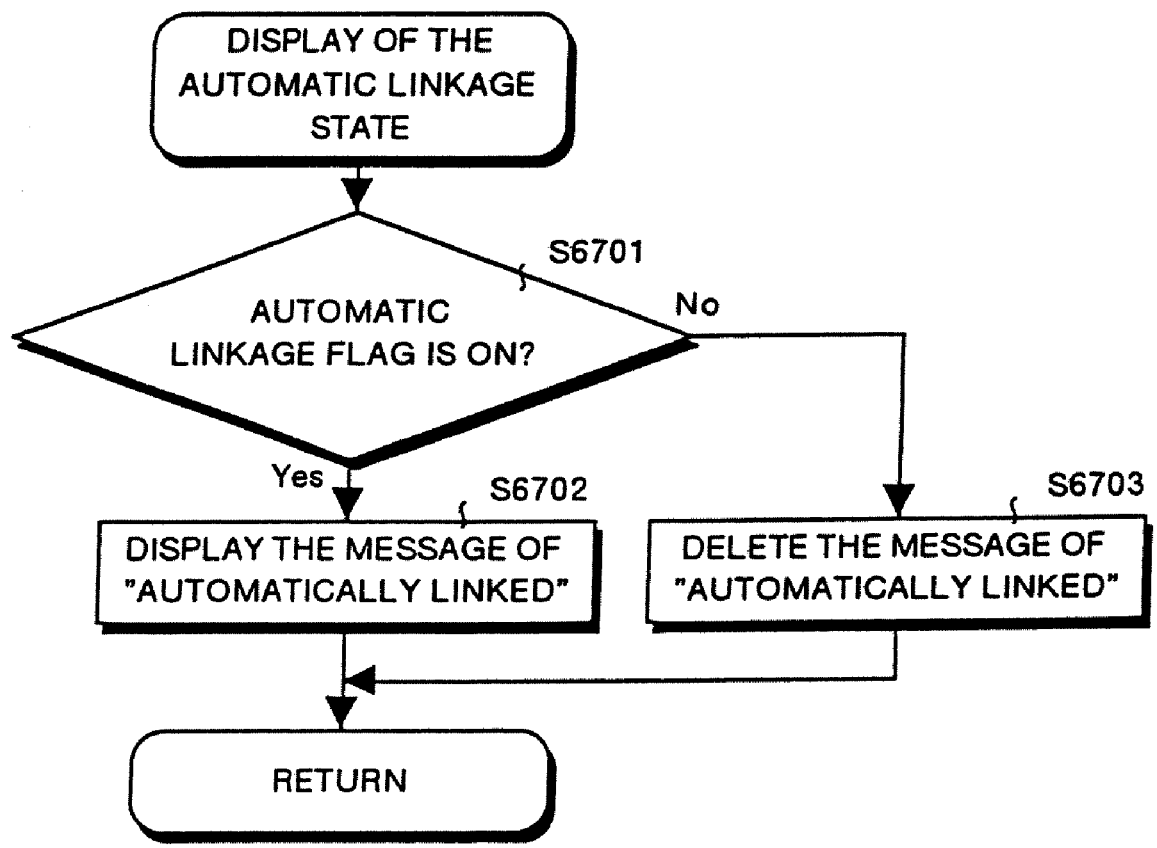
FIG. 67 is a flow chart showing an example of an operation for outputting a display screen for the automatic link copy operation according to the sixth embodiment of the present invention shown in FIG. 59.

FIG. 67 is a flow chart showing an example of an operation for outputting the automatic linkage display screen shown in FIG. 59. In FIG. 67, the master digital copying machine 1400 determines whether the automatic linkage flag is ON or not (S6701). When it is determined that the automatic linkage flag is ON, the master digital copying machine 1400 displays a message of, for instance, "Automatically linked" on the operation panel (S6702) (Refer to FIG. 59). When the automatic linkage flag is OFF, the master digital copying machine 1400 deletes the message of "Automatically linked" on the operation panel 201 (S6703).

With this display control, a user can confirm that an operation in the link copy mode is automatically started. Further, when printed paper is taken out from the discharge paper tray, the necessity of taking out recording paper from a discharge paper tray in a linked device is alerted to the user, so that such a mistake as leaving printed paper left in a device for a long time can be prevented. When a printing job in the link copy mode is over, a state before start of the job is automatically restored, so that it is possible to prevent a linked device from being occupies by another device for along time.

A seventh embodiment of the present invention is described below with reference to FIG. 68 to FIG. 72. In the fourth embodiment of the present invention, digital copying machines connected to each other (a master machine and a slave machine) send the data related to their operating state to each other. In the seventh embodiment, only a slave machine sends data on an operating state thereof to a master machine.

Figure 68:
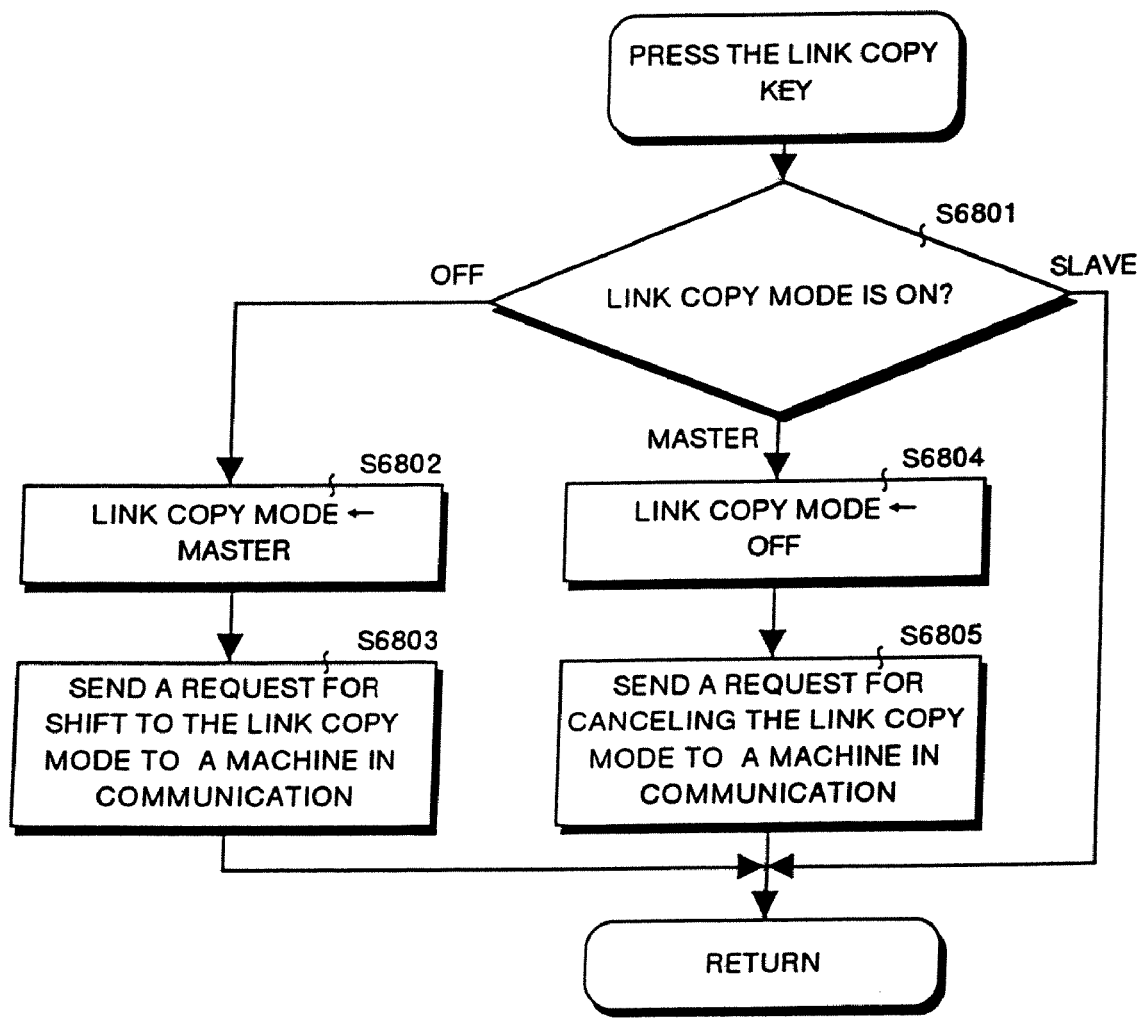
FIG. 68 is a flow chart showing operations of a digital copying machine when a link copy key according to a seventh embodiment of the present invention is pressed.

FIG. 68 is a flow chart showing operations executed by a digital copying machine when the link copy key 301 is pressed. In FIG. 68, when the link copy key 301 is pressed, the digital copying machine determines whether the link copy mode has been set or not (step S6801). When it is determined that the link copy mode has not been set, the digital copying machine starts functioning as a master machine in response to pressing of the link copy key 301 (S6802), and sends a request for shift to the link copy mode to another device to be linked thereto (a slave machine) (step S6803) with the system control returned to an initial stage of the operating sequence.

When it is determined in step S6801 that the link copy mode has been set with the local device having been as a master machine, the digital copying machine turns OFF the link copy mode (step S6804), and sends a request for canceling the link copy mode to the device in communication (slave machine) (step S6805) with the system control returned to an initial step of the operating sequence when the local machine is a slave machine the system control is returned to the initial step.

Figure 69:
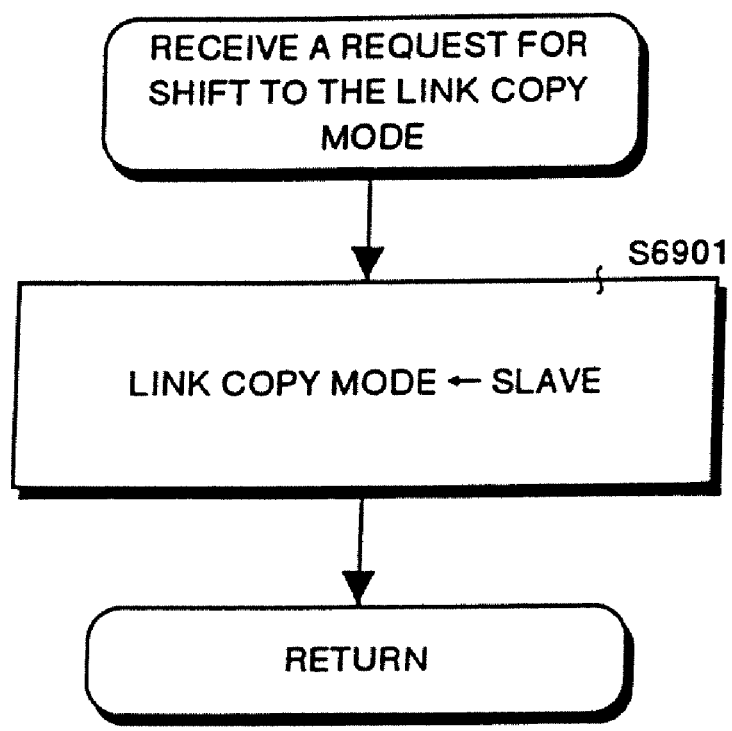
FIG. 69 is a flow chart showing operations executed when a digital copying machine according to the seventh embodiment of the present invention receives a request for shift to the link copy mode.

Operations executed when a digital copying machine receives a request for shift to the link copy mode is described below with reference to FIG. 69. FIG. 69 is a flow chart showing operations executed by a digital copying machine when a request for shift to the link copy mode is received by the digital copying machine. In FIG. 69, when the digital copying machine receives a request for shift to the link copy mode from a master machine, the digital copying machine sets the link copy mode (step S6901) with the system control returned to an initial step of the processing sequence. With this operation, this digital copying machine starts functioning as a slave machine.

Figure 70:
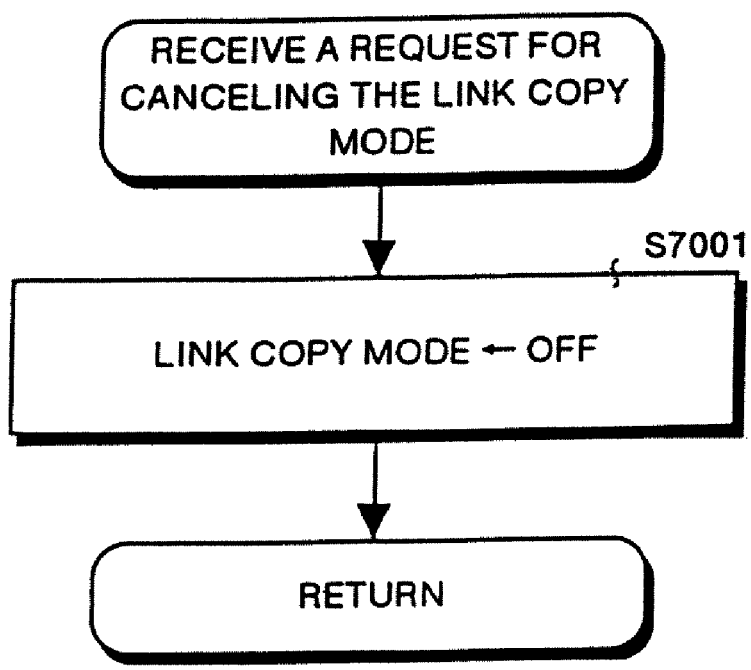
FIG. 70 is a flow chart showing operations executed when the slave machine according to the seventh embodiment of the present invention receives a request for canceling the link copy mode from the master machine.

FIG. 70 is a flow chart showing operations executed by a slave machine when the slave machine receives a request for canceling the link copy mode from a master machine. In FIG. 70, when the slave machine receives a request for canceling the link copy mode from the master machine, the slave machine cancels the link copy mode (step S7001) with the system control returned to an initial step of the processing sequence.

Figure 71:
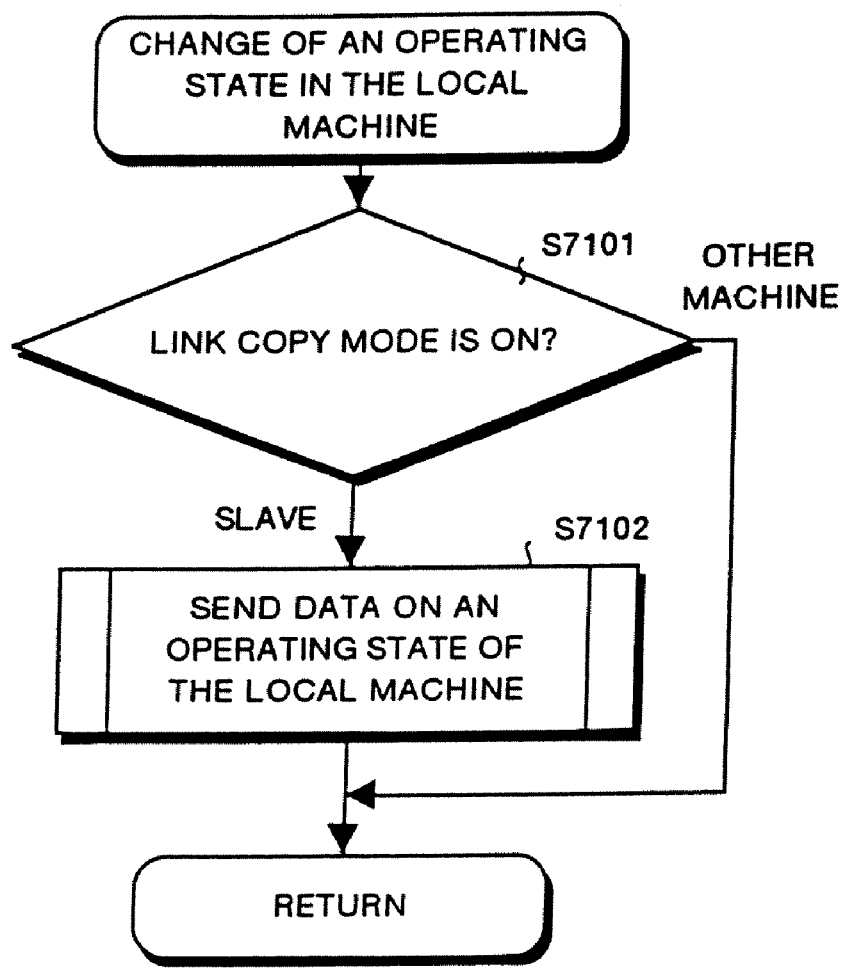
FIG. 71 is a flow chart showing operations executed when the operating state of the digital copying machine according to the seventh embodiment of the present invention changes.

FIG. 71 is a flow chart showing operations executed by a digital copying machine when the operating state of the digital copying machine changes. In FIG. 71, when the operating state of a digital copying machine changes, the digital copying machine determines whether the machine has been specified as a slave machine with link copy mode ON or not (step S7101). When it is determined that the digital copying machine has been specified as a slave machine and the link copy mode is ON, the slave machine executes the same processing for sending data on an operating state of the device as that shown in FIG. 45 (step S7102) with the system control returned to an initial step of the processing sequence. More specifically, data concerning a supply state is sent when a state of supply (such as toner or recording paper with a required size) changes, data on a print engine error when a print engine error occurs, data on a screen display state when a screen display state changes, and an operating state of a print engine when an operating state of a print engine changes to the master machine respectively. Otherwise (when the digital copying machine is specified as a master machine with the link copy mode ON, or when the link copy mode has not been set), the digital copying machine returns the system control in step S7101 to an initial step of the processing sequence.

Figure 72:
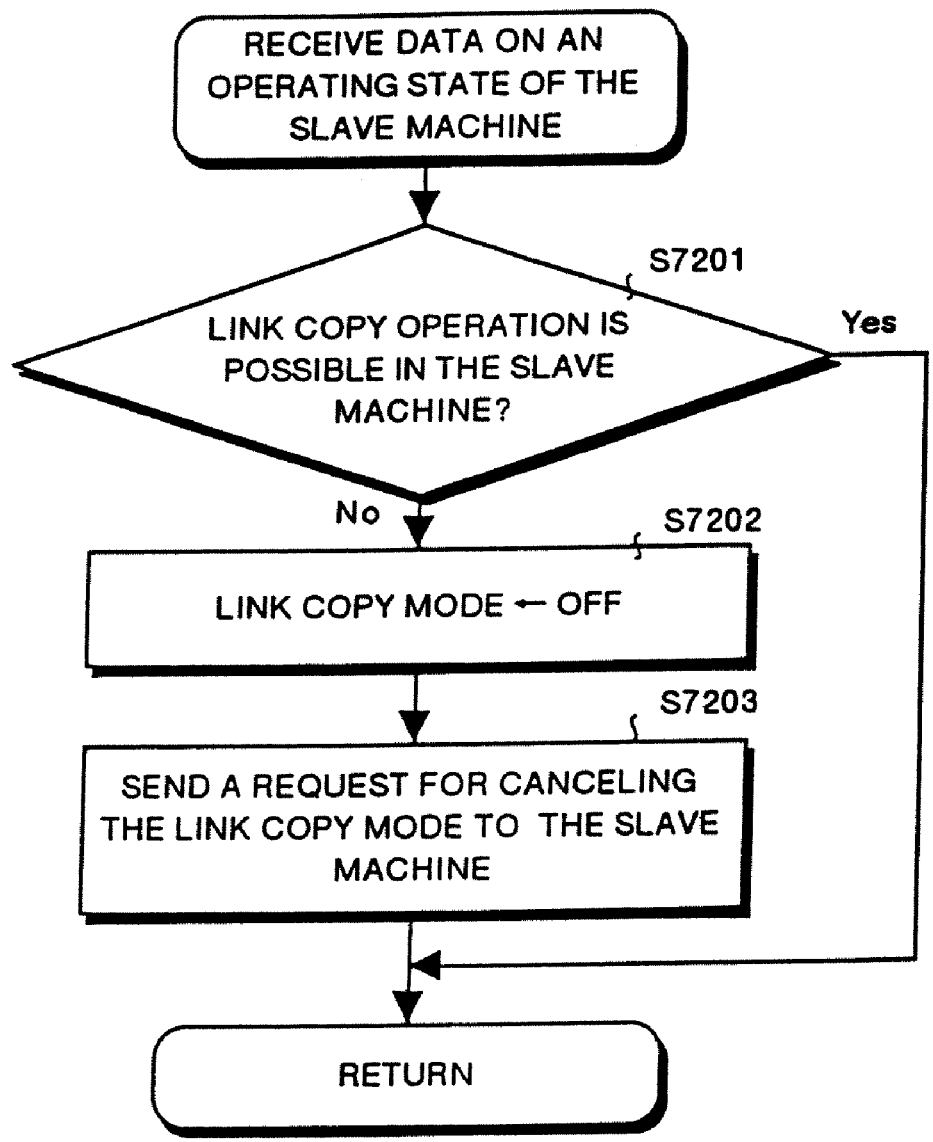
FIG. 72 is a flow chart showing operations executed when the master machine according to the seventh embodiment of the present invention receives information concerning an operating state of the slave machine from the slave machine.

FIG. 72 is a flow chart showing operations executed by the master machine when the master machine receives data concerning an operating state of a slave machine.

In FIG. 72, when the master machine receives data on an operating state of a slave machine from the slave machine, the master machine determines whether the slave machine is ready for operations in the link copy mode or not (step S7201). When it is determined that the slave machine is not ready for operations in the link copy mode, the master machine turns OFF the link copy mode (step S7202), and sends a request for canceling the link copy mode to the slave machine (step S7203) with the system control returned to an initial step of the processing sequence. When it is determined that the slave machine is ready for operations in the link copy mode, the master machine returns a system control to an initial step of the processing sequence in step S7201.

In the seventh embodiment, only a slave machine sends data on an operating state of the slave machine to a master machine, and transmission of data on an operating state of a master machine is not required, which saves unnecessary operations in communication. Namely, a slave machine is not required to check an operating state of a master machine, which insured improved operability.

An eighth embodiment of the present invention is described below. In the fourth embodiment, a digital copying machine functioning as a master machine determines whether a link copy operation is possible or not. In the eighth embodiment, a slave machine determines whether a link copy operation is possible or not.

Figure 73:
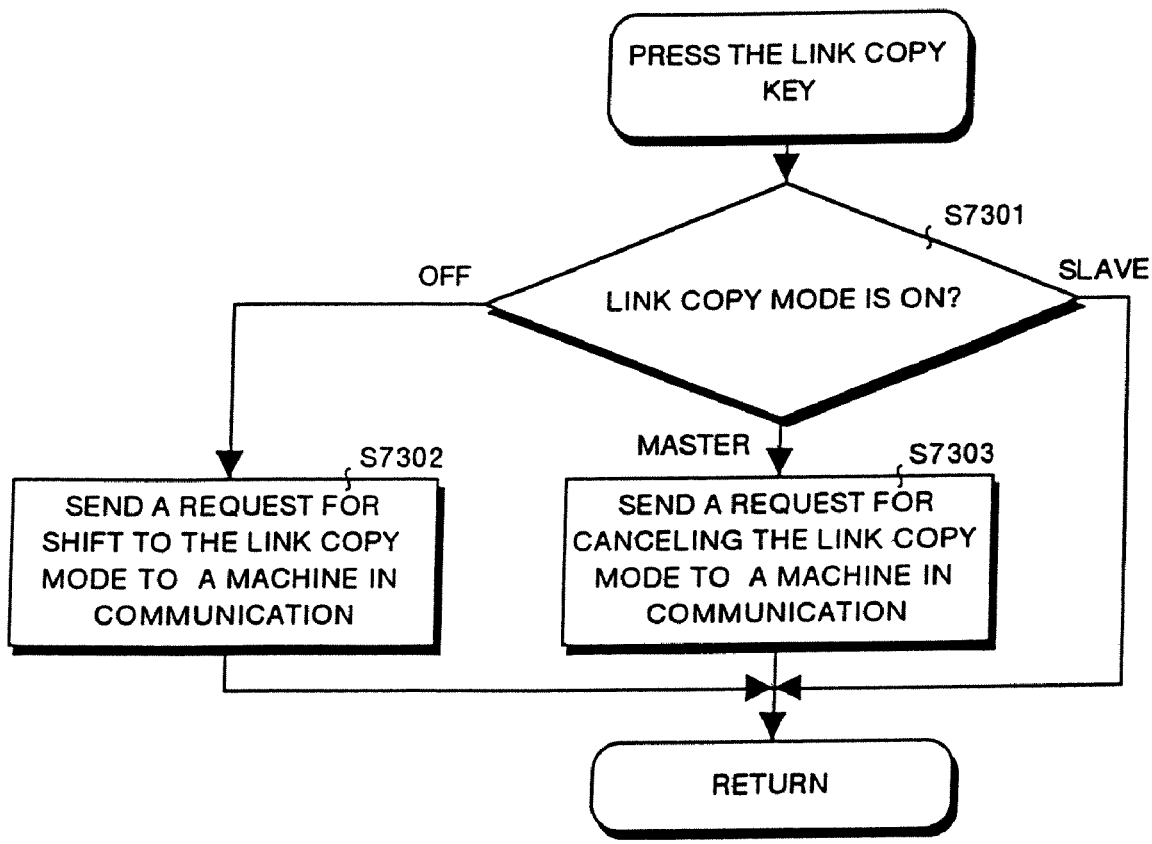
FIG. 73 is a flow chart showing operations of the digital copying machine when a link mode key according to an eighth embodiment of the present invention is pressed.

FIG. 73 is a flow chart showing operations executed by a digital copying machine when the link copy key 301 is pressed. In FIG. 73, when the link copy key 301 is pressed, the digital copying machine determines whether the link copy mode has been set or not (step S7301). When it is determined that the link copy mode has not been set, the digital copying machine sends a request for shift to the link copy mode to a device in communication as an object for linkage (slave machine) to set the link copy mode in response to pressing of the link copy key 301 (step S7302) with the system control returned to an initial step of the processing sequence.

When it is determined in step S7301 that the link copy mode has been set with the local device specified as a master machine, the digital copying machine sends a request for canceling the link copy mode to a device in communication as an object for linkage (slave machine) to cancel the link copy mode in response to pressing of the link copy key 301 (step S7303) with the system control returned to an initial step of the processing sequence.

Figure 74:
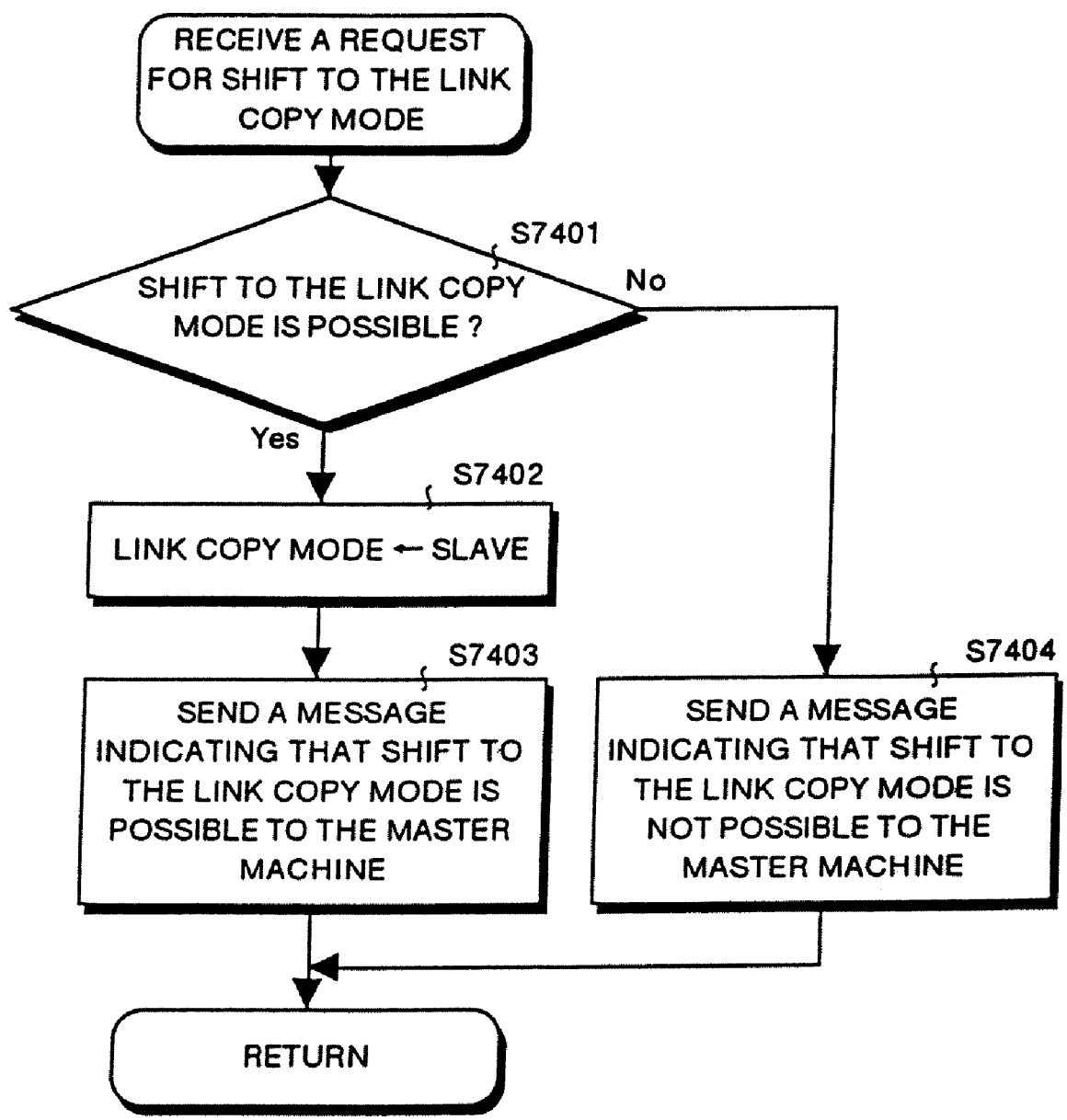
FIG. 74 is a flow chart showing operations executed when the digital copying machine according to the eighth embodiment of the present invention receives a request for shift to the link copy mode.

FIG. 74 is a flow chart showing operations executed by a digital copying machine when the digital copying machine receives a request for shift to the link copy mode. In FIG. 74, when a request for shift to the link copy mode, the digital copying machine determines whether shift to the link copy mode is possible or not (step S7401). More specifically, the digital copying machine determines whether shift to the link copy mode is possible or not by checking whether the device is in the supply (recording paper, toner) end state or not, whether the device is in the print engine error or not, whether the device is displaying the normal copy screen or not, or whether a print engine of the device is normally operating or not. The digital copying machine determines that shift to the link copy mode is possible when the device is not in the supply end state, nor in the print engine error state, and when the device is displaying the normal copy screen and a print engine of the device is not operating. When any one of the conditions that the device is in the supply end state or in the print engine error state, that the device is not displaying the normal copy screen, and that a print engine of the device is operating is satisfied, the digital copying machine determines that shift to the link copy mode is not possible.

When it is determined that shift to the link copy mode is possible, the digital copying machine sets the link copy mode and stars functioning as a slave machine (step S7402), and sends a message indicating the possibility of shift to the link copy mode to the digital copying machine having sent a request for shift to the link copy mode (step S7403) with the system control returned to an initial step of the processing sequence. When it is determined in step S7401 that shift to the link copy mode is not possible, the digital copying machine sends a message indicating impossibility of shift to the link copy mode to the digital copying machine having sent to the request for shift to the link copy mode.

Figure 75:
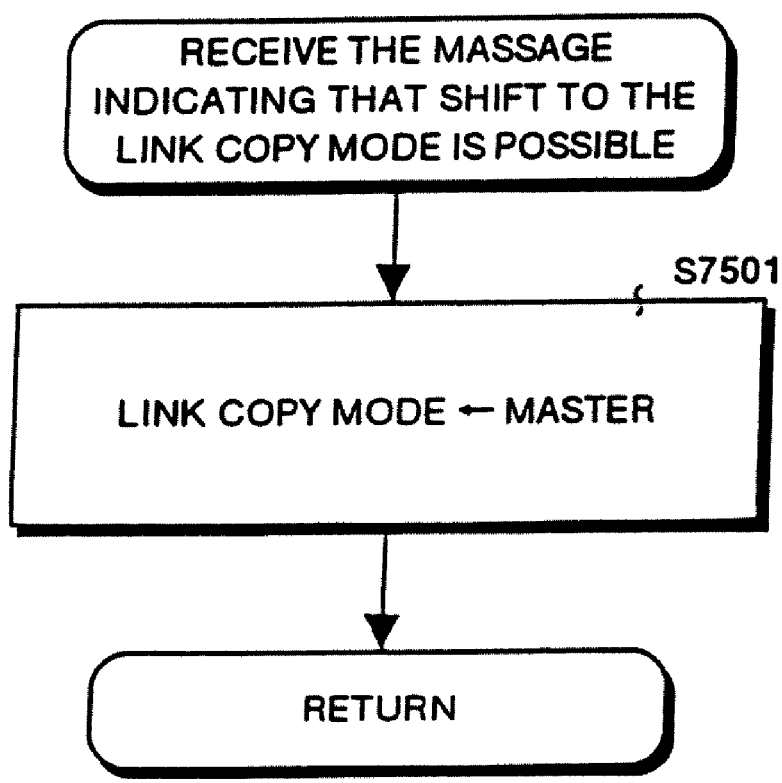
FIG. 75 is a flow chart showing operations executed when the digital copying machine having transmitted a request for shift to the link copy mode according to the eighth embodiment of the present invention receives acknowledgement of the request for shit to the link copy mode from the slave machine.

FIG. 75 is a flow chart showing operations executed when a digital copying machine having sent a request for shift to the link copy mode receives a message indicating possibility of shift to the link copy mode from a slave machine. In FIG. 75, when a digital copying machine having send a request for shift to the link copy mode receives a message indicating possibility of shift to the link copy mode from a slave machine, the digital copying machine sets the link copy mode and starts functioning as a master machine (step S7501) with the system control returned to an initial step of the processing sequence.

Figure 76:
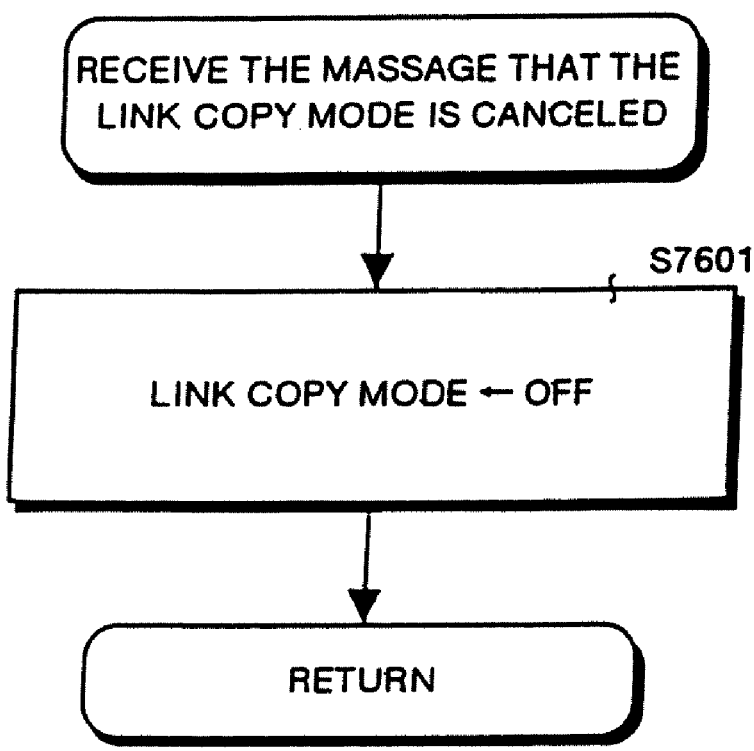
FIG. 76 is a flow chart showing operations executed when the master machine having transmitted a request for canceling the link copy mode according to the eighth embodiment of the present invention receives acknowledgement of the request for canceling the link copy mode from the slave machine.

FIG. 76 shows operations executed when a master machine having sent a request for canceling the link copy mode receives a message indicating possibility of canceling the link copy mode from a slave machine. When a master machine sends a request for canceling the link copy mode to a slave machine, the slave machine determines whether the link copy mode can be canceled in the device or not, and returns the result of determination to the master machine. In FIG. 76, when the master machine receives the message indicating possibility of canceling the link copy mode from the slave machine (step S7601), the master machine cancels the link copy mode (step S7601) with the system control returned to an initial step of the processing sequence.

In the eighth embodiment, a slave machine determines whether a link copy operation is possible or not, the slave machine is not required to send data concerning an operating state of the device to the master machine, which insures improved efficiency in communications.

Definition of Terms

Terms relating to a digital copying machine and used in this specification are explained below.

"Image reading unit (Image reading section)": As a "image reading unit" used in a digital PPC, there has been known which has a function for executing the "required image processing" by irradiating a light onto a document and converting the reflected light from the document with a charge coupled device to an electric signal. The "required image processing" as defined herein includes such processing as digitizing (converting analog data converted by a CCD to two-valued or multi-valued data), shading correction (correction of non-uniformity in light irradiated to a document or in sensitivity of the CCD), MMT correction (correction of ambiguousness caused in an optical system), processing for changing an image size (processing for data interpolation by changing read density for an image and using the read image data).

"Image formation section": An "image formation section" used in a digital PPC is a device for converting an image sent as an electric signal to a visual image with such a means as electronic photography, heat-sensing, thermal transfer, or ink-jet on ordinary paper or heat-sensing paper.

"Video signal", image data": An electric signal for an image converted by the image forming unit described above, an electric signal for an image inputted into the image formation section, and a signal for establishing synchronism to an electric signal for an image are generically expressed as "video signal" or "image data".

"Control signal", "Command": To transact a video signal among, "image formation units", "image formation sections", and "applications", it is necessary to deliver information between the devices. The means is expressed as a "control signal" or "command" issuing.

"Extended function", "application", "memory function", "memory unit": An important feature of the digital PPC is the capability of reading an image as an electric signal and reproducing the electric signal as a visual image with an image formation apparatus. The digital PPC has the capability of changing and delivering the read electric signal in various ways, which insures applications in many fields other than an analog PPC. With the digital PPC, such functions as facsimile, a page printer, a scanner, a file system can be realized, and in recent years, when executing the PPC function, for instance, it is possible even to store read image data in a memory such as a DRAM once and prepare a plurality of copies with one scan when a plurality of copies of an image are required, or to print a plurality of document on one sheet of recording paper (this function is described as memory function hereinafter). This function which can be realized only with the digital PPC system is expressed as the "extended function" or "application". The memory unit is also used as a buffer unit for transferring image data between devices on a network.

"System controller", "System": Controllers providing controls over the processing for carrying paper, the electronic photography, monitoring of abnormal state or a state of a paper-feed cassette (presence of recording paper or the like), and operations for controlling operations of a scanner, an ON/OFF state of a light source or the like to read an image with an image formation section are generically described as system controller. In recent years, not only one extended function, but a plurality of applications are loaded in a digital PPC. Sometimes PPCs sharing one resource are expressed as a "system", and a controller which controls the system is expressed as "system controller".

"Resources": A functional unit shared by a plurality of applications is described as a "resource". The "system controller" provides system control with this resource unit. Resources managed in the PPC according to the present invention include the "image reading unit", "image formation section", "operation panel", "memory", and "peripheral devices" (such as an AFD, a sorter, an automatic two-side copying unit, a stapler 130, a finisher 122).

"User limiting": Especially in the PPC using the electronic photography process, sometimes it is desired to limit users who can use the device to prevent supplies from being wasted. To identify, limit, and mages the users, such "user limiting units" as a coin lack, a key counter, a key-card, a prepaid card, and user code are used.

"Setting for each user": In case of a complicated system, sometimes it is required to customize the system for satisfying discrete needs of each user. It is impossible to set each machine discretely, when shipped from a factory, for satisfying needs of each user, so that services for each user are required in the market. Generally each machine has a nonvolatile RAM, which enables customization of the system. This function is expressed as "setting for each user".

"Idle state": A state where a machine is not operated by a user for a prespecified period of time" is expressed as "idle state", and a state other than the idling state is described as "busy state". A time required from the busy state to the idle state can be set discretely by each user. Not only during a copy operation, but also even when a copy operation is over, the busy state is not switched to the idling state before a state in which the machine is not operated by the user passes a prespecified period of time.

"Weekly timer": This function is used to turn ON/OFF power according to an ON/OFF time set for each day of a week.

"Preliminary heating": A mode for reducing power consumption by lowering temperature for fixing by a specified degree (for instance 10° C.) to turn OFF displays on an operation panel. This mode is automatically set when a prespecified period of time passes after a key entry on an operation panel is over, or after an operation or user's manipulation is over in some machines. This mode is automatically canceled when a user makes an key-entry on the operation panel, or when presence of an operator is detected by a human body sensor.

"Reload": When a copying machine is in a state where temperature for fixing reaches a preset degree of temperature enabling fixing and a copy operation can be performed, the state is described as "reload".

"Interruption mode": In this mode, a user can temporally terminate a copy operation being made by another user and copy a document which the user specifies. When this mode is set, the previous copy mode before specification of this mode or data on a copy operation which is forcefully terminated upon interruption is stored in a nonvolatile RAM to effect the interruption mode, and the operating mode is initialized. When the interruption mode is canceled after execution of a copy operation, the mode or data stored in the nonvolatile RAM is read out to restore the state before the interruption mode is set, and the operating mode is restarted when the start key is pressed again. This mode is set or canceled with a key on the operation panel 201.

"Reservation mode": In this mode, a plurality of copy applications are started concurrently, and the system controller controls the resources. When one copy application is being executed and an operation panel or an image reading unit is not being used by other user, use of another copy application is allowed for executing a specified operation or reading a document.

Figure 19:
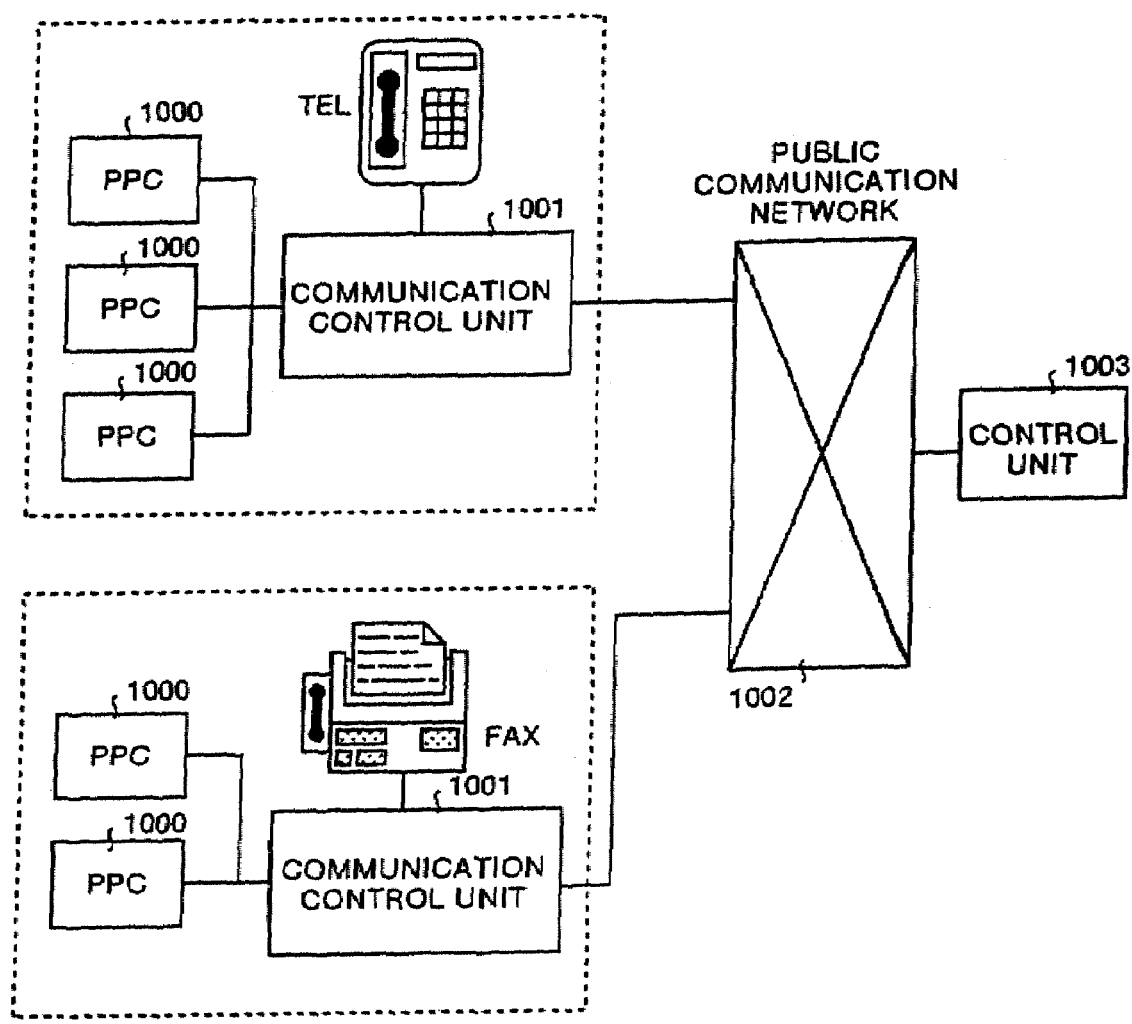
FIG. 19 is a view showing configuration of a management system for a digital copying machine.

"CSS" (or "Remote diagnosis system", "digital copying machine management system"): FIG. 19 shows configuration of a digital copying machine management system. A management unit 1003 installed at a service point and equipment such as a PPC 100 at a user site are connected to each other through a public line network 1002. A communication control unit 1001 for controlling communications with the management unit 1003 is provided at the user site, and the PPC 1000 at the user site is connected to this communication control unit 1001. A telephone or a facsimile machine can be connected to this communication control unit 1001, and the communication control unit is connected to a line already installed at the user site. A plurality of PPC can be connected to the communication control unit 1001, but sometimes only one unit of PPC is connected thereto.

Types of the PPCs connected to the same communication unit 1001 may be different from each other, and further equipment other than the PPC can be connected to the communication control unit 1001. It is assumed herein for convenience of description that up to five units of PPC can be connected to one unit of communication control unit. The communication control unit and a plurality of PPCs are connected to each other in the multi-drop mode based on the RS-485 standard. Communications between the communication control unit and each PPC is controlled according to the basic type of data transfer control protocol. Communication between the communication control unit and any of the PPCs is enabled by establishing a data link based on the polling/selecting system under centralized control. In this control mode, the communication control unit functions as a control station. In each PPC, specific values can be set with an address set switch, and with this operation, a polling address and a selecting address for each PPC is decided.

"Reservation copy": In the "Reservation copy" mode, a plurality of copy applications are simultaneously started, and each application is executed discretely. Operation of an operation panel, peripheral devices, an image writing section, an image reading unit, and a memory, which are shared resources, are arbitrated by the system controller. Data for an operation screen for each of the plurality of copy application can be written on a virtual screen provided by the operation panel. The operation panel develops screen data of a virtual screen for an operation panel owner application specified by the system controller on the real screen.

"Reservation of an operation": In the state of a reservation of an operation, a copy operation can not be started when such an operation as heating for fixing is being executed. With this function, it is possible to automatically start a copy operation after heating for fixing is finished and when a copy operation is enabled. In this embodiment, heating for fixing is one of operations which can be subscribed, but other operations which are automatically enabled in association with passage of time are qualified to be subscribed. The operations include an operation for raising an LCT tray, staple rotation of a polygon motor, and a toner supply operation.

The present invention is not limited to the embodiments described above, and can be carried out modifying it according to the necessity within a gist of the invention. For instance, description of the above embodiments assumes use of two units of digital copying machines connected to each other (Refer to FIG. 14), but a number of digital copying machines connected to each other is not limited to two units, and three or more units of digital copying machine may be connected to each other for a copy operation in the link copy mode. In this case, one unit of digital copying machine functions as a master machine, and other two units of digital copying machine function as slave machines.

As described above, with the image formation apparatus (master machine) according to the present invention, in a state where a link copy mode has been selected, when a function which can not be executed in a local device or in other image formation apparatus is selected, a link copy operation is inhibited. Because of this feature, when a user sets an operation mode which can not be executed in both of master and slave machines concurrently in a state where the link copy mode has been set, generation of a mistake in a copy operation can be prevented.

With the image formation apparatus (slave machine) according to the present invention, a function available in a local device is reported to other image formation apparatus, and an image of a document read by and transferred from the other image formation apparatus is printed in the local machine. Because of this feature, when a user sets an operation mode which can not be executed in both of master and slave machines concurrently in a state where the link copy mode has been set, generation of a mistake in a copy operation can be prevented.

With the image formation system according to the present invention, a slave machine reports a function available in the slave machine to a master machine, and in a state where the link copy mode has been selected, when a function which can not be executed in the local machine or the slave machine is selected, the master machine inhibits the link copy operation. Because of this feature, when a user sets an operation mode which can not be executed in both of master and slave machines concurrently in a state where the link copy mode has been set, generation of a mistake in a copy operation can be prevented.

With the image formation apparatus (master machine) according to the present invention, in a state where the link copy mode has been selected, when a function which can not be executed in the local machine or other image formation apparatus is selected, a select key for selecting the function is not displayed. Because of this feature, when a user sets an operation mode which can not be executed in both of master and slave machines concurrently in a state where the link copy mode has been set, generation of a mistake in a copy operation can be prevented.

With the image formation system according to the present invention, a slave machine reports a function available in the slave machine to a master machine, and in a state where the link copy mode has been selected, when a function which can not be executed in the master machine or in the slave machine, the master machine does not display the select key for selecting the function. Because of this feature, when a user sets an operation mode which can not be executed in both of master and slave machines concurrently in a state where the link copy mode has been set, generation of a mistake in a copy operation can be prevented.

With the image formation apparatus according to the present invention, in a state where the link copy mode has been selected, when a function which can not be executed in the local machine or other image formation apparatus is selected, a display indicating that the select key for selecting the function is invalid is displayed. Because of this feature, when a user sets an operation mode which can not be executed in both of master and slave machines concurrently in a state where the link copy mode has been set, generation of a mistake in a copy operation can be prevented.

With the image formation system according to the present invention, a slave machine reports a function available in the slave machine to a master machine, and in a state where the link copy mode has been selected, when a function which can not be executed in the master machine or in the slave machine, the master key displays a message indicating that the select key for selecting the function is invalid. Because of this feature, when a user sets an operation mode which can not be executed in both of master and slave machines concurrently in a state where the link copy mode has been set, generation of a mistake in a copy operation can be prevented.

With the image formation apparatus according to the present invention, in a state where the link copy mode has been selected, when a function which can not be executed in the local machine or in other image formation apparatus(es) is selected, the mode for executing the function is canceled. Because of this feature, a user can not set a mode which can not be executed in both of the master and slave machines concurrently, which insures improved operability in the link copy mode.

With the image formation system according to the present invention, a slave machine reports a function available in the slave machine to a master machine, and in a state where the link copy mode has been selected, when a function which can not be executed in the master machine or in the slave machine is selected, the master machine cancels the mode for executing the function. Because of this feature, a user can not set a mode which can not be executed in both of the master and slave machines concurrently, which insures improved operability in the link copy mode.

With the image formation apparatus according to the present invention, the function includes a staple function.

Because of this feature, the staple function can advantageously be used in addition to the advantages described above.

With the image formation system according to the present invention, the function includes a staple function. Because of this feature, the staple function can advantageously be used in addition to the advantages described above.

With the image formation apparatus (master machine) according to the present invention, in a state when the link copy mode has been selected, when power for other image formation apparatus is OFF, the link copy operation is inhibited. Because of this feature, even when a linked device is at a remote site, it is possible to check whether a copy operation is possible or not only with the master machine currently being operated by a user and without directly checking an ON/OFF state of power for the slave machine, which insures improved operability in the link copy mode.

With the image formation apparatus (slave machine) according to the present invention, a local machine reports a power ON/OFF state in the local machine to other image formation apparatus, and prints an image of a document read by and transferred from other image formation apparatus. Because of this feature, even when a linked device is at a remote site, it is possible to check whether a copy operation is possible or not only with the master machine currently being operated by a user and without directly checking an ON/OFF state of power for the slave machine, which insures improved operability in the link copy mode.

With the image formation system according to the present invention, a slave machine reports a power ON/OFF state in the slave machine to a master machine, and the master machine inhibits the link copy operation when the link copy mode is selected and a power for the slave machine is OFF. Because of this feature, even when a linked device is at a remote site, it is possible to check whether a copy operation is possible or not only with the master machine currently being operated by a user and without directly checking an ON/OFF state of power for the slave machine, which insures improved operability in the link copy mode.

With the image formation apparatus (master machine) according to the present invention, in a state where the link copy mode has been selected, when the other image formation apparatus are not ready for communications, the link copy operation is inhibited. Because of this feature, even when a linked device is at a remote site, it is possible to check whether a copy operation is possible or not only with the master machine currently being operated by a user and without directly checking an ON/OFF state of power for the slave machine, which insures improved operability in the link copy mode.

With the image formation apparatus (slave machine) according to the present invention, a local machine reports a communication-ready state in the local machine to other image formation apparatus, and prints an image of a document read by and transferred from the other image formation apparatus. Because of this feature, even when a linked device is at a remote site, it is possible to check whether a copy operation is possible or not only with the master machine currently being operated by a user and without directly checking an ON/OFF state of power for the slave machine, which insures improved operability in the link copy mode.

With the image formation system according to the present invention, a slave machine reports a communication-ready state in the slave machine to a master machine, and in a state where the link copy mode has been selected, when the slave machine is not ready for communications, the master machine inhibits the link copy operation. Because of this feature, even when a linked device is at a remote site, it is possible to check whether a copy operation is possible or not only with the master machine currently being operated by a user and without directly checking an ON/OFF state of power for the slave machine, which insures improved operability in the link copy mode.

With the image formation apparatus (master machine) according to the present invention, in a state where the link copy mode has been selected, when a communication error occurs in other image formation apparatus(es), the link copy operation is inhibited. Because of this feature, even when a linked device is at a remote site, it is possible to check whether a copy operation is possible or not only with the master machine currently being operated by a user and without directly checking an ON/OFF state of power for the slave machine, and further the necessity of an operation for restarting a copy operation after a communication error is recovered is eliminated, which insures improved operability in the link copy mode.

With the image formation apparatus (slave machine) according to the present invention, a local machine reports a communication error state in the local machine to other image formation apparatus(es), and prints an image of a document read by and transferred from the other image formation apparatus(es). Because of this feature, even when a linked device is at a remote site, it is possible to check whether a copy operation is possible or not only with the master machine currently being operated by a user and without directly checking an ON/OFF state of power for the slave machine, and further the necessity of an operation for restarting a copy operation after a communication error is recovered is eliminated, which insures improved operability in the link copy mode.

With the image formation system according to the present invention, a slave machine reports a communication error state in the slave machine to a master machine, and the master machine inhibits the link copy operation in a state where the link copy mode is selected when a communication error occurs in the slave machine. Because of this feature, even when a linked device is at a remote site, it is possible to check whether a copy operation is possible or not only with the master machine currently being operated by a user and without directly checking an ON/OFF state of power for the slave machine, and further the necessity of an operation for restarting a copy operation after a communication error is recovered is eliminated, which insures improved operability in the link copy mode.

With the image formation apparatus (master machine) according to the present invention, when power for other image formation apparatus is OFF, selection of the link copy mode is inhibited. Because of this feature, even when a linked device is at a remote site, it is possible to determine whether a copy operation is possible or not only with the master machine currently being operated by a user and without directly checking a power ON/OFF state of a slave machine, which insures operability in the link copy mode. Further, when a link copy operation is not possible, selection of the link copy mode is inhibited, so that it is possible to alert a user before selection of the link copy mode that a link copy operation is not possible, which insures further improved operability.

With the image formation system according to the present invention, a slave machine reports a power ON/OFF state in the slave machine to a master machine, and the master machine inhibits selection of the link copy mode when power for the slave machine is OFF. Because of this feature, even when a linked device is at a remote site, it is possible to determine whether a copy operation is possible or not only with the master machine currently being operated by a user and without directly checking a power ON/OFF state of a slave machine, which insures operability in the link copy mode. Further, when a link copy operation is not possible, selection of the link copy mode is inhibited, so that it is possible to alert a user before selection of the link copy mode that a link copy operation is not possible, which insures further improved operability.

With the image formation apparatus (master machine) according to the present invention, when other image formation apparatus are not ready for communication, selection of the link copy mode is inhibited. Because of this feature, even when a linked device is at a remote site, it is possible to determine whether a copy operation is possible or not only with the master machine currently being operated by a user and without directly checking a power ON/OFF state of a slave machine, which insures operability in the link copy mode. Further, when a link copy operation is not possible, selection of the link copy mode is inhibited, so that it is possible to alert a user before selection of the link copy mode that a link copy operation is not possible, which insures further improved operability.

With the image formation system according to the present invention, a slave machine reports a communication-ready state in the slave machine to a master machine, and the master machine inhibits selection of the link copy mode when the slave machine is not ready for communications. Because of this feature, even when a linked device is at a remote site, it is possible to determine whether a copy operation is possible or not only with the master machine currently being operated by a user and without directly checking a power ON/OFF state of a slave machine, which insures operability in the link copy mode. Further, when a link copy operation is not possible, selection of the link copy mode is inhibited, so that it is possible to alert a user before selection of the link copy mode that a link copy operation is not possible, which insures further improved operability.

With the image formation apparatus (master machine) according to the present invention, when a communication error occurs in other image formation apparatus, selection of the link copy mode is inhibited. Because of this feature, even when a linked device is at a remote site, it is possible to determine whether a copy operation is possible or not only with the master machine currently being operated by a user and without directly checking a power ON/OFF state of a slave machine, which insures operability in the link copy mode. Further, when a link copy operation is not possible, selection of the link copy mode is inhibited, so that it is possible to alert a user before selection of the link copy mode that a link copy operation is not possible, which insures further improved operability.

With the image formation system according to the present invention, a slave machine reports a communication error state in the slave machine to a master machine, and the master machine inhibits selection of the link copy mode when the slave machine is in the communication error state. Because of this feature, even when a link copy is located at a remote site, it is possible to determine whether a link copy operation is possible or not only with the master machine currently being operated by a user and without directly checking whether a communication error has occurred in the slave machine or not, and further the necessity of an operation for restarting a copy operation after the communication error is recovered, which insures improved operability in the link copy mode. In addition, selection of the link copy mode is inhibited when a link copy operation is not possible, so that it is possible to alert a user before selection of the link copy mode that a link copy operation is not possible, which insures further improved operability.

With the image formation system according to the present invention, a slave machine periodically transmits a communication connection check signal indicating whether connection has been established or not to a master machine, and the master machine receives the communication connection check signal and determines whether the slave machine is ready for communications or not. Because of this feature, a dedicated communication line is not necessary, which enables cost reduction for the entire system.

With the image formation apparatus (master machine) according to the present invention, when other image formation apparatus are in the supply-end state, the link copy operation is inhibited. Because of this feature, even when a linked device is located at a remote site, it is possible to determine whether a link copy operation is possible not only with the master machine currently being operated by user and without directly checking availability of supply in the salve device, which insures improved operability in the link copy mode.

With the image formation apparatus (slave machine) according to the present invention, a local machine reports a supply state in the local machine to other image formation apparatus, and prints an image of a document read by and transferred from the image formation apparatus. Because of this feature, even when a linked device is located at a remote site, it is possible to determine whether a link copy operation is possible not only with the master machine currently being operated by user and without directly checking availability of supply in the salve device, which insures improved operability in the link copy mode.

With the image formation system according to the present invention, a slave machine reports a supply state in the slave machine to a master machine, and the master machine inhibits the link copy operation when the slave machine is in the supply-end state. The master machine prints an image read by and transferred from other image formation apparatus(es). Because of this feature, even when a linked device is located at a remote site, it is possible to determine whether a link copy operation is possible not only with the master machine currently being operated by user and without directly checking availability of supply in the salve device, which insures improved operability in the link copy mode.

With the image formation apparatus (slave machine) according to the present invention, a reporting unit reports, when a supply state in a local machine changes, the supply state in the local machine to other image formation apparatus (es). Because of this feature, in addition to the advantages described above, a time required for communication can be reduced.

With the image formation apparatus (master machine) according to the present invention, the link copy operation is inhibited when a print engine error occurs in other image formation apparatus. Because of this feature, even when a linked device is located at a remote site, it is possible to determine whether a link copy operation is possible not only with the master machine currently being operated by user and without directly checking availability of supply in the salve device, which insures improved operability in the link copy mode.

With the image formation apparatus (slave machine) according to the present invention, a local machine reports an operating state of a print engine in the local machine to other image formation apparatus, and prints an image of a document read by and transferred from the other image formation apparatus. Because of this feature, even when a linked device is located at a remote site, it is possible to determine whether a link copy operation is possible not only with the master machine currently being operated by user and without directly checking availability of supply in the salve device, which insures improved operability in the link copy mode.

With the image formation system according to the present invention, a slave machine reports an operating state of a print engine in the slave machine to a master machine, and the master machine inhibits the link copy operation when an print engine error occurs in the slave machine. Because of this feature, even when a linked device is located at a remote site, it is possible to determine whether a link copy operation is possible not only with the master machine currently being operated by user and without directly checking availability of supply in the salve device, which insures improved operability in the link copy mode.

With the image formation apparatus (slave machine) according to the present invention, when an operating state of a print engine in a local machine changes, the local machine reports the operating state of a print engine in the local machine to other image formation apparatus. Because of this feature, in addition to the advantage described above, a time required for communications can be reduced.

With the image formation apparatus (master machine) according to the present invention, when other image formation apparatus display a screen other than the normal copy screen, the link copy operation is inhibited. Because of this feature, even when a linked device is located at a remote site, it is possible to determine whether a link copy operation is possible or not and without directly checking a screen display state in the slave machine, which insures improved operability in the link copy mode. Further, a demand for a link copy operation is never sent from other apparatus(es) during initialization or maintenance, so that an operation for initialization or maintenance is not interrupted.

With the image formation apparatus (slave machine) according to the present invention, a local machine reports a screen display state in the local machine to other image formation apparatus, and prints an image of a document read by and transferred from the other image formation apparatus. Because of this feature, even when a linked device is located at a remote site, it is possible to determine whether a link copy operation is possible or not and without directly checking a screen display state in the slave machine, which insures improved operability in the link copy mode. Further, a demand for a link copy operation is never sent from other apparatus during initialization or maintenance, so that an operation for initialization or maintenance is not interrupted.

With the image formation system according to the present invention, a slave machine reports a screen display state in the slave machine to a master machine, and the master machine inhibits the link copy operation when the slave machine displays a screen other than the normal copy screen. Because of this feature, even when a linked device is located at a remote site, it is possible to determine whether a link copy operation is possible or not and without directly checking a screen display state in the slave machine, which insures improved operability in the link copy mode. Further, a demand for a link copy operation is never sent from other apparatus during initialization or maintenance, so that an operation for initialization or maintenance is not interrupted.

With the image formation apparatus (slave machine) according to the present invention, a reporting unit reports, when a screen display state in a local machine, the screen display state in the local machine to other image formation apparatus. Because of this feature, in addition to the advantages described above, a time required for communications can be reduced.

With the image formation apparatus (master machine) according to the present invention, when other image formation apparatus are executing a printing operation, the link copy operation is inhibited. Because of this feature, even when a linked device is located at a remote site, it is possible to determine whether a link copy operation is possible or not and without directly checking a screen display state in the slave machine, which insures improved operability in the link copy mode. Further, a demand for a link copy operation is never sent from other apparatus during initialization or maintenance, so that a trouble of giving influence over a printing job in executed can be prevented.

With the image formation apparatus (slave machine) according to the present invention, a local machine reports an operating state of a print engine in the local machine to other image formation apparatus, and prints an image of a document read by and transferred from other image formation apparatus. Because of this feature, even when a linked device is located at a remote site, it is possible to determine whether a link copy operation is possible or not and without directly checking a screen display state in the slave machine, which insures improved operability in the link copy mode. Further, a demand for a link copy operation is never sent from other apparatus during initialization or maintenance, so that a trouble of giving influence over a printing job in executed can be prevented.

With the image formation system according to the present invention, a slave machine reports an operating state of a print engine in the slave machine to a master machine, and the master machine inhibits the link copy operation when the slave machine is executing a printing operation. Because of this feature, even when a linked device is located at a remote site, it is possible to determine whether a link copy operation is possible or not and without directly checking a screen display state in the slave machine, which insures improved operability in the link copy mode. Further, a demand for a link copy operation is never sent from other apparatus during initialization or maintenance, so that a trouble of giving influence over a printing job in executed can be prevented.

With the image formation system according to the present invention, a reporting unit reports, when an operating state of a print engine in a local machine changes, the operating state of a print engine in the local machine to other image formation apparatus. Because of this configuration, in addition to the advantages described above, a time required for communications can be reduced.

With the image formation apparatus (master machine) according to the present invention, when other image formation apparatus are in a supply end state, selection of the link copy mode is inhibited. Because of the feature, even when a linked device is located at a remote site, it is possible to determine whether a link copy operation is possible or not only with the master machine currently being operated by a user and without directly checking availability of a supply in a slave machine, which insures improved operability in the link copy mode. Further, when a link copy operation is not possible, selection of the link copy mode is inhibited, so that it is possible to alert a user before selection of the link copy mode that a link copy operation is not possible, which insures further improved operability.

With the image formation system according to the present invention, a slave machine reports a supply end state in the slave machine to a master machine, and the master machine inhibits selection of the link copy mode when the slave machine is in the supply end state. Because of the feature, even when a linked device is located at a remote site, it is possible to determine whether a link copy operation is possible or not only with the master machine currently being operated by a user and without directly checking availability of a supply in a slave machine, which insures improved operability in the link copy mode. Further, when a link copy operation is not possible, selection of the link copy mode is inhibited, so that it is possible to alert a user before selection of the link copy mode that a link copy operation is not possible, which insures further improved operability.

With the image formation apparatus (master machine) according to the present invention, when other image formation apparatus are in the print engine error state, selection of the link copy mode is inhibited. Because of the feature, even when a linked device is located at a remote site, it is possible to determine whether a link copy operation is possible or not only with the master machine currently being operated by a user and without directly checking whether a print engine error has occurred in a slave machine or not, which insures improved operability in the link copy mode. Further, when a link copy operation is not possible, selection of the link copy mode is inhibited, so that it is possible to alert a user before selection of the link copy mode that a link copy operation is not possible, which insures further improved operability.

With the image formation system according to the present invention, a slave machine reports a print engine state in the slave machine to a master machine, and the master machine inhibits selection of the link copy mode when the slave machine is in the print engine error state. Because of this feature, even when a linked device is located at a remote site, it is possible to determined whether a link copy operation is possible or not only with the master machine currently being operated by a user and without directly checking whether a print engine error has occurred in the slave machine or not, which insured improved operability in the link copy mode. Further, when a link copy operation is not possible, selection of the link copy mode is inhibited, so that it is possible to alert a user before selection of the link copy mode that a link copy operation is not possible, which insures further improved operability.

With the image formation apparatus (master machine) according to the present invention, when other image formation apparatus are displaying a screen other than the normal copy screen, selection of the link copy mode is inhibited. Because of this feature, even when a linked device is located at a remote site, it is possible to determine whether a link copy operation is possible or not only with the master machine currently being operated and without directly checking a display screen state in the slave machine, which insures improved operability in the link copy mode. Further, when a link copy operation is not possible, selection of the link copy mode is inhibited, so that it is possible to alert a user before selection of the link copy mode that a link copy operation is not possible, which insures further improved operability. In addition, a demand for a link copy operation is never send during initialization or a maintenance work, so that interruption of initialization or maintenance work can be prevented.

With the image formation system according to the present invention, a slave machine reports a screen display state in the slave machine to a master machine, and the master machine inhibits selection of the link copy mode when the salve device displays a screen other than the normal copy screen. Because of this feature, even when a linked device is located at a remote site, it is possible to determine whether a link copy operation is possible or not only with the master machine currently being operated and without directly checking a display screen state in the slave machine, which insures improved operability in the link copy mode. Further, when a link copy operation is not possible, selection of the link copy mode is inhibited, so that it is possible to alert a user before selection of the link copy mode that a link copy operation is not possible, which insures further improved operability. In addition, a demand for a link copy operation is never sent during initialization or a maintenance work, so that interruption of initialization or maintenance work can be prevented.

With the image formation apparatus (master machine) according to the present invention, selection of the link copy mode is inhibited when other image formation apparatus are executing a printing operation. Because of this feature, even when a linked device is located at a remote site, it is possible to determine whether a link copy operation is possible or not only with the master machine currently being operated and without directly checking an operating state of a print engine in the slave machine, which insures improved operability in the link copy mode. Further, when a link copy operation is not possible, selection of the link copy mode is inhibited, so that it is possible to alert a user before selection of the link copy mode that a link copy operation is not possible, which insures further improved operability. In addition, a demand for a link copy operation is never sent when a print engine of the slave machine is operating, so that a trouble giving influence over a printing job in execution can be prevented.

With the image formation system according to the present invention, a slave machine reports an operating state of a print engine in the slave machine to a master machine, and the master machine inhibits selection of the link copy mode when the slave machine is executing a printing operation. Because of this feature, even when a linked device is located at a remote site, it is possible to determine whether a link copy operation is possible or not only with the master machine currently being operated and without directly checking an operating state of a print engine in the slave machine, which insures improved operability in the link copy mode. Further, when a link copy operation is not possible, selection of the link copy mode is inhibited, so that it is possible to alert a user before selection of the link copy mode that a link copy operation is not possible, which insures further improved operability. In addition, a demand for a link copy operation is never sent when a print engine of the slave machine is operating, so that a trouble giving influence over a printing job in execution can be prevented.

With the image formation apparatus according to the present invention, when a number of specified copies of a document to be printed is more than a prespecified number of sheets, the link copy mode is automatically executed. Because of this feature, productivity in printing is improved. In addition, it is possible to automatically execute a link copy operation even to a user who does not know a function of the link copy mode, which realizes the print processing with high productivity.

With the image formation system according to the present invention, when a number of sheets of document to be printed is more than a prespecified number of sheets, the link copy mode is automatically executed. Because of this feature, productivity in printing is improved. In addition, it is possible to automatically execute a link copy operation even to a user who does not know a function of the link copy mode, which realizes the print processing with high productivity.

With the image formation apparatus (master machine) according to the present invention, when a number of sheets of document is more than a prespecified number of sheets, the link copy mode is automatically executed. Because of this feature, productivity in printing is improved. In addition, it is possible to automatically execute a link copy operation even to a user who does not know a function of the link copy mode, which realizes the print processing with high productivity.

With the image formation system according to the present invention, when a number of sheets of document is more than a prespecified number of sheets, the link copy mode is automatically executed. Because of this feature, productivity in printing is improved. In addition, it is possible to automatically execute a link copy operation even to a user who does not know a function of the link copy mode, which realizes the print processing with high productivity.

With the image formation apparatus (master machine) according to the present invention, a total number of sheets to be printed is calculated based on a number of sheets of document and a specified number of sheets of document to be printed, and the link copy mode is automatically executed when the calculated total number of sheets to be printed is more than a prespecified number of sheets. Because of this feature, operations in the link copy mode can be executed under more accurately conditions with improved productivity. Further, it is possible to automatically execute a link copy operation even to a user who does not know a function of the link copy mode, which realizes the print processing with high productivity.

With the image formation system according to the present invention, a master machine calculates a total number of sheets to be printed based on a number of sheets of document and a specified number of sheets of document to be printed, and automatically executes the link copy mode when the calculated total number of sheets to be printed is more than a prespecified number of sheets. Because of this feature, operations in the link copy mode can be executed under more accurately conditions with improved productivity. Further, it is possible to automatically execute a link copy operation even to a user who does not know a function of the link copy mode, which realizes the print processing with high productivity.

With the image formation apparatus (master machine) according to the present invention, a master machine calculates a total required number of image-forming operations based on a number of sheets of document, a number of sheets of document to be printed, and a specified image formation mode, and automatically executes the link copy mode when the calculate number of image-forming operations is more than a prespecified value. Because of this feature, conditions for enabling a link copy operation are more accurate as compared to those for the concentrate mode, and productivity in printing can be improved. Further, it is possible to automatically execute a link copy operation even to a user who does not know a function of the link copy mode, which realizes the print processing with high productivity.

With the image formation system according to the present invention, a master machine calculates a total required number of image-forming operations based on a number of sheets of document, a specified number of sheets of document to be printed, and a specified image-forming mode, and automatically executes the link copy mode when the calculated total number of image-forming operations requires a larger number of sheets of paper more than a prespecified value. Because of this feature, conditions for enabling a link copy operation are more accurate as compared to those for the concentrate mode, and productivity in printing can be improved. Further, it is possible to automatically execute a link copy operation even to a user who does not know a function of the link copy mode, which realizes the print processing with high productivity.

With the image formation apparatus (master machine) according to the present invention, when the link copy mode is automatically executed, a message indicating automatic execution of the link copy mode is displayed on a display unit. Because of this feature, in addition to the advantages described above, it is possible to let a user know that a copy operation is automatically started in the link copy mode.

With the image formation system according to the present invention, a master machine displays a message indicating automatic execution of the link copy mode on a display unit when the link copy mode is automatically executed. Because of this feature, in addition to the advantages described above, it is possible to let a user know that a copy operation is automatically started in the link copy mode.

With the image formation apparatus (master machine) according to the present invention, when the link copy mode is automatically executed and a printing job is finished, the link copy mode is canceled. Because of this feature, in addition to the advantages described above, a state where a linked device is occupied by other devices for a long time can be prevented.

With the image formation system according to the present invention, a master machine cancels the link copy mode when the master machine automatically executes the link copy mode and finishes a print job. Because of this feature, in addition to the advantages described above, a state where a linked device is occupied by other devices for a long time can be prevented.

With the image formation apparatus (master machine) according to the present invention, when the link copy mode is selected, a link copy mode shift request reporting unit sends a link copy mode shift request to other image formation apparatus connected thereto, and a link copy mode setting unit sets the link copy mode in response to the link copy mode shift request and based on a result of determination that a link copy mode shift request sent from other image formation apparatus can be accepted. Because of this feature, the communication efficiency in the link copy mode can be improved.

With the image formation apparatus (slave machine) according to the present invention, a link mode shift determination unit determines in response to a link copy mode shift request sent from other image formation apparatus whether shift to the link copy mode is possible or not, and sends the result of determination to the other image formation apparatus. Because of this feature, the communication efficiency in the link copy mode can be improved.

With the image formation system according to the present invention, in a slave machine, a link copy mode shift determination unit determines in response to a link copy mode shift request sent from a master machine whether shift to the link copy mode is possible or not, and sends the result of determination to the master machine. On the other hand, when the link copy mode is selected, the link copy mode shift request reporting unit in the master machine sends a link copy mode shift request to the slave machine, and a link copy mode determination unit sets the link copy mode based on the result of determination sent from the slave machine that shift to the link copy mode is possible. Because of this feature, the communication efficiency in the link copy mode can be improved.

With the image formation apparatus according to the present invention, one image formation apparatus is connected to other image formation apparatus peer to peer. Because of this feature, an image formation apparatus can functions as either one of a master machine and a slave machine.

With the image formation system according to the present invention, a master machine is connected to a slave machine peer to peer. Because of this feature, in addition to the advantages described above, an image formation apparatus can functions as either one of a master machine and a slave machine.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. An image formation system having a link copy mode in which, of a plurality of image formation apparatuses connected to each other for enabling data communications, an image formation apparatus functioning as a master machine reads an image of a document to be copied, the read image is transferred to at least one other image formation apparatus functioning as a slave machine, and printing of the read image is shared by said master machine and said slave machine, wherein said master machine calculates a total number of copies to be printed based on the number of sheets of the document and the specified number of copies, and automatically executes switching to the link copy mode when the calculated total number of copies exceeds a prespecified number.

2. The image formation system according to claim 1, wherein said master machine has a display unit on which a message indicating execution of the link copy mode is displayed when switching to the link copy mode is automatically executed.

3. The image formation system according to claim 1, wherein said master machine cancels the link copy mode when switching to the link copy mode is automatically executed and the printing job is finished.

4. The image formation system according to claim 1, wherein said master machine is connected to the slave device peer to peer.

5. An image formation apparatus connected to at least one other image formation apparatus such that data communications can be executed between the two image formation apparatus apparatuses, said image formation apparatus comprising:

a reading unit which reads an image of a document;

a printing unit which prints the read image of a document; and a controller which executes a link copy mode in which the read image is transferred to said other image formation apparatus for sharing the printing of the read image with the local image formation apparatus and said other image formation apparatus, wherein a total number of images to be prepared is calculated based on the number of sheets of the document, the specified number of copies, and the specified image formation mode, and switching to the link copy mode is automatically executed when the calculated total number of copies exceeds a prespecified number.

6. The image formation apparatus according to the claim 5, further comprises a display unit on which a message indicating execution of the link copy mode is displayed when switching to the link copy mode is automatically executed.

7. The image formation apparatus according to the claim 5, wherein the link copy mode is canceled when switching to the link copy mode is automatically executed and the printing job is finished.

8. The image formation apparatus according to the claim 5, wherein said image formation apparatus is connected to said other image formation apparatus peer to peer.

9. An image formation system having a link copy mode in which, a plurality of image formation apparatuses connected to each other for enabling data communications, an image formation apparatus functioning as a master machine reads an image of a document to be copied, the read image is transferred to at least one other image formation apparatus functioning as a slave machine, and printing of the read image is shared by said master machine and said slave machine, wherein said master machine calculates a total number of images to be prepared based on the number or sheets of the document, the specified number of copies, and the specified image formation mode, and automatically executes switching to the link copy mode when the calculated total number of copies exceeds a prespecified number.

10. The image formation system according to the claim 9, wherein said master machine has a display unit on which a message indicating execution of the link copy mode is displayed when switching to the link copy mode is automatically executed.

11. The image formation system according to claim 9, wherein said master machine cancels the link copy mode when switching to the link copy mode is automatically executed and the printing job is finished.

12. The image formation system according to the claim 9, wherein said master machine is connected to the slave device peer to peer.

* * * * *